United States Patent
Zhang et al.

(10) Patent No.: US 11,757,680 B2
(45) Date of Patent: Sep. 12, 2023

(54) REFERENCE SIGNAL SENDING AND RECEIVING METHODS, DEVICE AND STORAGE MEDIUM

(71) Applicant: ZTE Corporation, Shenzhen (CN)

(72) Inventors: Shujuan Zhang, Shenzhen (CN); Zhaohua Lu, Shenzhen (CN); YuNgok Li, Shenzhen (CN); Yuxin Wang, Shenzhen (CN); Chuangxin Jiang, Shenzhen (CN); Hao Wu, Shenzhen (CN); Nan Zhang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 17/862,584

(22) Filed: Jul. 12, 2022

(65) Prior Publication Data

US 2022/0360474 A1 Nov. 10, 2022

Related U.S. Application Data

(63) Continuation of application No. 16/640,928, filed as application No. PCT/CN2018/101605 on Aug. 21, 2018, now Pat. No. 11,431,527.

(30) Foreign Application Priority Data

Aug. 21, 2017 (CN) .......................... 201710720425.3

(51) Int. Cl.
*H04W 72/04* (2023.01)
*H04L 25/02* (2006.01)
(Continued)

(52) U.S. Cl.
CPC ....... *H04L 25/0226* (2013.01); *H04B 1/7143* (2013.01); *H04L 5/0051* (2013.01);
(Continued)

(58) Field of Classification Search
CPC . H04L 25/0226; H04L 5/0051; H04L 5/0005; H04L 5/0057; H04L 5/0092;
(Continued)

(56) References Cited

U.S. PATENT DOCUMENTS

2009/0238241 A1  9/2009  Hooli
2009/0278742 A1  11/2009  Mehta
(Continued)

FOREIGN PATENT DOCUMENTS

CN  101777940 A  7/2010
CN  101777945 A  7/2010
(Continued)

OTHER PUBLICATIONS

Chinese Office Action for corresponding application 201710720425. 3: Report dated Apr. 2, 2021.
(Continued)

*Primary Examiner* — Mahbubul Bar Chowdhury
(74) *Attorney, Agent, or Firm* — CANTOR COLBURN LLP

(57) ABSTRACT

Provided are a reference signal sending method and device, a reference signal receiving method and device and a storage medium. The reference signal sending method includes: determining that frequency domain positions occupied by a reference signal satisfy a predetermined condition, where the predetermined condition includes: discontinuous frequency bands existing among the frequency domain positions occupied by the reference signal, and a union of the discontinuous frequency bands occupied by the reference signal is smaller than a frequency hopping bandwidth; and sending the reference signal at the determined frequency domain positions; wherein the frequency hopping bandwidth is a bandwidth determined according to two frequency domain positions with a largest distance among the fre-
(Continued)

quency domain positions occupied by the reference signal or a predetermined bandwidth acquired by receiving a first signaling message; and wherein each frequency band comprises a physical resource block (PRB).

20 Claims, 19 Drawing Sheets

(51) Int. Cl.
*H04B 1/7143* (2011.01)
*H04L 5/00* (2006.01)
*H04W 24/10* (2009.01)
*H04W 80/08* (2009.01)

(52) U.S. Cl.
CPC ........... *H04L 5/0092* (2013.01); *H04W 24/10* (2013.01); *H04W 80/08* (2013.01)

(58) Field of Classification Search
CPC ... H04L 5/0012; H04L 5/0048; H04B 1/7143; H04B 1/713; H04W 24/10; H04W 80/08
See application file for complete search history.

(56) References Cited

U.S. PATENT DOCUMENTS

| | | | |
|---|---|---|---|
| 2009/0316756 A1* | 12/2009 | Ro | H04B 7/0897 375/E1.033 |
| 2011/0134879 A1* | 6/2011 | Ogawa | H04L 5/0048 370/329 |
| 2011/0310931 A1 | 12/2011 | Mehta | |
| 2013/0070725 A1 | 3/2013 | Wang | |
| 2013/0156014 A1 | 6/2013 | Kim | |
| 2014/0146770 A1* | 5/2014 | Iwai | H04L 5/0051 370/329 |
| 2015/0110037 A1 | 4/2015 | Wu | |
| 2016/0205687 A1* | 7/2016 | Ouchi | H04W 74/006 370/329 |
| 2017/0346615 A1* | 11/2017 | Liu | H04L 5/0098 |
| 2019/0037562 A1* | 1/2019 | Park | H04L 5/0051 |
| 2020/0014515 A1 | 1/2020 | Qin | |
| 2020/0059384 A1 | 2/2020 | Zhang | |
| 2020/0220676 A1 | 7/2020 | Xu | |

FOREIGN PATENT DOCUMENTS

| | | |
|---|---|---|
| CN | 102378383 A | 3/2012 |
| CN | 102711263 A | 10/2012 |
| CN | 104022796 A | 9/2014 |
| CN | 108111279 A | 6/2018 |
| EP | 2154811 A2 | 2/2010 |
| EP | 2560449 A1 | 2/2013 |
| EP | 3010156 A1 | 5/2014 |

OTHER PUBLICATIONS

European Search Report for corresponding application EP 18 84 9239; Report dated Apr. 19, 2021.
International Search Report for corresponding application PCT/CN2018/101605 filed Aug. 21, 2018; dated Nov. 16, 2018.
NPL, R1-1611380, Further discussion for NR, CATT Nov. 14-18, 2016 (Year: 2016).
NPL, R1-1611808 Considerations on NR SRS design, LG Electronics, Nov. 14-18, 2016 (Year: 2016).
ZTE, "Discussion on SRS design for NR", 3GPP TSG RAN WG1 Meeting #89, Hangzhou, P.R. China May 15-19, 2017, R1-1707133.

* cited by examiner

REFERENCE SIGNAL SENDING AND RECEIVING METHODS, DEVICE AND STORAGE MEDIUM

CROSS-REFERENCES TO RELATED APPLICATIONS

This application is a continuation of U.S. application Ser. No. 16/640,928 filed on Feb. 21, 2020, which was filed as the US national stage of International Patent Application No. PCT/CN2018/101605 filed on Aug. 21, 2018 claiming priority to Chinese patent application No. 201710720425.3 filed on Aug. 21, 2017, the disclosures of all of which said applications are incorporated herein by reference in their entireties.

TECHNICAL FIELD

The present application relates to the field of communication and, in particular, relates to a reference signal sending method and device, a reference signal receiving method and device and a storage medium.

BACKGROUND

In Long Term Evolution (LTE), a sounding reference signal (SRS) is in a tree structure, as shown in FIG. 1, and the SRS has two sending modes, that is, frequency hopping and non-frequency hopping sending modes. In the New Radio (NR), when the bandwidth supported by the base station and the bandwidth supported by the terminal are different, such as 100 MHz supported by the base station and 1 MHz supported by the terminal, for the preferable bandwidth of 1 MHz for the terminal in the range of 100 MHz, 100 SRS time domain symbols are needed at least along with the frequency hopping mode of LTE, the time delay is too long, which is intolerable to the system. In NR, the frequency selection is further reduced based on beam transmission, and a new frequency hopping pattern solution needs to be considered.

In conclusion, the sending mode of SRS in LTE cannot well adapt to many requirements of NR, so the related improvement mode of SRS needs to be further considered to adapt to many requirements of NR.

SUMMARY

Embodiments of the present application provide a reference signal transmission method and device, a parameter sending method and device, a terminal and a base station so as to at least solve the problem in the related art that an SRS pattern in LTE cannot satisfy the requirements of NR.

An embodiment of the present application provides a reference signal transmission method. The method includes: determining that frequency domain positions occupied by a reference signal satisfy a predetermined condition, where the predetermined condition includes: discontinuous frequency bands existing among the frequency domain positions occupied by the reference signal; and transmitting the reference signal at the determined frequency domain positions.

An embodiment of the present application provides a reference signal transmission method. The method includes: receiving physical layer dynamic control signaling, where the physical layer dynamic control signaling carries parameter information for determining a frequency hopping pattern of a reference signal; determining the frequency hopping pattern of the reference signal according to the parameter information; and transmitting the reference signal according to the determined frequency hopping pattern.

An embodiment of the present application provides a reference signal transmission method. The method includes: determining transmission parameter information of a reference signal; and transmitting the reference signal according to the determined transmission parameter information; where the transmission parameter information includes at least one of the following parameters: information about frequency domain positions occupied by the reference signal, antenna port grouping information corresponding to the reference signal, or pattern information of the reference signal in the frequency domain positions.

An embodiment of the present application provides a parameter sending method. The method includes sending physical layer dynamic control signaling, where the physical layer dynamic control signaling carries parameter information for determining a frequency hopping pattern of a reference signal.

An embodiment of the present application provides a method for sending an uplink channel or signal. The method includes: determining rate matching information; determining whether the uplink channel or signal satisfies a predetermined condition; and in response to determining that the uplink channel or signal satisfies the predetermined condition, sending the uplink channel or signal according to the rate matching information; where the sent uplink channel or signal cannot occupy a resource comprised in the rate matching information.

An embodiment of the present application provides a reference signal transmission device. The device includes a determination module and a transmission module. The determination module is configured to determine that frequency domain positions occupied by a reference signal satisfy a predetermined condition, where the predetermined condition includes: discontinuous frequency bands existing among the frequency domain positions occupied by the reference signal. The transmission module is configured to transmit the reference signal at the determined frequency domain positions.

An embodiment of the present application provides a reference signal transmission device. The device includes a reception module, a determination module and a transmission module. The reception module is configured to receive physical layer dynamic control signaling, where the physical layer dynamic control signaling carries parameter information for determining a frequency hopping pattern of a reference signal. The determination module is configured to determine the frequency hopping pattern of the reference signal according to the parameter information. The transmission module is configured to transmit the reference signal according to the determined frequency hopping pattern.

An embodiment of the present application provides a reference signal transmission device. The device includes a determination module and a transmission module. The determination module is configured to determine transmission parameter information of a reference signal. The transmission module is configured to transmit the reference signal according to the determined transmission parameter information. The transmission parameter information includes at least one of: time domain frequency hopping unit information, grouping information of port groups, frequency domain repetition factor information corresponding to a frequency domain position, grouping information of reference signal resource groups, a relationship between reference signal resource group hopping and frequency domain hopping, or a relationship between port group hopping of the reference signal and the frequency domain hopping; where each of the reference signal resource groups includes one or more reference signal ports.

An embodiment of the present application provides a parameter sending device. The device includes a sending module configured to send physical layer dynamic control signaling, where the physical layer dynamic control signaling carries parameter information for determining a frequency hopping pattern of a reference signal.

An embodiment of the present application provides a device for sending an uplink channel or signal. The device includes a determination module and a sending module. The determination module is configured to determine rate matching information and determine whether the uplink channel or signal satisfies a predetermined condition. The sending module is configured to: in response to determining that the uplink channel or signal satisfies the predetermined condition, send the uplink channel or signal according to the rate matching information. The sent uplink channel or signal cannot occupy a resource comprised in the rate matching information.

An embodiment of the present application provides a terminal. The terminal includes a processor configured to execute a program which, when executed, implements any method described above.

An embodiment of the present application provides a base station. The base station includes a processor configured to execute a program which, when executed, implements any method described above.

An embodiment of the present application provides a storage medium. The storage medium includes a stored program which, when executed, implements any method described above.

An embodiment of the present application provides a processor. The processor is configured to execute a program which, when executed, implements any method described above.

With the present application, the determined frequency domain positions occupied by the reference signal satisfy the predetermined condition, where the predetermined condition includes: discontinuous frequency bands existing among the frequency domain positions occupied by the reference signal, so the reference signal can be transmitted at the determined frequency domain positions. Compared with the related art in which the frequency domain positions occupied by the reference signals are all continuous, the method can quickly locate the preferred frequency band and better adapt to the requirements of NR, and therefore the problem that the SRS pattern in LTE in the related art cannot satisfy the requirements of NR can be solved.

BRIEF DESCRIPTION OF DRAWINGS

The drawings described herein are used to provide a further understanding of the present application, and form a part of the present application. The exemplary embodiments and descriptions thereof in the present application are used to explain the present application, and do not limit the present application in any improper way. In the drawings.

DETAILED DESCRIPTION

The present application will be described hereinafter in detail with reference to the drawings and in combination with the embodiments. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

Embodiment One

Figure 3:
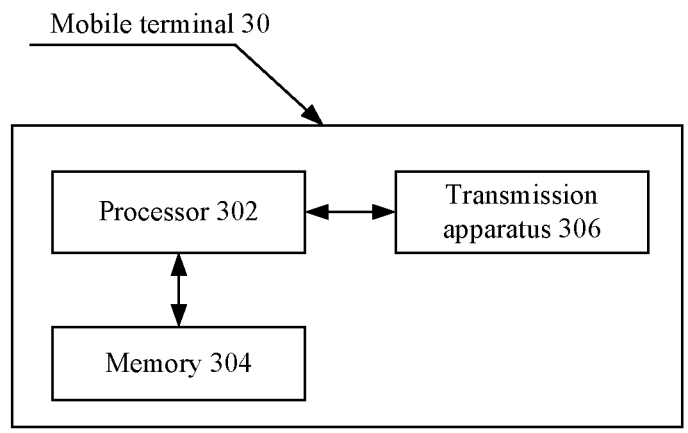
FIG. 3 is a block diagram illustrating hardware of a mobile terminal for a reference signal transmission method according to an embodiment of the present application.

The method embodiment provided by Embodiment one of the present application may be executed on a mobile terminal, a computer terminal or other similar computing apparatuses. An example is given below in which the method is executed in the mobile terminal. FIG. 3 is a block diagram illustrating hardware of a mobile terminal for a reference signal transmission method according to an embodiment of the present application. As shown in FIG. 3, a mobile terminal 30 may include one or more (merely one is shown in the figure) processors 302 (the processor 302 may include, but is not limited to, a processing apparatus such as a microcontroller unit (MCU) or a field programmable gate array (FPGA)), a memory 304 used for storing data, and a transmission apparatus 106 used for implementing a communication function. It should be understood by those skilled in the art that the structure shown in FIG. 3 is merely illustrative, and not intended to limit the structure of the electronic apparatus described above. For example, the mobile terminal 30 may further include more or fewer components than the components shown in FIG. 3, or may have a configuration different from the configuration shown in FIG. 3.

The memory 304 may be configured to store software programs and modules of application software, such as program instructions/modules corresponding to the reference signal transmission method in the embodiments of the present application. The processors 302 execute the software programs and modules stored in the memory 304 to perform various functional applications and data processing, that is, the method described above is implemented. The memory 304 may include a high-speed random access memory, and may further include a nonvolatile memory, such as one or more magnetic storage apparatuses, flash memories or other nonvolatile solid-state memories. In some examples, the memory 304 may further include memories that are remotely disposed with respect to the processors 302. These remote memories may be connected to the mobile terminal 30 via a network. Examples of such a network include, but are not limited to, the Internet, intranets, local area networks, mobile communication networks, and combinations thereof.

The transmission apparatus 306 is configured to receive or send data via a network. A specific example of the network described above may include a wireless network provided by a communication provider of the mobile terminal 30. In one example, the transmission apparatus 306 includes a network interface controller (NIC) that may be connected to other network devices through a base station to communicate with the Internet. In one example, the transmission apparatus 306 may be a radio frequency (RF) module for communicating wirelessly with the Internet.

In order to facilitate understanding of the technical solution of the embodiment of the present application, a frequency hopping mode in LTE is described below, and a frequency hopping pattern of LTE is obtained based on the following formula:

$$k_0^{(p)} = \overline{k}_0^{(p)} + \sum_{b=0}^{B_{SRS}} K_{TC} M_{sc,b}^{RS} n_b \quad (1)$$

$$M_{sc,b}^{RS} = m_{SRS,b} N_{sc}^{RB}/K_{TC} \quad (2)$$

for the SRS other than SRS over an Uplink Pilot Time Slot (UpPTS), $$\overline{k}_0^{(p)} = (\lfloor N_{RB}^{UL}/2 \rfloor - m_{SRS,0}/2) N_{SC}^{RB} + k_{TC}^{(p)} \quad (3)$$

for the SRS transmitted over the UpPTS, $$\bar{k}_0^{(p)} = \begin{cases} (N_{RB}^{UL} - m_{SRS,0}^{max})N_{sc}^{RB} + k_{TC}^{(p)} & \text{if } ((n_f \bmod 2) \cdot (2 - N_{SP}) + n_{hf}) \bmod 2 = 0 \\ k_{TC}^{(p)} & \text{otherwise} \end{cases} \quad (4)$$

$$k_{TC}^{(p)} = \begin{cases} 1 - \bar{k}_{TC} & \text{if } n_{SRS}^{cs} \in \{4, 5, 6, 7\} \text{ and } \bar{p} \in \{1, 3\} \text{ and } N_{ap} = 4 \\ \bar{k}_{TC} & \text{otherwise} \end{cases}$$

$$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases} \quad (5)$$

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \lfloor n_{SRS}/\prod_{b'=b_{hop}}^{b-1} N_{b'} \rfloor & \text{if } N_b \text{ odd} \end{cases} \quad (6)$$

in formula (6), $$N_{b_{hop}} = 1.$$

$$n_{SRS} \begin{cases} 2N_{SP}n_f + 2(N_{SP}-1)\lfloor \dfrac{n_s}{10} \rfloor + \lfloor \dfrac{T_{offset}}{T_{offset\_max}} \rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases}$$

Figure 1:
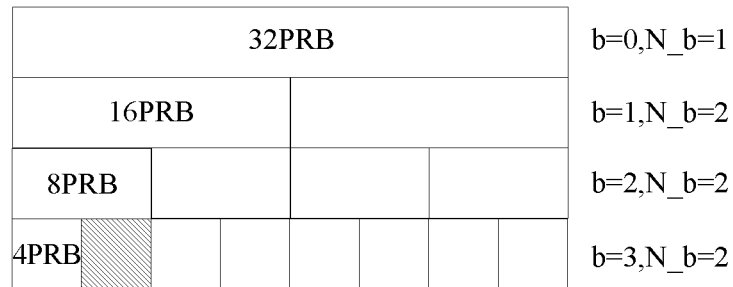
FIG. 1 is a schematic diagram illustrating a tree structure of an SRS in the related art.

$\bar{k}_{TC}$ is a comb offset, $k_{TC}$ is the total number of comb levels, i.e., repetition factor (RPF), $B_{SRS}$ is parameter information for determining a frequency domain bandwidth length occupied by an SRS on one time domain symbol, i.e., a tree structure level corresponding to the frequency domain bandwidth occupied by the SRS on one time domain symbol, $m_{SRS,b}$ can be obtained from a table according to a value of b, $n_{RRC}$ is frequency domain position information of the SRS and is a multiple of 4, $b_{hop}$ is frequency hopping range configuration, frequency hopping is performed when $b_{hop} < B_{SRS}$, otherwise, frequency hopping is not performed, $N_{RB}^{UL}$ is the number of PRBs corresponding to an uplink system bandwidth distributed to the terminal, $N_{SC}^{RB}$ is the number of subcarriers in one PRB and is 12, $n_f$ is a frame index, $n_{hf}$ is 0 in the first half of radio frame and 1 in the second half of radio frame, $N_{SP}$ is the number of special sub-frames in one radio frame, and $\bar{k}_{TC}$, $k_{TC}$, $B_{SRS}$,$n_{RRC}$ and $b_{hop}$ are each configured at a high layer. Specifically, in the tree structure shown in FIG. 1, there are totally four SRSs of different bandwidth lengths, which are 32PRB, 16PRB, 8PRB, 4PRB in sequence, the length of the diagonal line in FIG. 1 is a frequency domain position of 4PRB, and the corresponding frequency domain bandwidth indexes are $n_0=0$, $n_1=0$, $n_2=0$, $n_3=1$ with the frequency domain bandwidth levels being b=0, 1, 2, 3.

Figure 2:
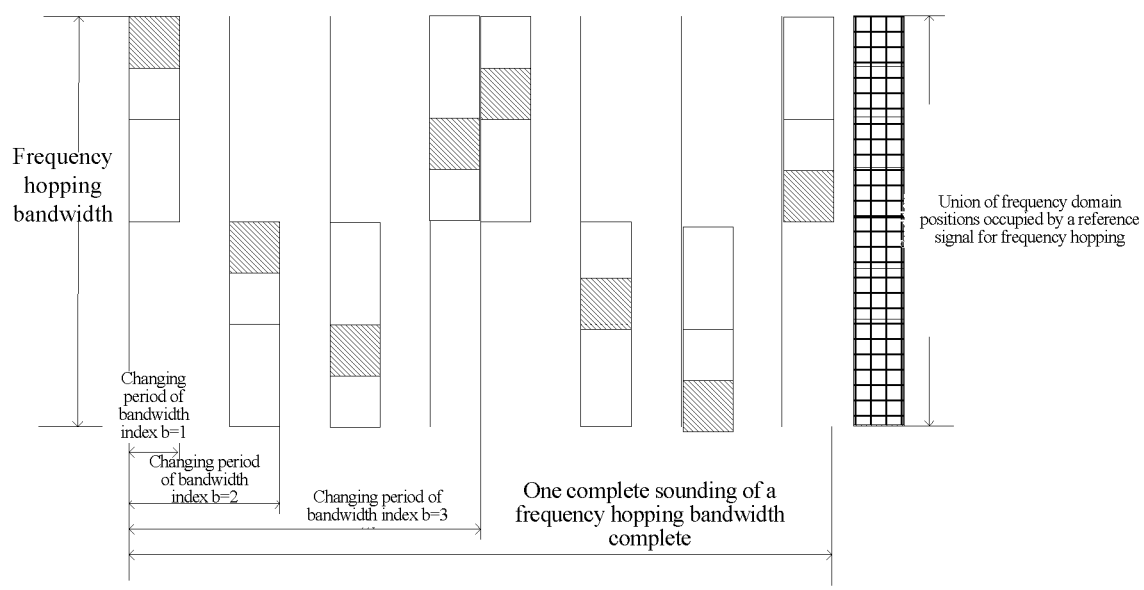
FIG. 2 is a schematic diagram illustrating a frequency hopping pattern in LTE.

Specifically, when $b_{hop}=0$, $B_{SRS}=3$, $n_{RRC}=0$ are configured to perform a complete frequency hopping, eight SRS time domain symbols are required. FIG. 2 is a schematic diagram illustrating a frequency hopping pattern in LTE. As shown in FIG. 2, the frequency domain position occupied by the SRS on the ninth time domain symbol is the same as the time domain symbol occupied by the SRS on the first time domain symbol in FIG. 2, and a frequency hopping period is formed by the eight time domain symbols shown in FIG. 2.

As can be seen from the above formulas and diagrams, in LTE, $b_{hop}$ is set, and then the UE will perform frequency hopping on the leaves at all bandwidth levels of $B_{SRS}$ included in one leaf of the corresponding tree structure of $b_{hop}$. That is, one complete frequency hopping requires $$\prod_{b=b_{hop}+1}^{B_{SRS}} N_b$$

time domain orthogonal frequency division multiplexing (OFDM) symbols.

Figure 4:
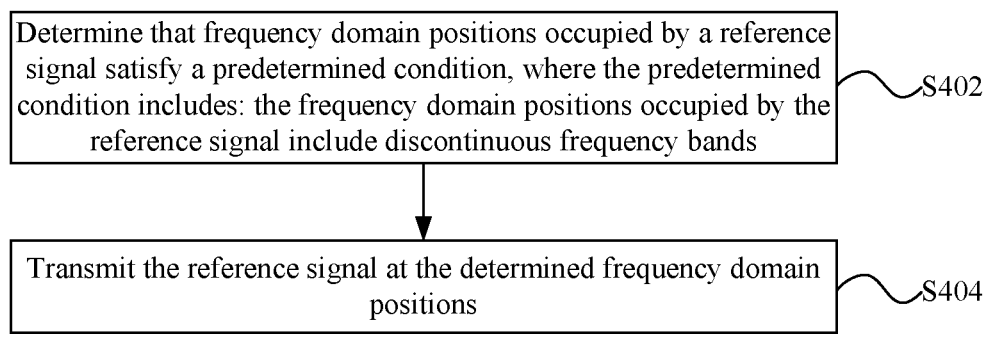
FIG. 4 is a flowchart one of a reference signal transmission method according to an embodiment of the present application.

The embodiment provides a reference signal transmission method executable on the mobile terminal described above and FIG. 4 is flowchart one of a reference signal transmission method according to an embodiment of the present application. As shown in FIG. 4, the process includes the steps described below.

In step S402, it is determined that frequency domain positions occupied by a reference signal satisfy a predetermined condition, where the predetermined condition includes: discontinuous frequency bands existing among the frequency domain positions occupied by the reference signal.

In step S404, the reference signal is transmitted at the determined frequency domain positions.

Through the above steps, the determined frequency domain positions occupied by the reference signal satisfy the predetermined condition, where the predetermined condition includes: discontinuous frequency bands existing among the frequency domain positions occupied by the reference signal, so the reference signal can be transmitted at the determined frequency domain positions. Compared with the related art in which the frequency domain positions occupied by the reference signals are all continuous, the method can quickly locate the preferred frequency band and better adapt to the requirements of NR, and therefore the problem that the SRS pattern in LTE in the related art cannot satisfy the requirements of NR can be solved.

It is to be noted that the discontinuous frequency bands existing among the frequency domain positions occupied by the reference signal may include at least one of: on one time domain symbol, the discontinuous frequency bands existing among the frequency domain positions occupied by the reference signal; in one frequency hopping period, the discontinuous frequency bands existing among the frequency domain positions occupied by the reference signal; or the discontinuous frequency bands existing among frequency domain positions occupied by the reference signal in a manner of frequency hopping.

It is to be noted that the above transmission pattern may include, but is not limited to, a frequency hopping pattern.

It is to be noted that the frequency hopping period satisfies at least one of the following characteristics: in different frequency hopping periods, a repeated frequency band existing among frequency domain positions occupied by the reference signal; in different frequency hopping periods, frequency domain positions occupied by the reference signal being the same; or a relationship item in a first mapping relationship and a relationship item in a second mapping relationship having a corresponding relationship, where the first mapping relationship is a mapping relationship between frequency domain positions occupied by the reference signal in a first frequency hopping period and a time domain parameter, and the second mapping relationship is a mapping relationship between frequency domain positions occupied by the reference signal in a second frequency hopping period and the time domain parameter.

It is to be noted that a frequency band may include at least one of: a physical resource block (PRB), a frequency domain subband, a bandwidth part, or a frequency domain bandwidth of a component carrier frequency.

It is to be noted that the above description is made by taking one frequency band including one PRB as an example. It is assumed that four PRBs exist, that is, PRB1, PRB2, PRB3 and PRB4. If the frequency domain positions occupied by the reference signal are PRB1, PRB3 and PRB4, or PRB1 and PRB3, etc., it is considered that discontinuous frequency bands exist among the frequency domain positions occupied by the reference signal, but the present application is not limited thereto.

In an embodiment of the present application, the predetermined condition may further include at least one of the following: a union of frequency bands occupied by the reference signal is smaller than or equal to a frequency hopping bandwidth; the reference signal hops on virtual frequency domain resources corresponding to physical frequency domain resources; frequency domain positions occupied by the reference signal in a manner of frequency hopping are distributed at equal intervals over the frequency hopping bandwidth; or the frequency domain positions occupied by the reference signal in the manner of frequency hopping are randomly distributed over the frequency hopping bandwidth; where the frequency hopping bandwidth is a bandwidth determined according to two frequency domain positions with the largest distance among the frequency domain positions occupied by the reference signal or a predetermined bandwidth acquired by receiving a first signaling message.

It is to be noted that the above description is made by taking one frequency band including one PRB as an example. It is assumed that four PRBs exist, that is PRB1, PRB2, PRB3 and PRB4. It is assumed that the frequency bands occupied by the reference signal are PRB1 and PRB3, and the union is PRB1 and PRB3; the frequency hopping bandwidth is the difference between the end frequency domain position of PRB4 and the original frequency domain position of PRB1, but is not limited thereto.

In an embodiment of the present application, in response to determining that frequency domain bandwidths of the reference signal have a plurality of levels, a frequency domain bandwidth index corresponding to the reference signal satisfies at least one of the following conditions: in response to determining that a frequency domain bandwidth level does not belong to a frequency hopping bandwidth level set of the reference signal, the frequency domain bandwidth index occupied by the reference signal is a fixed value; in response to determining that the frequency domain bandwidth level does not belong to the frequency hopping bandwidth level set of the reference signal, a frequency domain bandwidth index set corresponding to the reference signal is a proper subset of a frequency domain bandwidth index set corresponding to the frequency domain bandwidth level; or in response to determining that the frequency domain bandwidth level does not belong to the frequency hopping bandwidth level set of the reference signal, the frequency domain bandwidth index occupied by the reference signal changes with time and the frequency domain bandwidth index set corresponding to the reference signal is the proper subset of the frequency domain bandwidth index set corresponding to the frequency domain bandwidth level; where one frequency domain bandwidth with a frequency domain bandwidth level of (N−1) includes one or more frequency domain bandwidths with a frequency domain bandwidth level of N, one or more frequency domain bandwidths exist under one frequency domain bandwidth level, and the frequency domain bandwidth index is indexes of a plurality of frequency domain bandwidths with the frequency domain bandwidth level of N included by the one frequency domain bandwidth with the frequency domain bandwidth level of (N−1); where the frequency domain bandwidth index set corresponding to the frequency domain bandwidth level includes a set of indexes of all frequency domain bandwidths with the frequency domain bandwidth level of N included by the one frequency domain bandwidth with the frequency domain bandwidth level of (N−1) in the tree structure; where N is an integer greater than or equal to 1.

It is to be noted that the frequency domain bandwidth index set corresponding to the reference signal may also be referred to as the frequency domain bandwidth indexes occupied by the reference signal, but is not limited thereto.

It is to be noted that the frequency domain bandwidth indexes occupied by the reference signal may further satisfy at least one of the following: in response to determining that the frequency domain bandwidth level belongs to the frequency hopping bandwidth level set of the reference signal, the frequency domain bandwidth indexes occupied by the reference signal change with time; or in response to determining that the frequency domain bandwidth level belongs to the frequency hopping bandwidth level set of the reference signal, a frequency domain bandwidth index set of frequency hopping of the reference signal is a proper subset of the frequency domain bandwidth index set corresponding to the frequency domain bandwidth level.

It is to be noted that the frequency hopping bandwidth level set may satisfy at least one of the following: levels in the frequency hopping bandwidth level set are discontinuous; the maximum level in the frequency hopping bandwidth level set is smaller than or equal to a first level, where the first level is the maximum frequency domain bandwidth level among frequency domain bandwidth levels corresponding to the reference signal; the frequency hopping bandwidth level set may be an empty set; on one time domain symbol, the reference signal corresponds to more than two frequency hopping bandwidth level sets; or information about the frequency hopping bandwidth level set is carried in received signaling information.

It is to be noted that the frequency domain position occupied by the reference signal changes with time, so the frequency domain position changing with time may be embodied as a pattern, but is not limited thereto.

In an embodiment of the present application, the frequency domain positions k(t) occupied by the reference signal may be determined in the following manner:

$$k(t) = k_{org} + \sum_{b=0}^{B} N_{sc,b}^{RS} n_b(t);$$

$$n_b(t) = \begin{cases} n_{b,orig} \bmod N_b & b \notin b_{hopA} \\ \{F_b(t) + n_{b,orig}\} \bmod N_b & \text{otherwise} \end{cases};$$

$$F_b(t) = \begin{cases} (N_b/2) \left\lfloor \dfrac{t \bmod \prod_{b' \in b_{hopA}, b' \leq b} N_{b'}}{\prod_{b' \in b_{hopA}, b' \leq \max(b-1,0)} N_{b'}} \right\rfloor + \left\lfloor \dfrac{t \bmod \prod_{b' \in b_{hopA}, b' \leq b} N_{b'}}{2 \prod_{b' \in b_{hopA}, b' \leq \max(b-1,0)} N_{b'}} \right\rfloor & \text{if } N_b \text{ even} \\ \lfloor N_b/2 \rfloor \left\lfloor t / \prod_{b' \in b_{hopA}, b' \leq \max(b-1,0)} N_{b'} \right\rfloor & \text{if } N_b \text{ odd} \end{cases}.$$

t is a time parameter and is a real number greater than or equal to 0, b or b' is an index of a frequency domain bandwidth level corresponding to the reference signal among a plurality of frequency domain bandwidth levels and is equal to 0, 1, . . . , B, B is the maximum frequency domain bandwidth level among frequency domain bandwidth levels corresponding to the reference signal and is a non-negative integer, $N_b$ is the number of bandwidths with a frequency domain bandwidth level indexed by b included by one bandwidth with a frequency domain bandwidth level indexed by max (b−1, 0), $N_{b'}$ is the number of bandwidths with a frequency domain bandwidth level indexed by b' included by one bandwidth with a frequency domain bandwidth level indexed by max (b'−1, 0), max ( ) is a function taking the maximum value, $n_{b,orig}$ is an original frequency domain bandwidth index of the reference signal with the frequency domain bandwidth level indexed by b, $n_b(t)$ is a frequency domain bandwidth index corresponding to the reference signal with the frequency domain bandwidth level indexed by b at time t, $k_{org}$ is a non-negative integer, $N_{sc,b}^{RS}$ is a frequency domain length corresponding to one bandwidth with the frequency domain bandwidth level indexed by b, Π is a multiplication operation, mod is a remainder function, and $b_{hopA}$ is a frequency domain bandwidth level set.

It is to be noted that before the step S402, the method may further include: acquiring at least one of the following parameters through second signaling information and/or an agreed table manner: B, $N_b$, $N_{b,orig}$, $k_{org}$, $N_{sc,b}^{RS}$, $b_{hopA}$, $h_{hopA\_min}$, or $b_{hopA\_max}$; where $b_{hopA} = \{b, b_{hopA\_min} \leq b \leq b_{hopA\_max}\}$, and $b_{hopA\_min}$ and $b_{hopA\_max}$ are non-negative integers, or $b_{hopA\_min}$ and $b_{hopA\_max}$ are non-negative integers less than B.

It is to be noted that $b_{hopA}$ satisfies at least one of the following: max($b_{hopA}$)≤B; $b_{hopA}$ includes indexes of discontinuous frequency domain bandwidth levels; $b_{hopA}$ may be an empty set; or on one time domain symbol, the reference signal corresponds to more than two $b_{hopA}$ s.

In an embodiment of the present embodiment, in response to determining that frequency domain bandwidths of the reference signal have a plurality of levels, the method may further include: receiving a second signaling message, where the second signaling message includes at least one of the following information: a frequency domain bandwidth index set of hopping of the reference signal at each frequency domain bandwidth level or a frequency domain bandwidth index set of the hopping of the reference signal in a frequency hopping bandwidth level set; where one frequency domain bandwidth with a frequency domain bandwidth level of (N−1) includes one or more frequency domain bandwidths with a frequency domain bandwidth level of N, and one or more frequency domain bandwidths exist under one frequency domain bandwidth level, where N is an integer greater than or equal to 1.

In an embodiment of the present application, in response to determining that frequency domain bandwidths of the reference signal have a plurality of levels, the reference signal may satisfy at least one of the following characteristics. The levels of the frequency domain bandwidths of the reference signal are divided into a plurality of frequency domain bandwidth level groups, where different frequency domain bandwidth level groups correspond to different relationships. The relationships include at least one of: a mapping relationship between frequency domain bandwidth indexes corresponding to the reference signal and a time domain parameter, or a relationship between a frequency domain bandwidth index set corresponding to the reference signal with one frequency domain bandwidth level and all frequency domain bandwidth index sets corresponding to the one frequency domain bandwidth level. On one time domain symbol, the reference signal corresponds to more than two frequency domain bandwidth indexes under one frequency domain bandwidth level. The reference signal corresponds to information about more than two original frequency domain bandwidth levels; the reference signal corresponds to information about more than two end frequency domain bandwidth levels. The reference signal firstly performs frequency domain bandwidth hopping in a frequency domain bandwidth group, and then performs frequency domain bandwidth hopping among frequency domain bandwidth groups; where one of the frequency domain bandwidth groups is a frequency domain bandwidth group formed by one or more frequency domain bandwidths among a plurality of frequency domain bandwidths with a frequency domain bandwidth level of N included by one frequency domain bandwidth with a frequency domain bandwidth level of (N−1) corresponding to the reference signal.

In an embodiment of the present application, in response to determining that frequency domain bandwidths of the reference signal have a plurality of levels, the method further includes: receiving a third signaling message, where the third signaling message is configured for determining whether the reference signal hops in a frequency domain bandwidth group.

It is to be noted that the step of receiving the third signaling message may be performed before or after the step S402, but is not limited thereto.

In an embodiment of the present application, the frequency domain positions k(t) occupied by the reference signal may be determined in a following manner:

$$k(t) = k_{org} + \sum_{b=0}^{B} N_{sc,b}^{RS} n_b(t);$$

$$n_b(t) = \begin{cases} n_{b,orig} \bmod N_b & b \notin b_{hopA} \\ \{F_b(t) + n_{b,orig}\} \bmod N_b & \text{otherwise} \end{cases};$$

$$F_b(t) = (x_b) \left\lfloor \frac{t \bmod \prod_{b' \in b_{hopA}, b' \le b} N_{b'}}{\prod_{b' \in b_{hopA}, b' \le max(b-1,0)} N_{b'}} \right\rfloor + \sum_{l=1}^{x_b-1} \beta_b(l) \left\lfloor \frac{t \bmod \prod_{b' \in b_{hopA}, b' \le b} N_{b'}}{\sum_{l'=0}^{l-1} [(k_b - \alpha_{l'}) \prod_{b' \in b_{hopA}, b' \le max(b-1,0)} N_{b'}]} \right\rfloor$$

$$\alpha_{l'} = \begin{cases} 0, & l' \le (N_b \bmod x_b) \\ 1, & \text{otherwise} \end{cases}.$$

t is a time parameter and is a real number greater than or equal to 0. b or b' is an index of a frequency domain bandwidth level corresponding to the reference signal among a plurality of frequency domain bandwidth levels and is equal to 0, 1, ..., B, B is the maximum frequency domain bandwidth level among frequency domain bandwidth levels corresponding to the reference signal and is a non-negative integer, Nb is the number of bandwidths with a frequency domain bandwidth level indexed by b included by one bandwidth with a frequency domain bandwidth level indexed by max (b−1, 0), $N_{b'}$ is the number of bandwidths with a frequency domain bandwidth level indexed by b' included by one bandwidth with a frequency domain bandwidth level indexed by max (b'−1, 0), max ( ) is a function taking the maximum value, $n_{b,orig}$ is an original frequency domain bandwidth index of the reference signal with the frequency domain bandwidth level indexed by b, $n_b(t)$ is a frequency domain bandwidth index corresponding to the reference signal with the frequency domain bandwidth level indexed by b at time t, $k_{org}$ is a non-negative integer, $N_{sc,b}^{RS}$ is a frequency domain length corresponding to one bandwidth with the frequency domain bandwidth level indexed by b, Π is a multiplication operation, mod is a remainder function, $b_{hopA}$ is a frequency domain bandwidth level set, $x_b$ and $k_b$ are natural numbers less than or equal to $N_b$, and $\beta_b(l) \in \{0, 1, \ldots, x_b-1\}$.

It is to be noted that the method may further include: acquiring at least one of the following parameters: $\beta_b(l)$, $k_b$, or $x_b$ by receiving a fourth signaling message or in an agreed rule manner.

It is to be noted that the step of receiving the fourth signaling message may be performed before the step S402, but is not limited thereto.

Figure 5:
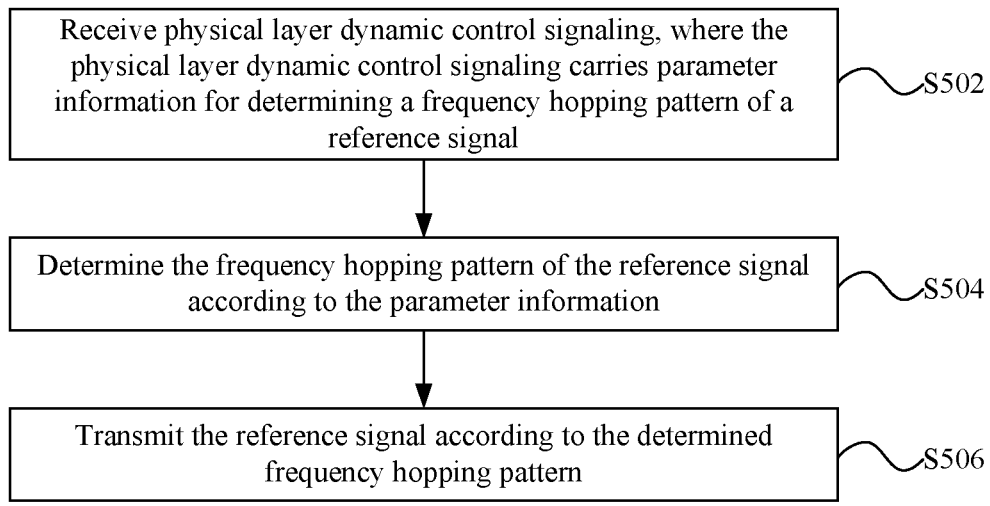
FIG. 5 is a flowchart two of a reference signal transmission method according to an embodiment of the present application.

An embodiment of the present application further provides a reference signal transmission method executable on the mobile terminal. FIG. 5 is flowchart two of a reference signal transmission method according to an embodiment of the present application. The method includes steps described below.

In step S502, physical layer dynamic control signaling is received, where the physical layer dynamic control signaling carries parameter information for determining a frequency hopping pattern of a reference signal.

In step S504, the frequency hopping pattern of the reference signal is determined according to the parameter information.

In step S506, the reference signal is transmitted according to the determined frequency hopping pattern.

Through the above steps, the frequency hopping pattern of the reference signal can be determined in such a manner that the physical layer dynamic control signaling carrying the parameter information for determining the frequency hopping pattern of the reference signal. Compared with the related art in which the physical layer dynamic control signaling is not supported to carry parameter information for determining the frequency hopping pattern of the reference signal, the method implements the support for physical layer dynamic control signaling to carry information related to the frequency hopping pattern, so that the requirement of NR can be better satisfied, and the problem that the SRS pattern in LTE in the related art cannot satisfy the requirement of NR can be solved.

It is to be noted that the physical layer dynamic control signaling is included in a physical layer control channel, and/or the information in the physical layer dynamic control signaling may change dynamically at each time unit.

It is to be noted that the physical layer dynamic control signaling carries all parameter information or part of parameter information for determining the frequency hopping pattern of the reference signal.

In an embodiment of the present application, the method may further include: receiving high-layer signaling, where the high-layer signaling carries parameter information for determining the frequency hopping pattern of the reference signal, and a union of the parameter information carried in the high-layer signaling and the parameter information carried in the physical layer dynamic control signaling is the all parameter information. Further, the network side may configure several frequency hopping parameter sets through high-layer signaling, and notify the terminal of the indexes of the frequency hopping parameter sets through dynamic control signaling.

It is to be noted that the parameters carried in the physical layer dynamic control signaling may be the same as, partially the same as, or completely different from the parameters carried in the high-layer signaling, as long as the union of the parameters carried in the physical layer dynamic control signaling and the parameters carried in the high-layer signaling may be all parameters used for determining the frequency hopping pattern of the reference signal.

It is to be noted that the parameter information for determining the frequency hopping pattern of the reference signal includes at least one of: information about a frequency hopping bandwidth level set, information about a frequency hopping bandwidth original level, information about a frequency hopping bandwidth end level, a frequency domain bandwidth level at which a frequency domain bandwidth occupied by the reference signal on one time domain symbol is located, the maximum value of frequency domain bandwidth levels corresponding to the reference signal, information about the number of frequency hopping periods, information about the number of time domain symbols occupied by the reference signal, information about a reference signal period, information about a reference signal period offset, index information about a time domain symbol occupied by the reference signal in a time unit, information about the number of time domain symbols occupied by the reference signal in the time unit, time domain frequency hopping unit information about the reference signal, information about the number of ports corresponding to the reference signal, information about the number of port groups of the reference signal, reference signal port group hopping pattern information, index information about a reference signal frequency hopping parameter set, a relationship between reference signal resource group hopping and frequency domain hopping, a relationship between port group hopping and the frequency domain hopping, an original frequency domain position occupied by the reference signal, an amount of frequency domain hopping of the reference signal, a frequency domain interval between frequency domain positions corresponding to adjacent frequency domain hopping, and a function type that frequency domain positions occupied by the reference signal change with time, frequency domain bandwidth index set information corresponding to the reference signal at a frequency domain bandwidth level, frequency hopping frequency band set information of the reference signal, whether the reference signal is in a continuous frequency domain frequency hopping mode or a discontinuous frequency domain frequency hopping mode, frequency domain bandwidth level grouping information, information for indicating whether a frequency domain bandwidth level group is subjected to frequency hopping, frequency domain bandwidth grouping information, information about whether a frequency domain bandwidth group is subjected to the frequency hopping, or information about a frequency hopping sequence of frequency domain bandwidth groups; where the time domain frequency hopping unit information includes that the reference signal hops every other time domain frequency hopping unit, and frequency domain positions of the reference signal in one time domain frequency hopping unit are unchanged.

It is to be noted that the reference signal may correspond to a plurality of pieces of frequency hopping bandwidth original level information on a time domain symbol, or the reference signal may correspond to a plurality of pieces of frequency hopping bandwidth end level information on a time domain symbol, or the reference signal may correspond to a plurality of frequency domain bandwidth levels at which the frequency domain bandwidth occupied by the reference signal on a time domain symbol is located on a time domain symbol, or the reference signal may correspond to a plurality of maximum values of the frequency domain bandwidth levels to which the reference signal corresponds on a time domain symbol, but the present application is not limited thereto. Thus, the reference information may include, but is not limited to, the plurality of pieces of frequency hopping bandwidth original level information, or the plurality of frequency hopping bandwidth end level information, or the plurality of frequency domain bandwidth levels at which the frequency domain bandwidth occupied by the reference signal is located on a time domain symbol, or the plurality of maximum values of the frequency domain bandwidth levels to which the reference signal corresponds on a time domain symbol.

It is to be noted that the time domain frequency hopping unit information may further include at least one of: information about the number of time domain symbols or information about the number of time units occupied by time domain symbols.

In an embodiment of the present application, the method may further include at least one of: a time domain resource occupied by the reference signal triggered by the physical layer dynamic control signaling being a subset of time domain resources occupied by a reference signal triggered by first control signaling; in response to determining that the reference signal triggered by the physical layer dynamic control signaling and the reference signal triggered by the first control signaling occupy a same time domain symbol, merely transmitting the reference signal triggered by the physical layer dynamic control signaling, and discarding the reference signal triggered by the first control signaling; no discontinuous frequency band existing among frequency domain positions occupied by the reference signal triggered by the physical layer dynamic control signaling, and discontinuous frequency bands existing among frequency domain positions occupied by the reference signal triggered by the first control signaling; a frequency hopping bandwidth level set corresponding to the reference signal triggered by the physical layer dynamic control signaling belonging to a first set, and a frequency hopping bandwidth level set corresponding to the reference signal triggered by the first control signaling belonging to a second set; determining a transmission parameter of the reference signal triggered by the physical layer dynamic control signaling according to a transmission parameter and a time parameter of the reference signal for transmission triggered by the first control signaling; or determining a transmission parameter configuration range of the reference signal triggered by the physical layer dynamic control signaling according to transmission parameter configuration information of the reference signal for transmission triggered by the first control signaling; where the first control signaling includes at least one of: high-layer control signaling, or control signaling closest to the physical layer dynamic control signaling in transmission time.

It is to be noted that all or part of parameters in the parameter information carried in the high-layer signaling may be suitable for the reference signal triggered by the physical layer dynamic control signaling and may also be suitable for the reference signal triggered by the high-layer signaling.

It is to be noted that the step of determining a transmission pattern of the reference signal triggered by the physical layer dynamic control signaling according to a transmission parameter and a time parameter of the reference signal for transmission triggered by the high-layer signaling may be embodied as: determining the transmission pattern of the reference signal triggered by the physical layer dynamic control signaling by using a transmission parameter of the reference signal for transmission triggered by physical layer dynamic control signaling and a transmission parameter and a time parameter of the reference signal for transmission triggered by high-layer signaling, but is not limited thereto.

Figure 6:
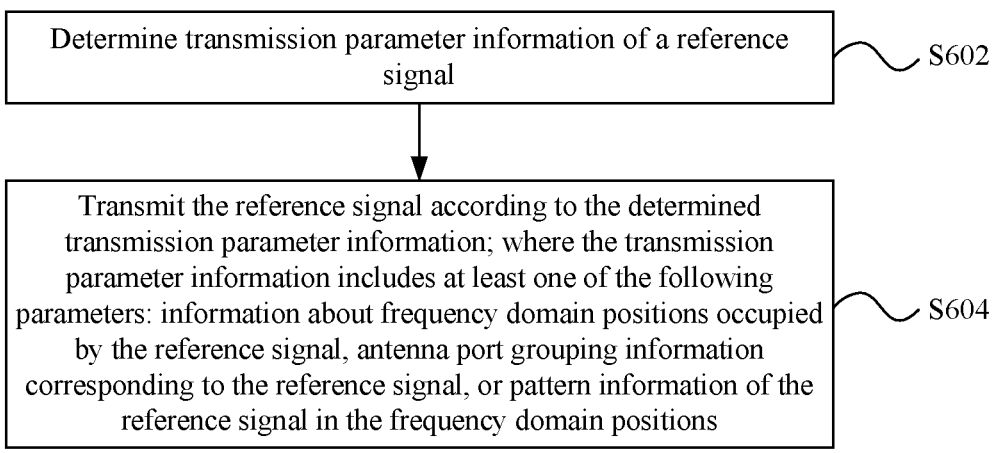
FIG. 6 is a flowchart three of a reference signal transmission method according to an embodiment of the present application.

An embodiment of the present application further provides a reference signal transmission method executable on the mobile terminal or the base station. FIG. 6 is flowchart three of a reference signal transmission method according to an embodiment of the present application. The method includes steps described below.

In step S602, transmission parameter information of a reference signal is determined.

In step S604, the reference signal is transmitted according to the determined transmission parameter information; where the transmission parameter information includes at least one of the following parameters: information about frequency domain positions occupied by the reference signal, antenna port grouping information corresponding to the reference signal, or pattern information of the reference signal in the frequency domain positions.

Through the above steps, the transmission parameter information of the reference signal can be obtained, so that the requirement of NR can be better adapted to, and the problem that the SRS pattern in LTE in the related art cannot satisfy the requirement of NR can be solved.

It is to be noted that the transmission parameter information includes at least one of the following information: time domain frequency hopping unit information, grouping information of port groups, frequency domain repetition factor information corresponding to a frequency domain position, grouping information of reference signal resource groups, a relationship between reference signal resource group hopping and frequency domain hopping, a relationship between port group hopping of the reference signal and the frequency domain hopping, frequency hopping bandwidth level set information, frequency hopping bandwidth end level information, a frequency domain bandwidth level at which a frequency domain bandwidth occupied by the reference signal on one time domain symbol is located, the maximum value of frequency domain bandwidth levels corresponding to the reference signal, information about the number of frequency hopping periods, index information about a time domain symbol occupied by the reference signal in a time unit, information about the number of time domain symbols occupied by the reference signal in the time unit, reference signal port group hopping pattern information, an original frequency domain position occupied by the reference signal, an amount of frequency domain hopping of the reference signal, a frequency domain interval between frequency domain positions corresponding to adjacent frequency domain hopping, a function type that frequency domain positions occupied by the reference signal change with time, frequency domain bandwidth index set information corresponding to the reference signal at a frequency domain bandwidth level, frequency hopping frequency band set information of the reference signal, whether the reference signal is in a continuous frequency domain frequency hopping mode or a discontinuous frequency domain frequency hopping mode, frequency domain bandwidth level grouping information, information for indicating whether a frequency domain bandwidth level group is subjected to frequency hopping, frequency domain bandwidth grouping information, information about whether a frequency domain bandwidth group is subjected to the frequency hopping, or information about a frequency hopping sequence of frequency domain bandwidth groups; where each of the reference signal resource groups includes one or more reference signal ports, and the time domain frequency hopping unit information includes that the reference signal hops every other time domain frequency hopping unit and frequency domain positions of the reference signal in one time domain frequency hopping unit are unchanged.

It is to be noted that the reference signal transmitting time on different port groups of the reference signal are different.

Antenna port information of a measurement reference signal is acquired according to port group information of the measurement reference signal.

It is to be noted that the time domain frequency hopping unit information may include that the reference signal hops every other time domain frequency hopping unit and the frequency domain positions of the reference signal in the one time domain frequency hopping unit are unchanged; and/or different frequency domain positions correspond to different repetition factors.

It is to be noted that a frequency domain resource occupied by the measurement reference signal is obtained according to a following formula:

$$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} (N_b/2)\left\lfloor \dfrac{n_{SRS} \bmod \prod_{b'=b_{hop}}^{b} N_{b'}}{T_1 \prod_{b'=b_{hop}}^{b-1} N_{b'}} \right\rfloor + \left\lfloor \dfrac{n_{SRS} \bmod \prod_{b'=b_{hop}}^{b} N_{b'}}{2T_1 \prod_{b'=b_{hop}}^{b-1} N_{b'}} \right\rfloor, & \text{if } N_b \text{ even} \\ \lfloor N_b/2 \rfloor \left\lfloor n_{SRS}/T_1 \prod_{b'=b_{hop}}^{b-1} N_{b'} \right\rfloor, & \text{if } N_b \text{ odd} \end{cases}$$

$T_1$ is the time domain frequency hopping unit information; the time domain frequency hopping unit information is the number of time domain symbols occupied by the measurement reference signal, where the time domain symbols include time domain symbols in one time unit and/or time domain symbols in a plurality of time units.

The time domain frequency hopping unit information includes at least one of the following information: period information of the measurement reference signal or information about the number of time domain symbols included in a period of the measurement reference signal.

It is to be noted that a measurement reference signal satisfies one of the following characteristics: information about frequency domain positions occupied by the measurement reference signal including tree structure information $C_{SRS}$, where $C_{SRS}$ is included in specific control signaling; antenna port information of the measurement reference signal being acquired according to measurement reference signal resource group information; the antenna port information of the measurement reference signal being acquired according to resource information of the measurement reference signal; or the antenna port information of the measurement reference signal being acquired according to port group information of the measurement reference signal.

It is to be noted that a corresponding relationship exists between a time domain frequency hopping unit corresponding to the time domain frequency hopping unit information and the number of time domain symbols occupied by the reference signal in one time unit; in response to determining that the grouping information of the port groups may include the number of port groups, a corresponding relationship exists between the time domain frequency hopping unit and the number of port groups; and in response to determining that the grouping information of the port groups may include the number of port groups, a corresponding relationship exists between the number of port groups and the number of time domain symbols occupied by the reference signal in the one time unit.

It is to be noted that in one frequency hopping period, time domain frequency hopping unit information of the reference signal is different at different time.

In an embodiment of the present application, the transmission parameter information may further include a corresponding relationship between a time domain frequency hopping unit and time.

It is to be noted that a relationship between reference signal resource group hopping and frequency domain hopping may include one of: the reference signal resource group hopping being earlier than the frequency domain hopping, the reference signal resource group hopping and the frequency domain hopping being performed simultaneously, or the frequency domain hopping being earlier than the reference signal resource group hopping.

It is to be noted that a relationship between port group hopping and frequency domain hopping includes one of: the port group hopping being earlier than the frequency domain hopping, the frequency domain hopping being earlier than the port group hopping, or the port group hopping and the frequency domain hopping being performed simultaneously.

It is to be noted that the transmission parameter information may be included in at least one of the following control signaling: physical layer dynamic control signaling or high-layer control signaling.

It is to be noted that the high-layer control signaling may be, but is not limited to, RRC control signaling or MAC CE control signaling.

It is to be noted that the execution subject of the steps of the methods described in FIGS. 4 and 5 may be, but is not limited to, a terminal, such as a mobile terminal, and the execution subject of the steps of the method described in FIG. 6 may be, but is not limited to, a base station or a terminal.

It is to be noted that the embodiment shown in FIG. 4, the embodiment shown in FIG. 5, and the embodiment shown in FIG. 6 may be combined with each other, and are not limited thereto.

An embodiment of the present application further provides a parameter sending method applied to a base station. The method includes sending physical layer dynamic control signaling, where the physical layer dynamic control signaling carries parameter information for determining a frequency hopping pattern of a reference signal.

It is to be noted that the physical layer dynamic control signaling carries all parameter information or part of parameter information for determining the frequency hopping pattern of the reference signal.

In an embodiment of the present application, the method may further include: sending high-layer signaling, where the high-layer signaling carries parameter information for determining the frequency hopping pattern of the reference signal, and a union of the parameter information carried in the high-layer signaling and the parameter information carried in the physical layer dynamic control signaling is the all parameter information.

It is to be noted that physical layer dynamic control signaling and high-layer signaling may be sent simultaneously, or that physical layer dynamic control signaling may be sent before high-layer signaling, or that high-layer signaling may be sent before physical layer dynamic control signaling, but the present application is not limited thereto.

It is to be noted that the parameter information for determining the frequency hopping pattern of the reference signal may include at least one of: information about a frequency hopping bandwidth level set, information about a frequency hopping bandwidth original level, information about a frequency hopping bandwidth end level, a frequency domain bandwidth level of a frequency domain bandwidth occupied by the reference signal on one time domain symbol, the maximum value of frequency domain bandwidth levels corresponding to the reference signal, information about the number of frequency hopping periods, information about the number of time domain symbols occupied by the reference signal, information about a reference signal period, information about a reference signal period offset, index information about a time domain symbol occupied by the reference signal in a time unit, information about the number of time domain symbols occupied by the reference signal in the time unit, time domain frequency hopping unit information about the reference signal, information about the number of ports corresponding to the reference signal, information about the number of port groups of the reference signal, reference signal port group hopping pattern information, index information about a reference signal frequency hopping parameter set, a relationship between reference signal resource group hopping and frequency domain hopping, a relationship between port group hopping and the frequency domain hopping, an original frequency domain position occupied by the reference signal, an amount of frequency domain hopping of the reference signal, a frequency domain interval between frequency domain positions corresponding to adjacent frequency domain hopping, a function type that frequency domain positions occupied by the reference signal change with time, frequency domain bandwidth index set information corresponding to the reference signal at a frequency domain bandwidth level, frequency hopping band set information of the reference signal, whether the reference signal is in a continuous frequency domain frequency hopping mode or a discontinuous frequency domain frequency hopping mode, frequency domain bandwidth level grouping information, information about whether a frequency domain bandwidth level group is subjected to frequency hopping, frequency domain bandwidth grouping information, information about whether a frequency domain bandwidth group is subjected to the frequency hopping, or information about a frequency hopping sequence of frequency domain bandwidth groups; where the time domain frequency hopping unit information includes that the reference signal hops every other time domain frequency hopping unit, and frequency domain positions of the reference signal in one time domain frequency hopping unit are unchanged.

It is to be noted that the execution subject in the embodiment may be, but is not limited to, a base station.

An embodiment of the present application further provides a method for sending an uplink channel or signal. The method includes: determining rate matching information; determining whether the uplink channel or signal satisfies a predetermined condition; and in response to determining that the uplink channel or signal satisfies the predetermined condition, sending the uplink channel or signal according to the rate matching information; where the sent uplink channel or signal cannot occupy a resource included in the rate matching information.

It is to be noted that in response to determining that the uplink channel or signal does not satisfy the predetermined condition, the resource included in the rate matching information is available for the uplink channel or signal.

It is to be noted that the predetermined condition includes at least one of the following conditions.

The uplink channel or signal is a periodic channel or signal.

The uplink channel or signal is a semi-persistent channel or signal.

The uplink channel or signal is not a channel or signal scheduled by physical layer dynamic control signaling.

It is to be noted that the resource included in the rate matching information includes at least one of the following resources: a time domain resource, a frequency domain resource, a reference signal resource, a port resource, a spatial domain resource, or uplink measurement reference signal resource pool information.

It is to be noted that the sent uplink signal is an uplink measurement reference signal in a frequency hopping state, and in response to determining that a resource of the uplink measurement reference signal and the resource included in the rate matching information overlap, at least one of the following operations is performed.

The uplink measurement reference signal is not sent on the resource included in the rate matching information.

A frequency domain position at which the uplink measurement reference signal is required to be sent on a frequency domain resource included in the rate matching information is postponed to a next frequency hopping opportunity of the uplink measurement reference signal.

The current frequency hopping reference signal is not sent, and current frequency hopping is discarded.

The frequency domain position required to be occupied by the uplink measurement reference signal for the current frequency hopping is postponed to a next frequency hopping resource.

From the description of the embodiments described above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solution provided by the present application substantially, or the part contributing to the existing art, may be embodied in the form of a software product. The computer software product is stored on a storage medium (such as a read-only memory (ROM)/random access memory (RAM), a magnetic disk or an optical disk) and includes several instructions for enabling a terminal device (which may be a mobile phone, a computer, a server or a network device) to execute the methods according to the embodiments of the present application.

Embodiment One

The embodiment further provides a reference signal transmission device configured to implement the above-mentioned embodiments and preferred embodiments. What has been described will not be repeated. As used below, the term "module" may be implemented by a combination of software and/or hardware that enables predetermined functions. The device described below is preferably implemented by software, but implementation by software or a combination of software and hardware is also possible and conceived.

Figure 7:
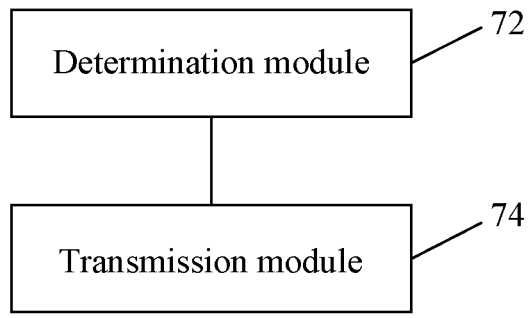
FIG. 7 is a block diagram one illustrating a reference signal transmission device according to an embodiment of the present application.

FIG. 7 is block diagram one illustrating a reference signal transmission device according to an embodiment of the present application. As shown in FIG. 7, the device includes a determination module 72 and a transmission module 74.

The determination module 72 is configured to determine that frequency domain positions occupied by a reference signal satisfy a predetermined condition, where the predetermined condition includes: the frequency domain positions occupied by the reference signal include discontinuous frequency bands.

The transmission module 74 is connected to the determination module 72 and is configured to transmit the reference signal at the determined frequency domain positions.

Through the above device, the determined frequency domain positions occupied by the reference signal satisfy the predetermined condition, where the predetermined condition includes: the frequency domain positions occupied by the reference signal include discontinuous frequency bands, so the reference signal can be transmitted at the determined frequency domain positions. Compared with the related art in which the frequency domain positions occupied by the reference signals are all continuous, the method can quickly locate the preferred frequency band and better adapt to the requirements of NR, and therefore the problem that the SRS pattern in LTE in the related art cannot satisfy the requirements of NR can be solved.

It is to be noted that the frequency domain positions occupied by the reference signal including discontinuous frequency bands may include at least one of: on one time domain symbol, the frequency domain positions occupied by the reference signal including discontinuous frequency bands; in one frequency hopping period, the frequency domain positions occupied by the reference signal including discontinuous frequency bands; or frequency domain positions occupied by the reference signal in a manner of frequency hopping including discontinuous frequency bands.

It is to be noted that the above transmission pattern may include, but is not limited to, a frequency hopping pattern.

It is to be noted that the frequency hopping period satisfies at least one of the following characteristics. In different frequency hopping periods, a repeated frequency band exists among frequency domain positions occupied by the reference signals. In different frequency hopping periods, frequency domain positions occupied by the reference signal are the same. A relationship item in a first mapping relationship and a relationship item in a second mapping relationship have a corresponding relationship, where the first mapping relationship is a mapping relationship between frequency domain positions occupied by the reference signal in a first frequency hopping period and a time domain parameter, and the second mapping relationship is a mapping relationship between frequency domain positions occupied by the reference signal in a second frequency hopping period and the time domain parameter.

It is to be noted that a frequency band may include at least one of: a physical resource block (PRB), a frequency domain subband, a bandwidth part, or a frequency domain bandwidth of a component carrier frequency.

It is to be noted that the above description is made by taking one frequency band including one PRB as an example. It is assumed that one frequency band includes four PRBs, that is, PRB1, PRB2, PRB3 and PRB4. If the frequency domain positions occupied by the reference signal are PRB1, PRB3 and PRB4, or PRB1 and PRB3, etc., discontinuous frequency bands are considered to exist among the frequency domain positions occupied by the reference signal, but the present application is not limited thereto.

In an embodiment of the present application, the predetermined condition may further include at least one of the following: a union of frequency bands occupied by the reference signal is smaller than or equal to a frequency hopping bandwidth; the reference signal hops on virtual frequency domain resources corresponding to physical frequency domain resources; frequency domain positions occupied by the reference signal in a manner of frequency hopping are distributed at equal intervals over the frequency hopping bandwidth; or the frequency domain positions occupied by the reference signal in the manner of frequency hopping are randomly distributed over the frequency hopping bandwidth; where the frequency hopping bandwidth is a bandwidth determined according to two frequency domain positions with the largest distance among the frequency domain positions occupied by the reference signal or a predetermined bandwidth acquired by receiving a first signaling message.

It is to be noted that the above description is made by taking one frequency band including one PRB as an example. It is assumed that one frequency band including four PRBs, that is PRB1, PRB2, PRB3 and PRB4. It is assumed that the frequency bands occupied by the reference signal are PRB1 and PRB3, and the union is PRB1 and PRB3; the frequency hopping bandwidth is the difference between the end frequency domain position of PRB4 and the original frequency domain position of PRB1, but is not limited thereto.

In an embodiment of the present application, in response to determining that frequency domain bandwidths of the reference signal have a plurality of levels, a frequency domain bandwidth index corresponding to the reference signal satisfies at least one of the following conditions. In response to determining that a frequency domain bandwidth level does not belong to a frequency hopping bandwidth level set of the reference signal, the frequency domain bandwidth index occupied by the reference signal is a fixed value. In response to determining that the frequency domain bandwidth level does not belong to the frequency hopping bandwidth level set of the reference signal, a frequency domain bandwidth index set corresponding to the reference signal is a proper subset of a frequency domain bandwidth index set corresponding to the frequency domain bandwidth level. Or in response to determining that the frequency domain bandwidth level does not belong to the frequency hopping bandwidth level set of the reference signal, the frequency domain bandwidth index occupied by the reference signal changes with time and the frequency domain bandwidth index set corresponding to the reference signal is the proper subset of the frequency domain bandwidth index set corresponding to the frequency domain bandwidth level. One frequency domain bandwidth with a frequency domain bandwidth level of (N−1) includes one or more frequency domain bandwidths with a frequency domain bandwidth level of N, one or more frequency domain bandwidths exist under one frequency domain bandwidth level, and the frequency domain bandwidth index is indexes of a plurality of frequency domain bandwidths with the frequency domain bandwidth level of N included by the one frequency domain bandwidth with the frequency domain bandwidth level of (N−1); where the frequency domain bandwidth index set corresponding to the frequency domain bandwidth level includes a set of indexes of all frequency domain bandwidths with the frequency domain bandwidth level of N included by the one frequency domain bandwidth with the frequency domain bandwidth level of (N−1) in the tree structure; where N is an integer greater than or equal to 1.

It is to be noted that the frequency domain bandwidth index set corresponding to the reference signal may also be referred to as the frequency domain bandwidth indexes occupied by the reference signal, but is not limited thereto.

It is to be noted that the frequency domain bandwidth indexes occupied by the reference signal may further satisfy at least one of the following. In response to determining that the frequency domain bandwidth level belongs to the frequency hopping bandwidth level set of the reference signal, the frequency domain bandwidth indexes occupied by the reference signal change with time. Or in response to determining that the frequency domain bandwidth level belongs to the frequency hopping bandwidth level set of the reference signal, a frequency domain bandwidth index set of frequency hopping of the reference signal is a proper subset of the frequency domain bandwidth index set corresponding to the frequency domain bandwidth level.

It is to be noted that the frequency hopping bandwidth level set may satisfy at least one of the following: levels in the frequency hopping bandwidth level set are discontinuous; the maximum level in the frequency hopping bandwidth level set is smaller than or equal to a first level, where the first level is the maximum frequency domain bandwidth level among frequency domain bandwidth levels corresponding to the reference signal; the frequency hopping bandwidth level set may be an empty set; on one time domain symbol, the reference signal corresponds to more than two frequency hopping bandwidth level sets; or information about the frequency hopping bandwidth level set is carried in received signaling information.

In an embodiment of the present application, the determination module 72 may determine the frequency domain positions k(t) occupied by the reference signal in the following manner:

$$k(t) = k_{org} + \sum_{b=0}^{B} N_{sc,b}^{RS} n_b(t);$$

$$n_b(t) = \begin{cases} n_{b,orig} \bmod N_b & b \notin b_{hopA} \\ \{F_b(t) + n_{b,orig}\} \bmod N_b & \text{otherwise} \end{cases};$$

$$F_b(t) = \begin{cases} (N_b/2)\left\lfloor \dfrac{t \bmod \prod_{b' \in b_{hopA}, b' \leq b} N_{b'}}{\prod_{b' \in b_{hopA}, b' \leq max(b-1,0)} N_{b'}} \right\rfloor + \\ \quad \left\lfloor \dfrac{t \bmod \prod_{b' \in b_{hopA}, b' \leq b} N_{b'}}{2\prod_{b' \in b_{hopA}, b' \leq max(b-1,0)} N_{b'}} \right\rfloor & \text{if } N_b \text{ even} \\ \lfloor N_b/2 \rfloor \left\lfloor t \Big/ \prod_{b' \in b_{hopA}, b' \leq max(b-1,0)} N_{b'} \right\rfloor & \text{if } N_b \text{ odd} \end{cases}.$$

t is a time parameter and is a real number greater than or equal to 0. b or b' is an index of a frequency domain bandwidth level corresponding to the reference signal among a plurality of frequency domain bandwidth levels and is equal to 0, 1, . . . , B, B is the maximum frequency domain bandwidth level among frequency domain bandwidth levels corresponding to the reference signal and is a non-negative integer, Nb is the number of bandwidths with a frequency domain bandwidth level indexed by b included by one bandwidth with a frequency domain bandwidth level indexed by max (b−1, 0), $N_{b'}$ is the number of bandwidths with a frequency domain bandwidth level indexed by b' included by one bandwidth with a frequency domain bandwidth level indexed by max (b'−1, 0), max ( ) is a function taking the maximum value, $n_{b,orig}$ is an original frequency domain bandwidth index of the reference signal with the frequency domain bandwidth level indexed by b, $n_b(t)$ is a frequency domain bandwidth index corresponding to the reference signal with the frequency domain bandwidth level indexed by b at time t, $k_{org}$ is a non-negative integer, $N_{sc,b}^{RS}$ is a frequency domain length corresponding to one bandwidth with the frequency domain bandwidth level indexed by b, Π is a multiplication operation, mod is a remainder function, and $b_{hopA}$ is a frequency domain bandwidth level set.

It is to be noted that the device may further include an acquisition module connected to the determination module 72 and configured to acquire at least one of the following parameters through second signaling information and/or an agreed table manner: B, $N_b$, $n_{b,orig}$, $k_{org}$, $N_{sc,b}^{RS}$, $b_{hopA}$, $b_{hopA\_min}$, or $b_{hopA\_max}$; where $b_{hopA}=\{b, b_{hopA\_min} \le b \le b_{hopA\_max}\}$, $b_{hopA\_min}$ and $b_{hopA\_max}$ are non-negative integers, or $b_{hopA\_min}$ and $b_{hopA\_max}$ are non-negative integers less than B.

It is to be noted that $b_{hopA}$ satisfies at least one of the following: $\max(b_{hopA}) \le B$; $b_{hopA}$ includes indexes of discontinuous frequency domain bandwidth levels; $b_{hopA}$ may be an empty set; or on one time domain symbol, and the reference signal corresponds to more than two $b_{hopA}$ s.

In an embodiment of the present embodiment, in response to determining that frequency domain bandwidths of the reference signal have a plurality of levels, the device may further include a reception module configured to receive a second signaling message. The second signaling message includes at least one of the following information: a frequency domain bandwidth index set of hopping of the reference signal at each frequency domain bandwidth level or a frequency domain bandwidth index set of the hopping of the reference signal in a frequency hopping bandwidth level set; where one frequency domain bandwidth with a frequency domain bandwidth level of (N−1) includes one or more frequency domain bandwidths with a frequency domain bandwidth level of N, and one or more frequency domain bandwidths exist under one frequency domain bandwidth level.

In an embodiment of the present application, in response to determining that frequency domain bandwidths of the reference signal have a plurality of levels, the reference signal may satisfy at least one of the following characteristics. The levels of the frequency domain bandwidths of the reference signal are divided into a plurality of frequency domain bandwidth level groups, where different frequency domain bandwidth level groups correspond to different relationships, and the relationships include at least one of: a mapping relationship between frequency domain bandwidth indexes corresponding to the reference signal and a time domain parameter, or a relationship between a frequency domain bandwidth index set corresponding to the reference signal with one frequency domain bandwidth level and all frequency domain bandwidth index sets corresponding to the one frequency domain bandwidth level. On one time domain symbol, the reference signal corresponds to more than two frequency domain bandwidth indexes under one frequency domain bandwidth level; the reference signal corresponds to information about more than two original frequency domain bandwidth levels; the reference signal corresponds to information about more than two end frequency domain bandwidth levels. The reference signal firstly performs frequency domain bandwidth hopping in a frequency domain bandwidth group, and then performs frequency domain bandwidth hopping among frequency domain bandwidth groups; where one of the frequency domain bandwidth groups is a frequency domain bandwidth group formed by one or more frequency domain bandwidths among a plurality of frequency domain bandwidths with a frequency domain bandwidth level of N included by one frequency domain bandwidth with a frequency domain bandwidth level of (N−1) corresponding to the reference signal.

In an embodiment of the present application, in response to determining that frequency domain bandwidths of the reference signal have a plurality of levels, the reception module is further configured to receive a third signaling message, where the third signaling message is configured for determining whether the reference signal hops in a frequency domain bandwidth group.

In an embodiment of the present application, the determination module 72 may determine the frequency domain positions k(t) occupied by the reference signal in a following manner:

$$k(t) = k_{org} + \sum_{b=0}^{B} N_{sc,b}^{RS} n_b(t);$$

$$n_b(t) = \begin{cases} n_{b,orig} \bmod N_b & b \notin b_{hopA} \\ \{F_b(t) + n_{b,orig}\} \bmod N_b & \text{otherwise} \end{cases};$$

$$F_b(t) = (x_b) \left\lfloor \frac{t \bmod \prod_{b' \in b_{hopA}, b' \le b} N_{b'}}{\prod_{b' \in b_{hopA}, b' \le \max(b-1,0)} N_{b'}} \right\rfloor +$$

$$\sum_{l=1}^{x_b-1} \beta_b(l) \left\lfloor \frac{t \bmod \prod_{b' \in b_{hopA}, b' \le b} N_{b'}}{\sum_{l'=0}^{l-1} \left[(k_b - \alpha_{l'}) \prod_{b' \in b_{hopA}, b' \le \max(b-1,0)} N_{b'}\right]} \right\rfloor$$

$$\alpha_{l'} = \begin{cases} 0, & l' \le (N_b \bmod x_b) \\ 1, & \text{otherwise} \end{cases}.$$

t is a time parameter and is a real number greater than or equal to 0. b or b' is an index of a frequency domain bandwidth level corresponding to the reference signal among a plurality of frequency domain bandwidth levels and is equal to 0, 1, . . . , B. B is the maximum frequency domain bandwidth level among frequency domain bandwidth levels corresponding to the reference signal and is a non-negative integer, Nb is the number of bandwidths with a frequency domain bandwidth level indexed by b included by one bandwidth with a frequency domain bandwidth level indexed by max (b−1, 0), $N_{b'}$ is the number of bandwidths with a frequency domain bandwidth level indexed by b' included by one bandwidth with a frequency domain bandwidth level indexed by max (b'−1, 0), max ( ) is a function taking the maximum value, $n_{b,orig}$ is an original frequency domain bandwidth index of the reference signal with the frequency domain bandwidth level indexed by b, $n_b(t)$ is a frequency domain bandwidth index corresponding to the reference signal with the frequency domain bandwidth level indexed by b at time t, $k_{org}$ is a non-negative integer, $N_{sc,b}^{RS}$ is a frequency domain length corresponding to one bandwidth with the frequency domain bandwidth level indexed by b, Π is a multiplication operation, mod is a remainder function, $b_{hopA}$ is a frequency domain bandwidth level set, $x_b$ and $k_b$ are natural numbers less than or equal to $N_b$, and $\beta_b(l) \in \{0, 1, \ldots, x_b-1\}$.

It is to be noted that the device further includes an acquisition module configured to acquire at least one of the following parameters: $\beta_b(l)$, $k_b$, or $x_b$ by receiving a fourth signaling message or in an agreed rule manner.

It is to be noted that the device may, but may not necessarily, be located in the terminal.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment Two

The embodiment further provides a reference signal transmission device configured to implement the above-mentioned embodiments and preferred embodiments. What has been described will not be repeated. As used below, the term "module" may be implemented by a combination of software and/or hardware that enables predetermined functions. The device described below is preferably implemented by software, but implementation by software or a combination of software and hardware is also possible and conceived.

Figure 8:
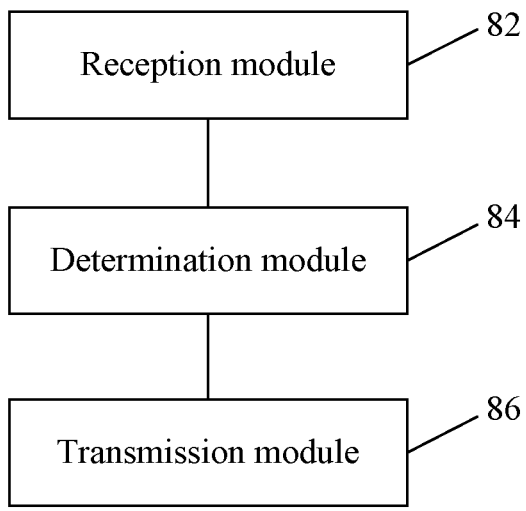
FIG. 8 is a block diagram two illustrating a reference signal transmission device according to an embodiment of the present application.

FIG. 8 is block diagram two illustrating a reference signal transmission device according to an embodiment of the present application. As shown in FIG. 8, the device includes a reception module 82, a determination module 84 and a transmission module 86.

The reception module 82 is configured to receive physical layer dynamic control signaling, where the physical layer dynamic control signaling carries parameter information for determining a frequency hopping pattern of a reference signal.

The determination module 84 is connected to the reception module 82 and configured to determine the frequency hopping pattern of the reference signal according to the parameter information.

The transmission module 86 is connected to the determination module 84 and configured to transmit the reference signal according to the determined frequency hopping pattern.

Through the above device, the frequency hopping pattern of the reference signal can be determined in such a manner that the physical layer dynamic control signaling carries the parameter information for determining the frequency hopping pattern of the reference signal. Compared with the related art in which the physical layer dynamic control signaling cannot carry parameter information for determining the frequency hopping pattern of the reference signal, the method implements the support for physical layer dynamic control signaling to carry information related to the frequency hopping pattern, so that the requirement of NR can be better satisfied, and the problem that the SRS pattern in LTE in the related art cannot satisfy the requirement of NR can be solved.

It is to be noted that the physical layer dynamic control signaling is included in a physical layer control channel, and/or the information in the physical layer dynamic control signaling may change dynamically at each time unit.

It is to be noted that the physical layer dynamic control signaling carries all parameter information or part of parameter information for determining the frequency hopping pattern of the reference signal.

In an embodiment of the present application, the reception module 82 may further be configured to receive high-layer signaling, where the high-layer signaling carries parameter information for determining the frequency hopping pattern of the reference signal, and a union of the parameter information carried in the high-layer signaling and the parameter information carried in the physical layer dynamic control signaling is the all parameter information.

It is to be noted that the parameters carried in the physical layer dynamic control signaling may be the same as, partially the same as, or completely different from the parameters carried in the high-layer signaling, as long as the union of the parameters carried in the physical layer dynamic control signaling and the parameters carried in the high-layer signaling may be all parameters used for determining the frequency hopping pattern of the reference signal.

It is to be noted that the parameter information for determining the frequency hopping pattern of the reference signal includes at least one of: information about a frequency hopping bandwidth level set, information about a frequency hopping bandwidth original level, information about a frequency hopping bandwidth end level, a frequency domain bandwidth level at which a frequency domain bandwidth occupied by the reference signal on one time domain symbol is located, the maximum value of frequency domain bandwidth levels corresponding to the reference signal, information about the number of frequency hopping periods, information about the number of time domain symbols occupied by the reference signal, information about a reference signal period, information about a reference signal period offset, index information about a time domain symbol occupied by the reference signal in a time unit, information about the number of time domain symbols occupied by the reference signal in the time unit, time domain frequency hopping unit information about the reference signal, information about the number of ports corresponding to the reference signal, information about the number of port groups of the reference signal, reference signal port group hopping pattern information, index information of a reference signal frequency hopping parameter set, a relationship between reference signal resource group hopping and frequency domain hopping, a relationship between port group hopping and the frequency domain hopping, an original frequency domain position occupied by the reference signal, an amount of frequency domain hopping of the reference signal, a frequency domain interval between frequency domain positions corresponding to adjacent frequency domain hopping, and a function type that frequency domain positions occupied by the reference signal change with time, frequency domain bandwidth index set information corresponding to the reference signal at a frequency domain bandwidth level, frequency hopping frequency band set information of the reference signal, whether the reference signal is in a continuous frequency domain frequency hopping mode or a discontinuous frequency domain frequency hopping mode, frequency domain bandwidth level grouping information, information for indicating whether a frequency domain bandwidth level group is subjected to frequency hopping, frequency domain bandwidth grouping information, information about whether a frequency domain bandwidth group is subjected to the frequency hopping, or information about a frequency hopping sequence of frequency domain bandwidth groups; where the time domain frequency hopping unit information includes that the reference signal hops every other time domain frequency hopping unit, and frequency domain positions of the reference signal in one time domain frequency hopping unit are unchanged.

It is to be noted that the reference signal may correspond to a plurality of pieces of frequency hopping bandwidth original level information on a time domain symbol, or the reference signal may correspond to a plurality of pieces of frequency hopping bandwidth end level information on a time domain symbol, or the reference signal may correspond to a plurality of frequency domain bandwidth levels at which the frequency domain bandwidth occupied by the reference signal on a time domain symbol is located on a time domain symbol, or the reference signal may correspond to a plurality of maximum values of the frequency domain bandwidth levels to which the reference signal corresponds on a time domain symbol, but the present application is not limited thereto. Thus, the reference information may include, but is not limited to, the plurality of pieces of frequency hopping bandwidth original level information, or the plurality of pieces of frequency hopping bandwidth end level information, or the plurality of frequency domain bandwidth levels at which the frequency domain bandwidth occupied by the reference signal is located on a time domain symbol, or the plurality of maximum values of the frequency domain bandwidth levels to which the reference signal corresponds on a time domain symbol.

It is to be noted that the time domain frequency hopping unit information may further include at least one of: information about the number of time domain symbols or information about the number of time units occupied by time domain symbols.

In an embodiment of the present application, a time domain resource occupied by the reference signal triggered by the physical layer dynamic control signaling is a subset of time domain resources occupied by a reference signal triggered by first control signaling. In response to determining that the reference signal triggered by the physical layer dynamic control signaling and the reference signal triggered by the first control signaling occupy a same time domain symbol, merely the reference signal triggered by the physical layer dynamic control signaling is transmitted, and the reference signal triggered by the first control signaling is discarded. The frequency domain positions occupied by the reference signal triggered by the physical layer dynamic control signaling do not include discontinuous frequency bands, and the frequency domain positions occupied by the reference signal triggered by the first control signaling include discontinuous frequency bands. A frequency hopping bandwidth level set corresponding to the reference signal triggered by the physical layer dynamic control signaling belongs to a first set, and a frequency hopping bandwidth level set corresponding to the reference signal triggered by the first control signaling belongs to a second set. A transmission parameter of the reference signal triggered by the physical layer dynamic control signaling may be determined according to a transmission parameter and a time parameter of the reference signal for transmission triggered by the first control signaling; or a transmission parameter configuration range of the reference signal triggered by the physical layer dynamic control signaling is determined according to transmission parameter configuration information of the reference signal for transmission triggered by the first control signaling; where the first control signaling includes at least one of: high-layer control signaling, or control signaling closest to the transmission time of the physical layer dynamic control signaling.

It is to be noted that all or part of parameters in the parameter information carried in the high-layer signaling may be suitable for the reference signal triggered by the physical layer dynamic control signaling and may also be suitable for the reference signal triggered by the high-layer signaling.

It is to be noted that the step of determining a transmission pattern of the reference signal triggered by the physical layer dynamic control signaling according to a transmission parameter and a time parameter of the reference signal for transmission triggered by the high-layer signaling may be embodied as: determining the transmission pattern of the reference signal for transmission triggered by the physical layer dynamic control signaling by using a transmission parameter of the reference signal for transmission triggered by physical layer dynamic control signaling and a transmission parameter and a time parameter of the reference signal for transmission triggered by high-layer signaling, but is not limited thereto.

It is to be noted that the execution subject of the above steps may be, but is not limited to, a terminal.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment Three

The embodiment further provides a reference signal transmission device configured to implement the above-mentioned embodiments and preferred embodiments. What has been described will not be repeated. As used below, the term "module" may be implemented by a combination of software and/or hardware that enables predetermined functions. The device described below is preferably implemented by software, but implementation by software or a combination of software and hardware is also possible and conceived.

Figure 9:
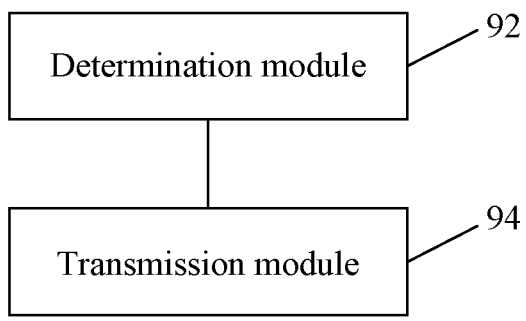
FIG. 9 is a block diagram three illustrating a reference signal transmission device according to an embodiment of the present application.

FIG. 9 is block diagram three illustrating a reference signal transmission device according to an embodiment of the present application. As shown in FIG. 9, the device includes a determination module 92 and a transmission module 94.

The determination module 92 is configured to determine transmission parameter information of a reference signal.

The transmission module 94 is connected to the determination module 92 and configured to transmit the reference signal according to the determined transmission parameter information. The transmission parameter information includes at least one of the following parameters: information about frequency domain positions occupied by the reference signal, antenna port grouping information corresponding to the reference signal, or pattern information of the reference signal in the frequency domain positions.

Through the above device, the transmission parameter information of the reference signal can be obtained, so that the requirement of NR can be better adapted to, and the problem that the SRS pattern in LTE in the related art cannot satisfy the requirement of NR can be solved.

It is to be noted that the transmission parameter information includes at least one of the following information: time domain frequency hopping unit information, grouping information of port groups, frequency domain repetition factor information corresponding to a frequency domain position, grouping information of reference signal resource groups, a relationship between reference signal resource group hopping and frequency domain hopping, a relationship between port group hopping of the reference signal and the frequency domain hopping, frequency hopping bandwidth level set information, frequency hopping bandwidth end level information, a frequency domain bandwidth level at which a frequency domain bandwidth occupied by the reference signal on one time domain symbol is located, the maximum value of frequency domain bandwidth levels corresponding to the reference signal, information about the number of frequency hopping periods, index information about a time domain symbol occupied by the reference signal in a time unit, information about the number of time domain symbols occupied by the reference signal in the time unit, reference signal port group hopping pattern information, an original frequency domain position occupied by the reference signal, an amount of frequency domain hopping of the reference signal, a frequency domain interval between frequency domain positions corresponding to adjacent frequency domain hopping, a function type that frequency domain positions occupied by the reference signal change with time, frequency domain bandwidth index set information corresponding to the reference signal at a frequency domain bandwidth level, frequency hopping frequency band set information of the reference signal, whether the reference signal is in a continuous frequency domain frequency hopping mode or a discontinuous frequency domain frequency hopping mode, frequency domain bandwidth level grouping information, information for indicating whether a frequency domain bandwidth level group is subjected to frequency hopping, frequency domain bandwidth grouping information, information about whether a frequency domain bandwidth group is subjected to the frequency hopping, or information about a frequency hopping sequence of frequency domain bandwidth groups; where each of the reference signal resource groups includes one or more reference signal ports, and the time domain frequency hopping unit information includes that the reference signal hops every other time domain frequency hopping unit and frequency domain positions of the reference signal in one time domain frequency hopping unit are unchanged.

It is to be noted that the reference signal transmitting time is different on different port groups of the reference signal.

It is to be noted that the time domain frequency hopping unit information may include that the reference signal hops every other time domain frequency hopping unit and the frequency domain positions of the reference signal in the one time domain frequency hopping unit are unchanged; and/or different frequency domain positions correspond to different repetition factors.

It is to be noted that a frequency domain resource occupied by the measurement reference signal is obtained according to a following formula:

$$n_b = \begin{cases} \lfloor 4n_{RRC}/m_{SRS,b} \rfloor \bmod N_b b \leq b_{hop} \\ \{F_b(n_{SRS}) + \lfloor 4n_{RRC}/m_{SRS,b} \rfloor\} \bmod N_b \text{ otherwise} \end{cases}$$

where $$F_b(n_{SRS}) = \begin{cases} (N_b/2)\left\lfloor \frac{n_{SRS} \bmod \prod_{b'=b_{hop}}^{b} N_{b'}}{T_1 \prod_{b'=b_{hop}}^{b-1} N_{b'}} \right\rfloor + \\ \left\lfloor \frac{n_{SRS} \bmod \prod_{b'=b_{hop}}^{b} N_{b'}}{2T_1 \prod_{b'=b_{hop}}^{b-1} N_{b'}} \right\rfloor \end{cases}, \text{ if } N_b \text{ even} \\ \lfloor N_b/2 \rfloor \left\lfloor n_{SRS}/T_1 \prod_{b'=b_{hop}}^{b} N_{b'} \right\rfloor, \text{ if } N_b \text{ odd} \end{cases}$$

$T_1$ is the time domain frequency hopping unit information; the time domain frequency hopping unit information is the number of time domain symbols occupied by the measurement reference signal, where the time domain symbols include time domain symbols in one time unit and/or time domain symbols in a plurality of time units; and/or the time domain frequency hopping unit information includes at least one of the following information: period information of the measurement reference signal, information about the number of time domain symbols included in a period of the measurement reference signal, information about the number of time domain symbols, or information about the number of time units occupied by the time domain symbols.

It is to be noted that a measurement reference signal satisfies one of the following characteristics: information about frequency domain positions occupied by the measurement reference signal including tree structure information $C_{SRS}$, where $C_{SRS}$ is included in specific control signaling; antenna port information of the measurement reference signal being acquired according to measurement reference signal resource group information; the antenna port information of the measurement reference signal being acquired according to resource information of the measurement reference signal; or the antenna port information of the measurement reference signal being acquired according to port group information of the measurement reference signal.

It is to be noted that a corresponding relationship exists between a time domain frequency hopping unit corresponding to the time domain frequency hopping unit information and the number of time domain symbols occupied by the reference signal in one time unit; in response to determining that the grouping information of the port groups may include the number of port groups, a corresponding relationship exists between the time domain frequency hopping unit and the number of port groups; and in response to determining that the grouping information of the port groups may include the number of port groups, a corresponding relationship exists between the number of port groups and the number of time domain symbols occupied by the reference signal in the one time unit.

It is to be noted that in one frequency hopping period, time domain frequency hopping unit information of the reference signal is different at different time.

In an embodiment of the present application, the transmission parameter information may further include a corresponding relationship between a time domain frequency hopping unit and time.

It is to be noted that a relationship between reference signal resource group hopping and frequency domain hopping may include one of: the reference signal resource group hopping being earlier than the frequency domain hopping, the reference signal resource group hopping and the frequency domain hopping being performed simultaneously, or the frequency domain hopping being earlier than the reference signal resource group hopping.

It is to be noted that a relationship between port group hopping and frequency domain hopping includes one of: the port group hopping being earlier than the frequency domain hopping, the frequency domain hopping being earlier than the port group hopping, or the port group hopping and the frequency domain hopping being performed simultaneously.

It is to be noted that the transmission parameter information may be included in at least one of the following control signaling: physical layer dynamic control signaling or high-layer control signaling.

It is to be noted that the high-layer control signaling may be, but is not limited to, RRC control signaling or MAC CE control signaling.

It is to be noted that the device may, but may not necessarily, be located in a terminal or a base station.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment Four

The embodiment further provides a parameter sending device configured to implement the above-mentioned embodiments and preferred embodiments. What has been described will not be repeated. As used below, the term "module" may be implemented by a combination of software and/or hardware that enables predetermined functions. The device described below is preferably implemented by software, but implementation by software or a combination of software and hardware is also possible and conceived.

The parameter sending device provided in the embodiment of the present application includes a sending module configured to send physical layer dynamic control signaling, where the physical layer dynamic control signaling carries parameter information for determining a frequency hopping pattern of a reference signal.

It is to be noted that the physical layer dynamic control signaling carries all parameter information or part of parameter information for determining the frequency hopping pattern of the reference signal.

In an embodiment of the present application, the sending module is further configured to send high-layer signaling, where the high-layer signaling carries parameter information for determining the frequency hopping pattern of the reference signal, and a union of the parameter information carried in the high-layer signaling and the parameter information carried in the physical layer dynamic control signaling is the all parameter information.

It is to be noted that physical layer dynamic control signaling and high-layer signaling may be sent simultaneously, that physical layer dynamic control signaling may be sent before high-layer signaling, or that high-layer signaling may be sent before physical layer dynamic control signaling, but the present application is not limited thereto.

It is to be noted that the parameter information for determining the frequency hopping pattern of the reference signal may include at least one of: information about a frequency hopping bandwidth level set, information about a frequency hopping bandwidth original level, information about a frequency hopping bandwidth end level, a frequency domain bandwidth level at which a frequency domain bandwidth occupied by the reference signal on one time domain symbol is located, the maximum value of frequency domain bandwidth levels corresponding to the reference signal, information about the number of frequency hopping periods, information about the number of time domain symbols occupied by the reference signal, information about a reference signal period, information about a reference signal period offset, index information about a time domain symbol occupied by the reference signal in a time unit, information about the number of time domain symbols occupied by the reference signal in the time unit, time domain frequency hopping unit information about the reference signal, information about the number of ports corresponding to the reference signal, information about the number of port groups of the reference signal, reference signal port group hopping pattern information, index information about a reference signal frequency hopping parameter set, a relationship between reference signal resource group hopping and frequency domain hopping, a relationship between port group hopping and the frequency domain hopping, an original frequency domain position occupied by the reference signal, an amount of frequency domain hopping of the reference signal, a frequency domain interval between frequency domain positions corresponding to adjacent frequency domain hopping, a function type that frequency domain positions occupied by the reference signal change with time, frequency domain bandwidth index set information corresponding to the reference signal at a frequency domain bandwidth level, frequency hopping frequency band set information of the reference signal, whether the reference signal is in a continuous frequency domain frequency hopping mode or a discontinuous frequency domain frequency hopping mode, frequency domain bandwidth level grouping information, information about whether a frequency domain bandwidth level group is subjected to frequency hopping, frequency domain bandwidth grouping information, information about whether a frequency domain bandwidth group is subjected to the frequency hopping, or information about a frequency hopping sequence of frequency domain bandwidth groups; where the time domain frequency hopping unit information includes frequency hopping of the reference signal every other time domain frequency hopping unit, and frequency domain positions of the reference signal in one time domain frequency hopping unit are unchanged.

It is to be noted that the device may, but may not necessarily, be located in a base station.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment Five

The embodiment further provides a device for sending an uplink channel or signal. The device includes a determination module and a sending module.

The determination module is configured to determine rate matching information and determine whether the uplink channel or signal satisfies a predetermined condition.

The sending module is configured to: in response to determining that the uplink channel or signal satisfies the predetermined condition, send the uplink channel or signal according to the rate matching information.

The sent uplink channel or signal cannot occupy a resource included in the rate matching information.

It is to be noted that in response to determining that the uplink channel or signal does not satisfy the predetermined condition, the resource included in the rate matching information is available for the uplink channel or signal.

It is to be noted that the predetermined condition includes at least one of the following conditions: the uplink channel or signal is a periodic channel or signal;

the uplink channel or signal is a semi-persistent channel or signal; or the uplink channel or signal is not a channel or signal scheduled by physical layer dynamic control signaling.

It is to be noted that the resource included in the rate matching information includes at least one of the following resources: a time domain resource, a frequency domain resource, a reference signal resource, a port resource, a spatial domain resource, or uplink measurement reference signal resource pool information.

It is to be noted that the sent uplink signal is an uplink measurement reference signal in a frequency hopping state, and in response to determining that a resource of the uplink measurement reference signal and the resource included in the rate matching information overlap, at least one of the following operations is performed.

The uplink measurement reference signal is not sent on the resource included in the rate matching information.

A frequency domain position at which the uplink measurement reference signal is required to be sent on a frequency domain resource included in the rate matching information is postponed to a next frequency hopping opportunity of the uplink measurement reference signal.

A current frequency hopping reference signal is not sent, and current frequency hopping is discarded.

The frequency domain position required to be occupied by the uplink measurement reference signal for the current frequency hopping is postponed to a next frequency hopping resource.

Embodiment Six

The embodiment of the present invention provides a terminal including a processor. The processor is configured to execute a program which, when executed, implements the method of the embodiment shown in FIG. 4 or FIG. 5 or FIG. 6 in embodiment one.

The embodiment of the present invention further provides a base station including a processor. The processor is configured to execute a program which, when executed, implements the method of the embodiment shown in FIG. 6 in embodiment 1 or the parameter sending method in embodiment one.

Embodiment Seven

The embodiment of the present application further provides a storage medium including a stored program which, when executed, implements any of the methods described above.

In an embodiment, and in the embodiment, the storage medium may include, but is not limited to: a USB flash disk, a Read-Only Memory (ROM), a Random Access Memory (RAM), a removable hard disk, a magnetic disk, an optical disk or any other media capable of storing program codes.

The embodiment of the present application further provides a processor configured to execute a program which, when executed, implements the steps of any of the methods described above.

In an embodiment, for specific examples in the embodiment, reference may be made to examples described in the above embodiments and optional embodiments, and repetition are not made herein.

For a better understanding of the embodiments of the present application, the present application is further explained below in combination with the preferred embodiments.

In LTE, periodic and aperiodic SRS triggering manners are supported, and periodic and aperiodic SRS parameters are independently configured. The aperiodic SRS does not support a frequency hopping mode. In NR, it is supported that multiple time domain symbols can be occupied by one SRS resource in one slot, so in order to quickly locate the preferred frequency band, it can be considered that the aperiodically triggered SRS also supports the frequency hopping mode, and the configurable parameters of the aperiodically triggered SRS supporting the frequency hopping pattern need to be further considered. A link between periodic frequency hopping and aperiodic frequency hopping also needs to be further considered.

In LTE, the system bandwidth occupied by the SRS and the tree structure of the SRS are notified through system messages, and the sub-frame position occupied by the SRS is sent through system messages and is cell specific. The cell-specific SRS parameters are configured for rate matching of the PUCCH/PUSCH, which also results in a certain waste of resources since the configured cell-specific SRS resources may not be occupied by any terminal. It is further considered that the time domain original position and the time domain end position of the PUSCH may be dynamically notified in the NR, and how the PUCCH/PUSCH performs rate matching with the SRS is also a problem to be further considered.

The SRS in NR also needs to support beam scanning, and how to design the SRS pattern to adapt to beam scanning is also a problem to be considered herein.

In conclusion, the sending mode of an SRS in LTE can not well adapt to many requirements of NR, so the related improvement mode of the SRS needs to be further considered to adapt to many requirements of NR.

According to the preferred embodiments provided by the present application, the reference signal can adapt to many new requirements of NR, for example, when the bandwidth corresponding to the base station is far larger than the bandwidth supported by the terminal, the preferred bandwidth of the terminal can be quickly locked, a finer channel sounding process is performed in real time in the preferred bandwidth, a beam training process is combined in a frequency hopping solution of the reference signal, and the hopping solution of a port group is considered in the frequency hopping solution of the reference signal.

Preferred Embodiment One

In the related art of LTE, in order to support edge users or power limited users, or increase the capacity of the SRS, the uplink reference signal SRS supports a frequency hopping rule, but the union of frequency domains occupied by the SRS for frequency hopping is continuous and no discontinuous frequency bands exist. That is, for the SRS, a reference signal needs to be sent on all frequency bands within a frequency hopping bandwidth range.

Specifically, in the tree structure of the SRS shown in FIG. 1, b is a frequency domain bandwidth level index, $N_b$ is the number of frequency domain bandwidths corresponding to a bandwidth level (i.e., a frequency domain bandwidth level hereinafter simply referred to as a bandwidth level for simplicity, and a frequency domain bandwidth simply referred to as a bandwidth) indexed by b, or $N_b$ may also be referred to as the number of leaves with the level of b included in one leaf with the bandwidth level of max (b−1, 0). The tree structure is one type of the multi-level frequency domain bandwidth structure. Of course, the present application does not exclude other multi-level frequency domain bandwidth structures.

When $b_{hop}=0$, $B_{SRS}=3$ are configured, the terminal sends the SRS based on the frequency hopping pattern shown in FIG. 2. FIG. 2 is an exemplary diagram of the frequency domain positions occupied by the SRS in one frequency hopping period, the pattern of the frequency domain positions occupied by the SRS with respect to time variation is repeated in a different frequency hopping period, or the union of the frequency domain positions occupied by the SRS in a different frequency hopping period is the same. At this time, in one frequency hopping period, the union of the frequency domain positions occupied by the SRS occupies the full frequency hopping bandwidth, that is, one frequency domain bandwidth with b=0 shown in FIG. 1 is the frequency hopping bandwidth, and the frequency domain positions occupied by the reference signal in one frequency hopping period as shown in grids in FIG. 2 occupy the full frequency hopping bandwidth. At this time, eight time domain symbols are required when a full frequency domain sounding is to be completed and the terminal can merely send the frequency domain bandwidth corresponding to one leaf with b=3 at each time. When an SRS occupies merely one time domain symbol in one time unit (e.g., in a subframe or slot), eight SRS periods are required to complete sounding. For the large bandwidth in NR, such frequency hopping manner is intolerable, and considering the beam-based transmission in NR, the frequency selection characteristic is further reduced, the preferred frequency band can be obtained without full bandwidth frequency hopping, and the frequency hopping pattern suitable for NR needs to be considered. On the other hand, in NR, the maximum bandwidth supported by the base station is far greater than the bandwidth supported by the terminal, so how to quickly find the preferred bandwidth of the terminal in the large bandwidth supported by the base station is also one of the requirements for increasing the frequency hopping speed.

Therefore, the information about the frequency hopping bandwidth level set of the reference signal in the tree structure may be notified. At the bandwidth level not belonging to the frequency hopping bandwidth level set, the frequency domain bandwidth index information corresponding to the reference signal does not change with time (the frequency domain bandwidth index occupied by the reference signal may also be referred to as the frequency domain bandwidth index occupied by the reference signal), At the bandwidth level belonging to the frequency hopping bandwidth level set, the frequency domain bandwidth index of the reference signal changes with time.

Figure 10A:
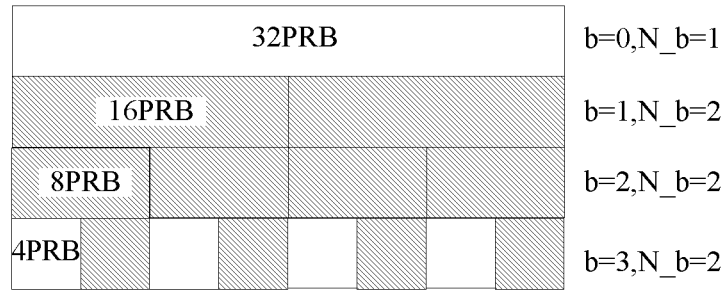
FIG. 10A is an exemplary diagram one illustrating different bandwidth index sets for hopping of different bandwidth levels according to preferred embodiment one of the present application.
Figure 10B:
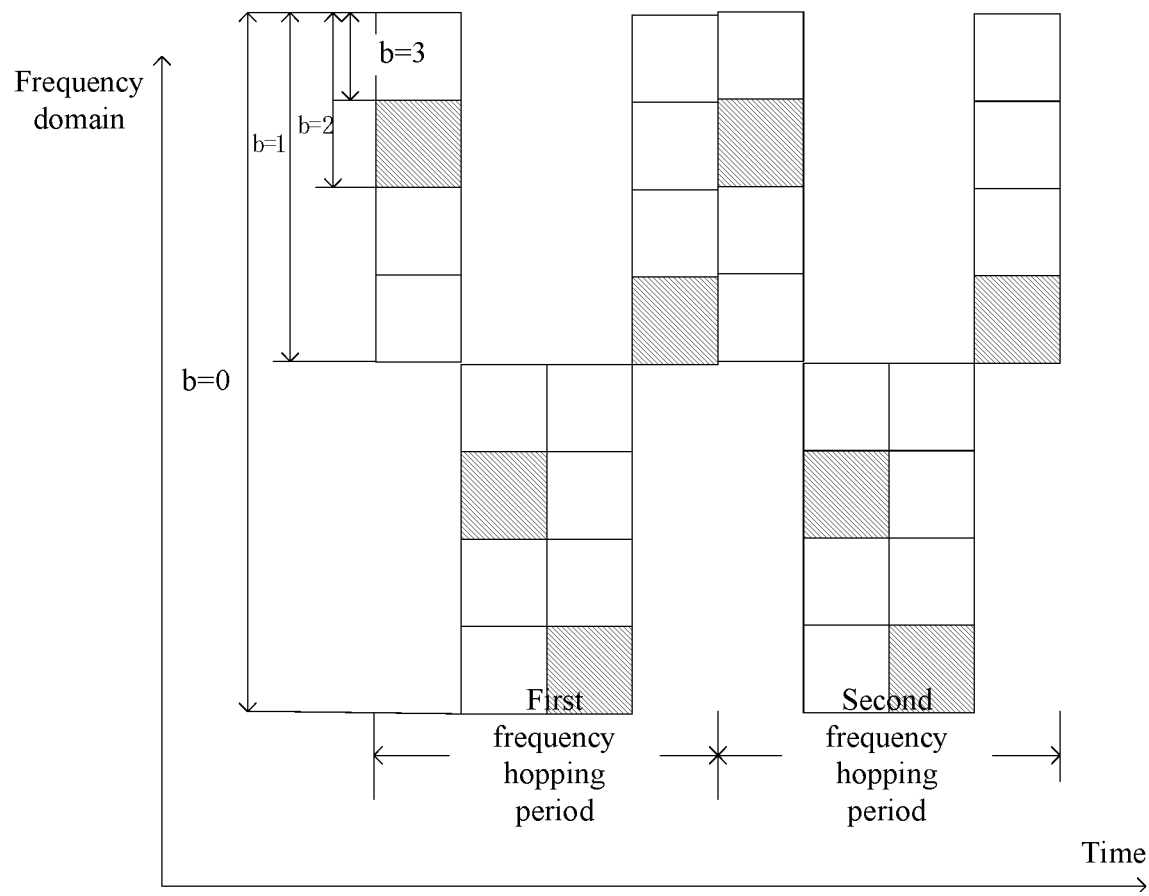
FIG. 10B is an exemplary diagram one illustrating frequency hopping based on a frequency hopping bandwidth level set according to preferred embodiment one of the present application.
Figure 10C:
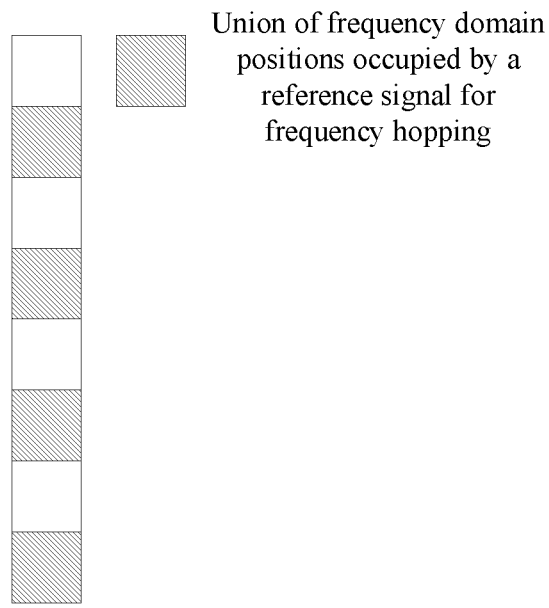
FIG. 10C is a schematic diagram one illustrating a union of frequency domain positions occupied by a reference signal for frequency hopping in a frequency hopping pattern shown in FIG. 10B according to preferred embodiment one of the present application.

Specifically, the SRS is taken as an example and uses a tree structure, $b_{hopA}$ (i.e., the frequency hopping bandwidth level set) is notified, such as $b_{hopA}=\{1, 2\}$ as shown in FIG. 10A. FIG. 10A is exemplary diagram one illustrating different bandwidth index sets for hopping of different bandwidth levels according to preferred embodiment one of the present application, N_b in FIG. 10A is similar to Nb in the above-mentioned embodiment. In the tree structure of the SRS, at the level of $b \in b_{hopA}=\{1, 2\}$, the bandwidth index corresponding to the SRS traverses all bandwidth indexes of this bandwidth level (where all bandwidth indexes corresponding to one bandwidth level are index information of a plurality of bandwidths at a current level corresponding to one bandwidth of a previous level of the one bandwidth level), that is, $n_1(t) \in \{0, 1, \ldots N_1-1\}=\{0, 1\}$ and $n_2(t) \in \{0, 1, \ldots N_2-1\}=\{0, 1\}$. When $b=\{0, 3\} \in b_{hopA}=\{1, 2\}$, the hopping bandwidth indexes are not changed, as shown in FIG. 10A, $n_1(t)=0$ and $n_3(t)=1$. In FIG. 10A, although $n_1(t) \in \{0, 1, \ldots N_1-1\}=\{0, 1\}$ and $n_2(t) \in \{0, 1, \ldots N_2-1\}=\{0, 1\}$, the corresponding bandwidth index of the SRS at the bandwidth level of $\{1, 2\}$ traverses all of the bandwidth indexes of this frequency hopping bandwidth level, merely one bandwidth length of SRS with b=3 is sent at a time. That is, the union (or referred to as the frequency domain positions occupied by the SRS in one frequency hopping period) of the frequency domain positions occupied by the reference signal for frequency hopping is shown as the hatched portion in FIG. 10C. FIG. 10C is schematic diagram one illustrating a union of frequency domain positions occupied by a reference signal for frequency hopping in a frequency hopping pattern shown in FIG. 10B according to preferred embodiment one of the present application. FIG. 10B is exemplary diagram 1 illustrating frequency hopping based on a frequency hopping bandwidth level set according to preferred embodiment one of the present application.

Further the frequency hopping pattern of the SRS over port p is determined by the following formula:

$$k^{(p)}(t) = k^{(p)}_{org} + \sum_{b=0}^{B} N^{RS}_{sc,b} n_b(t) \quad (7\text{-}1)$$

$$n_b(t) = \begin{cases} n_{b,orig} \bmod N_b & b \notin b_{hopA} \\ \{F_b(t) + n_{b,orig}\} \bmod N_b & \text{otherwise} \end{cases} \quad (7\text{-}2)$$

$$F_b(t) = \begin{cases} (N_b/2) \left\lfloor \dfrac{t \bmod \prod_{b' \in b_{hopA}, b' \leq b} N_{b'}}{\prod_{b' \in b_{hopA}, b' \leq \max(b-1,0)} N_{b'}} \right\rfloor + \\ \qquad \left\lfloor \dfrac{t \bmod \prod_{b' \in b_{hopA}, b' \leq b} N_{b'}}{2 \prod_{b' \in b_{hopA}, b' \leq \max(b-1,0)} N_{b'}} \right\rfloor \quad \text{if } N_b \text{ even} \\ \lfloor N_b/2 \rfloor \left\lfloor t \Big/ \prod_{b' \in b_{hopA}, b' \leq \max(b-1,0)} N_{b'} \right\rfloor \quad \text{if } N_b \text{ odd} \end{cases} \quad (7\text{-}3)$$

t is a time parameter (such as the t-th SRS transmission) and b is a bandwidth level index and is equal to 0, 1, . . . , B. B is a non-negative integer and is bandwidth level information in a tree structure corresponding to the maximum continuous frequency domain bandwidth occupied by the reference signal on one time domain symbol or is the largest bandwidth level among the frequency domain bandwidth levels corresponding to the reference signal (in the embodiment, bandwidth level 0 indicates the smallest/highest bandwidth level, that is, one bandwidth length of bandwidth level 0 is the maximum length of all bandwidths, and the embodiment does not exclude that bandwidth level 0 indicates the largest/lowest bandwidth level in which case B is the smallest bandwidth level among the bandwidth levels corresponding to the reference signal). Nb is the number of leaves with a bandwidth level indexed by b included by one leaf with a bandwidth level indexed by min(b+1, 0) (or Nb is the number of bandwidths with a bandwidth level indexed by b included by one bandwidth with a bandwidth level indexed by min(b+1, 0)). $n_{b,orig}$ is an original index of the reference signal with the bandwidth level indexed by b, $n_b(t)$ is a frequency domain bandwidth index corresponding to the reference signal with the bandwidth level indexed by b at time t, and $k_{org}^{(p)}$ is a non-negative integer. $N_{sc,b}^{RS}$ is information about a frequency domain length occupied by one leaf (or referred to as one bandwidth) with the bandwidth level indexed by b, e.g., the unit of $N_{sc,b}^{RS}$ is a subcarrier, and of course the embodiment does not exclude other cases of the unit of $N_{sc,b}^{RS}$, such as a physical PRB being the unit. The frequency domain bandwidth index is index information of a plurality of leaves with a current level included by one leaf with a previous level in a tree structure, and the frequency domain bandwidth index set corresponding to the frequency domain bandwidth level includes a set of index information of all leaves with the current level included by one leaf with the previous level in the tree structure.

Further, the above-mentioned parameters t, B, $n_{b,orig}$, $k_{org}^{(p)}$ and $N_{sc,b}^{RS}$ can be obtained from being notified by the base station and/or searching a predetermined table, or one or more of the above-mentioned parameters can be obtained based on the following formula:

$$k_{org}^{(p)} = (\lfloor N_{RB}^{UL}/2 \rfloor - m_{SRS,0}/2)N_{SC}^{RB} + k_{TC}^{(p)} \qquad (8\text{-}1)$$

$$N_{sc,b}^{RS} = M_{sc,b}^{RS} K_{TC}$$

$$M_{sc,b}^{RS} = m_{SRS,b} N_{sc}^{RB}/K_{TC} \qquad (8\text{-}2)$$

$$\overline{k}_0^{(p)} = \begin{cases} (N_{RB}^{UL} - m_{SRS,0}^{max})N_{sc}^{RB} + k_{TC}^{(p)} & \text{if } ((n_f \bmod 2) \cdot (2 - N_{SP}) + n_{hf}) \bmod 2 = 0 \\ k_{TC}^{(p)} & \text{otherwise} \end{cases} \qquad (8\text{-}3)$$

$$n_{b,orig} = \lfloor 4n_{RRC}/m_{SRS,b} \rfloor; \qquad (8\text{-}4)$$

$$t = \begin{cases} 2N_{sp}n_f + 2(N_{sp}-1)\lfloor \frac{n_s}{10} \rfloor + \lfloor \frac{T_{offset}}{T_{offset\_max}} \rfloor, & \text{for } 2\,ms\, SRS \text{ periodicity of frame structure type 2} \\ \lfloor (n_f \times 10 + \lfloor n_s/2 \rfloor)/T_{SRS} \rfloor, & \text{otherwise} \end{cases}$$

$$B = B_{SRS}.$$

Figure 11A:
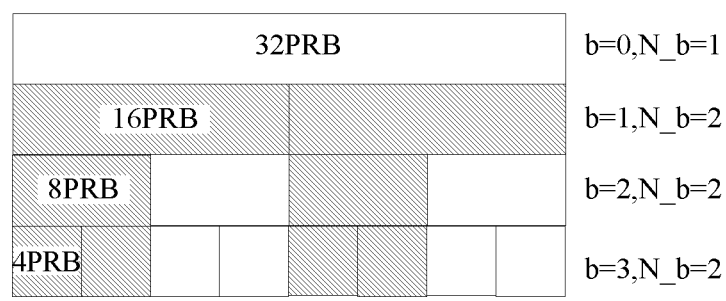
FIG. 11A is an exemplary diagram two illustrating different bandwidth index sets for hopping of different bandwidth levels according to preferred embodiment one of the present application.
Figure 11B:
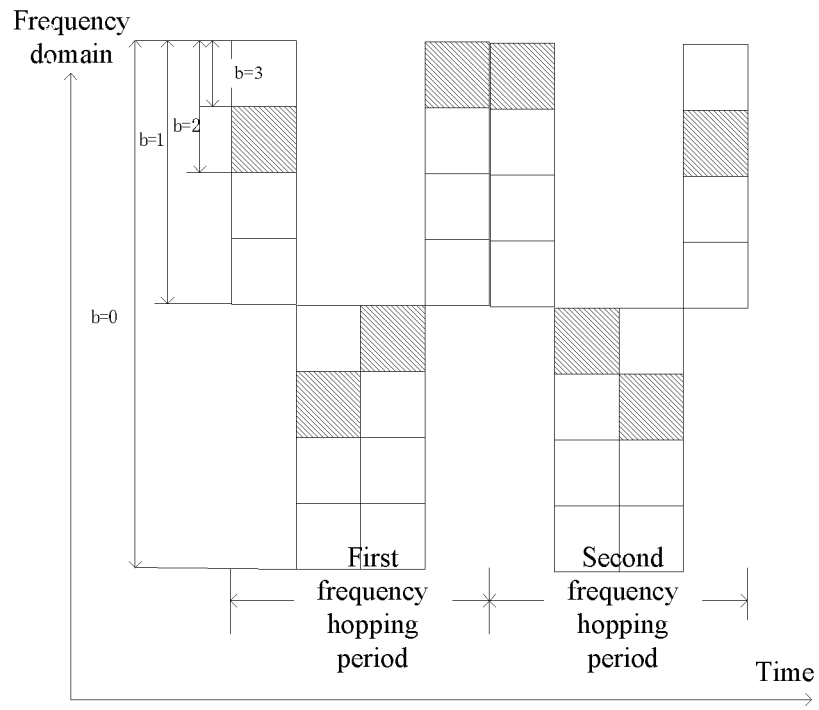
FIG. 11B is an exemplary diagram two illustrating frequency hopping based on a frequency hopping bandwidth level set according to preferred embodiment one of the present application.
Figure 11C:
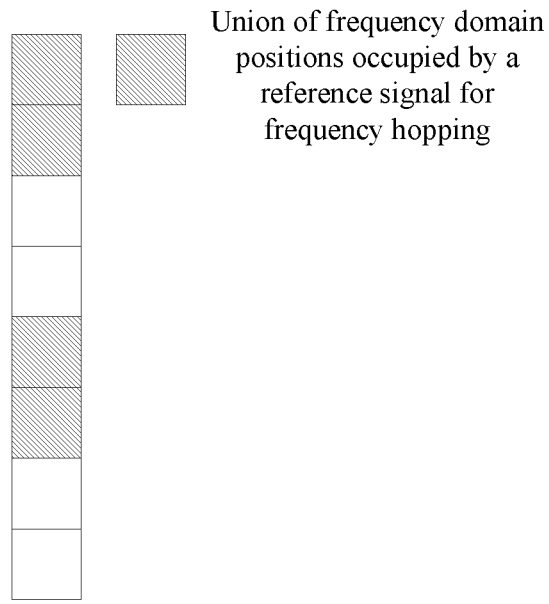
FIG. 11C is a schematic diagram one illustrating a union of frequency domain positions occupied by a reference signal for hopping in a frequency hopping pattern shown in FIG. 11B according to preferred embodiment one of the present application.

$n_f$ is a frame index, $n_s$ is a sub-frame index, $T_{SRS}$ is a period (in units of sub-frames) of the SRS. Of course, $n_f$ may also be a first time unit index and $n_s$ is a second time unit index, where the first time unit includes one or more second time units. $T_{offset}$ is the periodic offset, $$\frac{T_{offset}}{T_{offset\_max}}$$

is the maximum value of the periodic offset, $N_{SP}$ is the number of special sub-frames in one radio frame, $\overline{k}_{TC}$ is a comb offset, $k_{TC}$ is the total number of comb levels, i.e., repetition factor (RPF), $B_{SRS}$ is parameter information for determining a frequency domain bandwidth length occupied by an SRS on one time domain symbol, i.e., a tree structure level corresponding to the frequency domain bandwidth occupied by the SRS on one time domain symbol, or $B_{SRS}$ is the maximum frequency domain bandwidth level among the frequency domain bandwidth levels corresponding to the reference signal, $m_{SRS,b}$ can be obtained from a table according to a value of b, and $n_{RRC}$ is frequency domain position information of the SRS and is a multiple of 4. $N_{RB}^{UL}$ is the number of PRBs corresponding to an uplink system bandwidth distributed to the terminal, $N_{SC}^{RB}$ is the number of subcarriers in one PRB and is 12, $n_f$ is a frame index, $n_{hf}$ is 0 in the first half of radio frame and 1 in the second half of radio frame, $N_{SP}$ is the number of special sub-frames in one radio frame (or the number of GAPs in one radio frame, where a GAP is a guard interval between an uplink and a downlink), and $\overline{k}_{TC}$, $k_{TC}$, $B_{SRS}$, $n_{RRC}$ and $b_{hop}$ are each configured at a high layer. Specifically, in the tree structure shown in FIG. 1, it is configured that $b_{hopA}$={1, 2} and $B_{SRS}$=3, the frequency hopping patterns of formulas (7-1) to (8-4) are used, and then the frequency hopping pattern is shown in FIG. 10B, so that the union of the frequency domain positions occupied by the reference signal for frequency hopping is shown as the hatched portion in FIG. 10C. That is, discontinuous frequency bands exist among the frequency domain positions occupied by the reference signal for frequency hopping, and/or the frequency domain positions occupied by the reference signal are smaller than the frequency hopping bandwidth (at this time, the frequency hopping bandwidth has a length of a bandwidth corresponding to the bandwidth level of max(min($b_{hopA}$), 0)=0). In the above configuration, the frequency hopping level set in $b_{hopA}$ is continuous, and the maximum value in the frequency hopping level set is less than $B_{SRS}$, that is, max ($b_{hopA}$)<$B_{SRS}$. Of course, the embodiment does not exclude that the frequency hopping levels in the frequency hopping level set are discontinuous, for example, $b_{hopA}$={1, 3} and $B_{SRS}$=3 are configured, and then the corresponding bandwidth index of the SRS at each bandwidth level is as shown in FIG. 11A. FIG. 11A is exemplary diagram two illustrating different bandwidth index sets for hopping of different bandwidth levels according to preferred embodiment one of the present application; formulas (7-1) to (8-4) are used, and the frequency hopping pattern (i.e., the pattern of the frequency domain occupied by the reference signal changing with time) of the reference signal is shown in FIG. 11B. FIG. 11B is exemplary diagram two illustrating frequency hopping based on a frequency hopping bandwidth level set according to preferred embodiment one of the present disclosure. At this time, the frequency domain positions occupied by the reference signal in one frequency hopping period is shown as the hatched portion in FIG. 11C. FIG. 11C is schematic diagram one illustrating a union of frequency domain positions occupied by a reference signal for hopping in a frequency hopping pattern shown in FIG. 11B according to preferred embodiment one of the present application.

In formulas (7-1) to (7-2), at a level that does not belong to the frequency hopping level set, the frequency domain bandwidth index information of the reference signal does not change with time, and at a level that belongs to the frequency hopping level set, the frequency domain bandwidth index of the reference signal changes with time. In another implementation mode of the embodiment, at a level that does not belong to the frequency hopping level set, the frequency domain bandwidth index information of the reference signal changes with time, but the frequency domain bandwidth index set corresponding to the reference signal at the level is a proper subset of the frequency domain bandwidth index set corresponding to the frequency domain bandwidth level; at a level that belongs to the frequency hopping bandwidth level set, the frequency domain bandwidth index occupied by the reference signal changes with time and at a level that belongs to the frequency domain bandwidth level set, a frequency domain bandwidth index set occupied by the reference signal is the frequency domain bandwidth index set corresponding to the frequency domain bandwidth level.

Figure 12A:
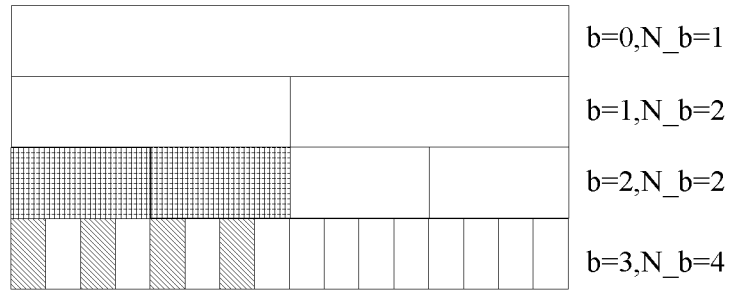
FIG. 12A is an exemplary diagram three illustrating different bandwidth index sets for hopping of different bandwidth levels according to preferred embodiment one of the present application.

For example, the frequency hopping level set is set to be $b_{hopA}=2$ as shown in FIG. 12A. FIG. 12A is exemplary diagram three illustrating different bandwidth index sets for hopping of different bandwidth levels according to preferred embodiment one of the present application. When b=0 and 1, $n_b(t)=0$. When b=2, $n_2(t)\in \{0, 1\}=\{0, 1, \ldots N_2-1\}$, that is, the bandwidth index set for frequency hopping is the set of all the bandwidth indexes at the bandwidth level. When b=3, $n_3(t)\in \{0, 2\}\in \{0, 1, \ldots N_3-1\}$, that is, the bandwidth index set for frequency hopping is a proper subset of the set of all the bandwidth indexes corresponding to the bandwidth level. That is, three types of level sets, i.e., {0, 1}, {2} and {3} exist. For the bandwidth level set {0, 1}, the bandwidth index occupied by the reference signal is a fixed value that does not change with time; for the bandwidth level set {2}, the bandwidth index occupied by the reference signal traverses all the bandwidth indexes; for the bandwidth level set {3}, the bandwidth index occupied by the reference signal is a proper subset of the bandwidth index set corresponding to the bandwidth level. All the bandwidth indexes corresponding to the bandwidth level of N are the bandwidth indexes corresponding to a plurality of bandwidths with the bandwidth level of N included by one bandwidth with the bandwidth level of (N−1). N is an integer greater than 0, that is, bandwidth levels are divided into a plurality of groups, and different bandwidth level groups correspond to different relationships. The relationships include at least one of the following: a mapping relationship between frequency domain bandwidth indexes corresponding to the reference signal and a time domain parameter, a relationship between a frequency domain bandwidth index set corresponding to the reference signal with one frequency domain bandwidth level and all frequency domain bandwidth index sets corresponding to the one frequency domain bandwidth level, whether a bandwidth level is subjected to frequency hopping, or a frequency hopping sequence of bandwidth level groups.

Further, formula (7-3) is changed to the following formula:

$$F_b(t) = \begin{cases} (N_b/k_b)\left\lfloor \dfrac{t \bmod \prod_{b'\in b_{hopA}, b'\leq b} N_{b'}}{\prod_{b'\in b_{hopA}, b'\leq max(b-1,0)} N_{b'}} \right\rfloor + \\ \sum_{l=1}^{N_b/k_b-1} \beta_b(l) \left\lfloor \dfrac{t \bmod \prod_{b'\in b_{hopA}, b'\leq b} N_{b'}}{lk_b \prod_{b'\in b_{hopA}, b'\leq max(b-1,0)} N_{b'}} \right\rfloor & \text{if } N_b \text{ even} \\ (\lceil N_b/k_b \rceil)\left\lfloor \dfrac{t \bmod \prod_{b'\in b_{hopA}, b'\leq b} N_{b'}}{\prod_{b'\in b_{hopA}, b'\leq max(b-1,0)} N_{b'}} \right\rfloor + \\ \sum_{l=1}^{\lceil N_b/k_b \rceil-1} \beta_b(l) \left\lfloor \dfrac{t \bmod \prod_{b'\in b_{hopA}, b'\leq b} N_{b'}}{\sum_{l'=0}^{l-1}\left[(k_b-\alpha_{l'})\prod_{b'\in b_{hopA}, b'\leq max(b-1,0)} N_{b'}\right]} \right\rfloor & \text{if } N_b \text{ odd} \end{cases} \quad (9\text{-}1)$$

where $$\alpha_{l'} = \begin{cases} 0, & l' \leq (N_b \bmod \lceil N_b/k_b \rceil) \\ 1, & \text{otherwise} \end{cases};$$

$$\beta_b(l) = l \text{ and } k_b = 2$$

by default. Of course, values of $\beta_b(l)$ and $k_b$ may also be configured. When $N_b$ is an even number, $k_b$ is a factor of $N_b$. $\beta_b(l)$ is an integer, or $$\beta_b(l) = \begin{cases} \beta_b(l) = l, & b \in b_{hopA} \\ \beta_b(l) = 0, & b \notin b_{hopA} \end{cases}. \quad (9\text{-}2)$$

Figure 12B:
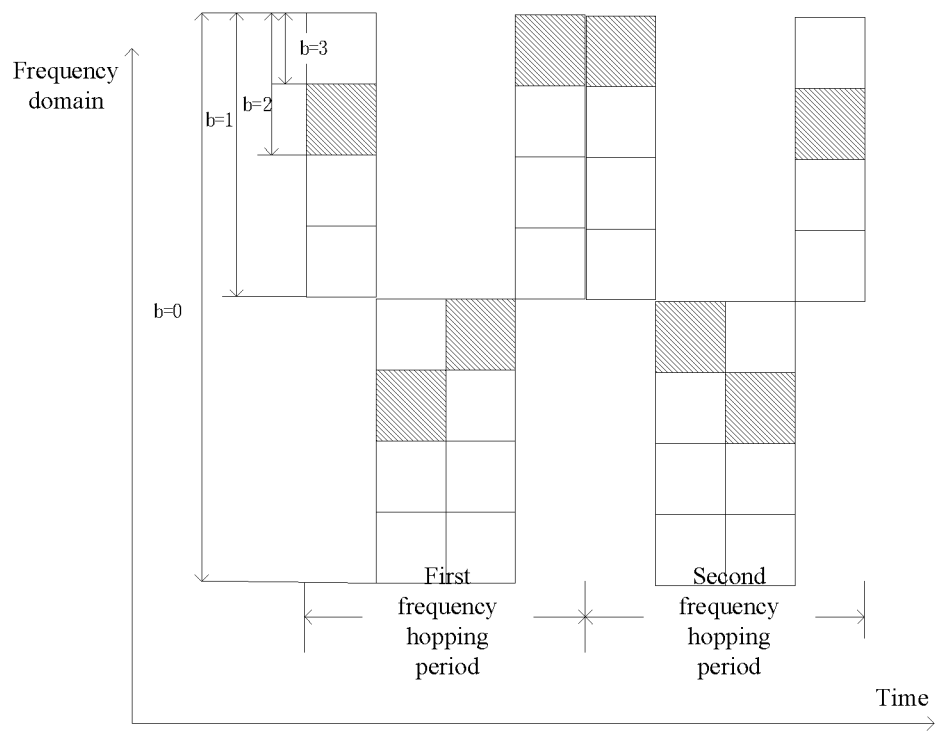
FIG. 12B is an exemplary diagram three illustrating frequency hopping based on a frequency hopping bandwidth level set according to preferred embodiment one of the present application.

For configuration of the frequency hopping level set shown in FIG. 12A, the frequency hopping pattern shown in FIG. 12B is obtained based on formula (9). FIG. 12B is exemplary diagram three illustrating frequency hopping based on a frequency hopping bandwidth level set according to preferred embodiment one of the present application; optionally, $\beta_b(l)\in \{0, 1, \ldots, \lceil N_b/k_b \rceil-1\}$, or formula (9-1) is unified as formula (9-3):

$$F_b(t) = (x_b)\left\lfloor \dfrac{t \bmod \prod_{b'\in b_{hopA}, b'\leq b} N_{b'}}{\prod_{b'\in b_{hopA}, b'\leq max(b-1,0)} N_{b'}} \right\rfloor + \quad (9\text{-}3)$$

-continued $$\sum_{l=1}^{x_b-1} \beta_b(l) \left| \frac{t \bmod \prod_{b' \in b_{hopA}, b' \leq b} N_{b'}}{\sum_{l'=0}^{l-1} \left[ (k_b - \alpha_{l'}) \prod_{b' \in b_{hopA}, b' \leq max(b-1,0)} N_{b'} \right]} \right|$$

where $$\alpha_{l'} = \begin{cases} 0, l' \leq (N_b \bmod x_b) \\ 1, \text{ otherwise} \end{cases}$$

$x_b$ is a natural number less than or equal to $N_b$, optionally, $x_b = \lceil N_b/k_b \rceil$ or $x_b = \lfloor N_b/k_b \rfloor$ and $x_b$ denotes information about the number of bandwidth groups, $\beta_b(l)$ denotes a control of whether the bandwidth group is subjected to frequency hopping and/or a frequency hopping sequence of different bandwidth groups. The bandwidth grouping denotes converting $N_b$ bth level bandwidths included in one (b−1)th level bandwidth to a plurality of bandwidth groups. Preferably the bandwidth groups are equally spaced apart.

In one embodiment, the frequency domain bandwidth index set information corresponding to the reference signal at each bandwidth level may be further notified so that the reference signal hops in the bandwidth indicated by the bandwidth index in the bandwidth index set corresponding to the bandwidth level and does not perform frequency hopping in the bandwidth not belonging to the bandwidth index set (i.e., no reference signal is transmitted in the bandwidth indicated by the bandwidth index).

Preferred Embodiment Two

Figure 13:
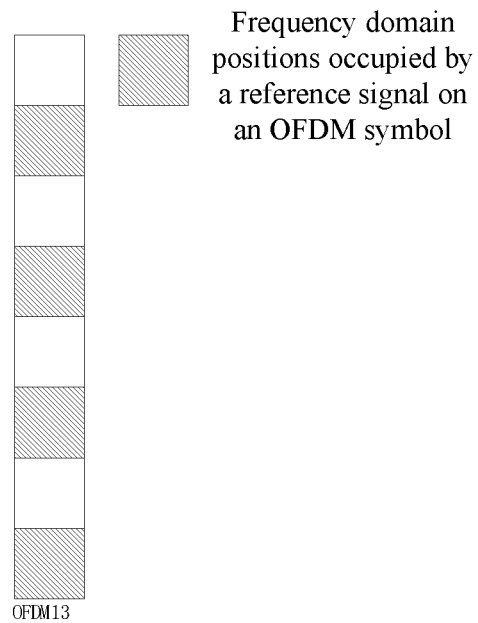
FIG. 13 is a schematic diagram illustrating discontinuous frequency domain positions occupied by a reference signal on a time domain symbol according to preferred embodiment two of the present application.

In the preferred embodiment, the frequency domain positions occupied by a measurement reference signal sent on one time domain symbol include discontinuous frequency bands, as shown in FIG. 13. FIG. 13 is a schematic diagram illustrating discontinuous frequency domain positions occupied by a reference signal on a time domain symbol according to preferred embodiment two of the present application.

Figure 14:
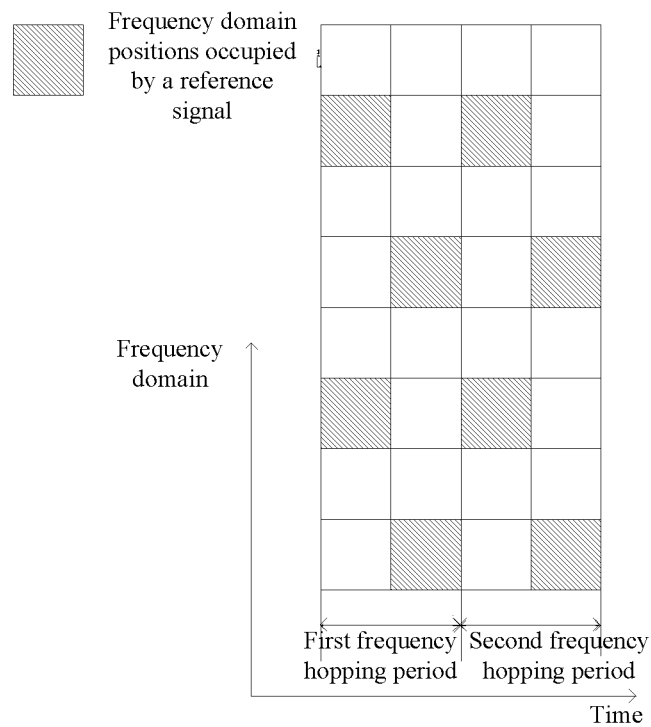
FIG. 14 is an exemplary diagram illustrating a frequency hopping pattern in which a reference signal occupies discontinuous frequency domain positions on a time domain symbol according to preferred embodiment two of the present application.

Further, in frequency hopping, discontinuous frequency bands exist among the frequency domain positions occupied by the measurement reference signal sent on one time domain symbol, as shown in FIG. 14. FIG. 14 is an exemplary diagram illustrating a frequency hopping pattern in which a reference signal occupies discontinuous frequency domain positions on a time domain symbol according to preferred embodiment two of the present application.

The frequency domain positions occupied by the reference signals shown in FIGS. 13 and 14 and the frequency hopping patterns of the reference signals are merely examples, and the embodiment does not exclude other frequency domain positions of the reference signal or other frequency hopping patterns of the reference signal.

Discontinuous frequency bands exist on a time domain symbol, one way is to configure an independent reference signal resource per continuous frequency band, and the other way is to allocate these discontinuous frequency bands simultaneously in a reference signal resource.

Figure 15A:
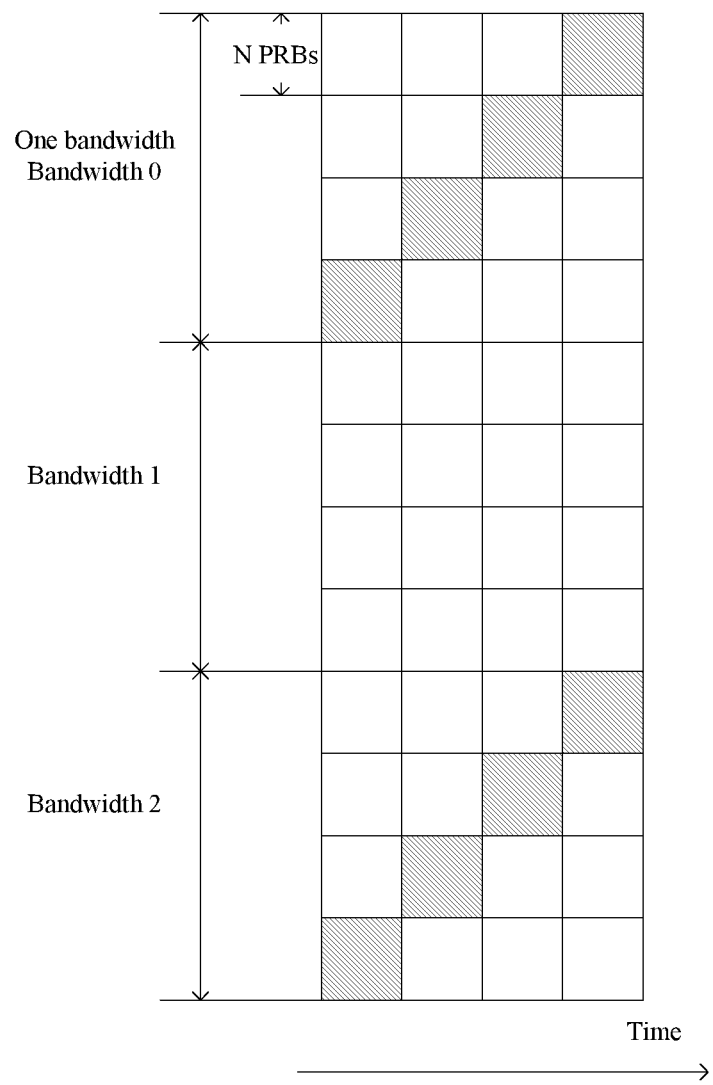
FIG. 15A is a schematic diagram one illustrating a frequency hopping process in which a plurality of discontinuous frequency bands exists on a time domain symbol according to preferred embodiment two of the present application.
Figure 15B:
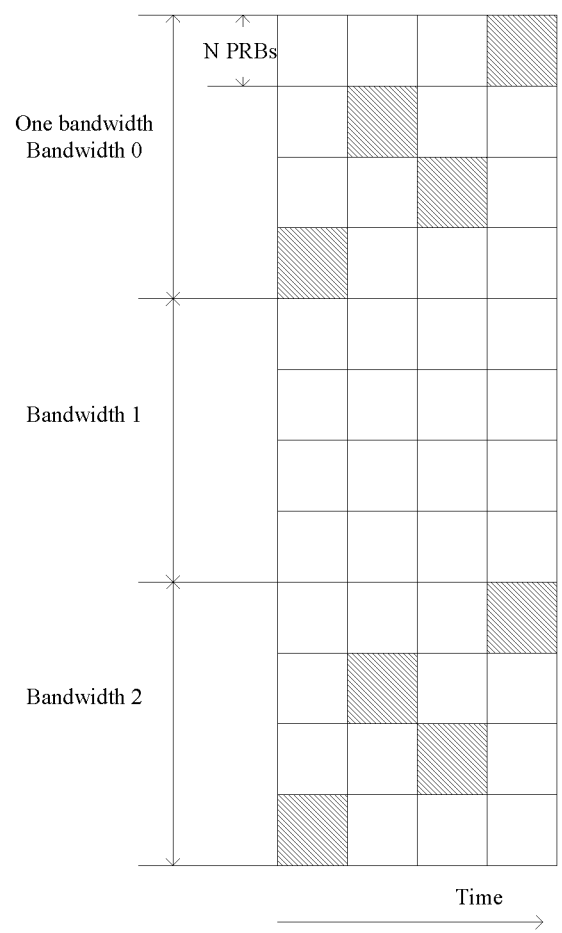
FIG. 15B is a schematic diagram two illustrating a frequency hopping process in which a plurality of discontinuous frequency bands exists on a time domain symbol according to preferred embodiment two of the present application.
Figure 15C:
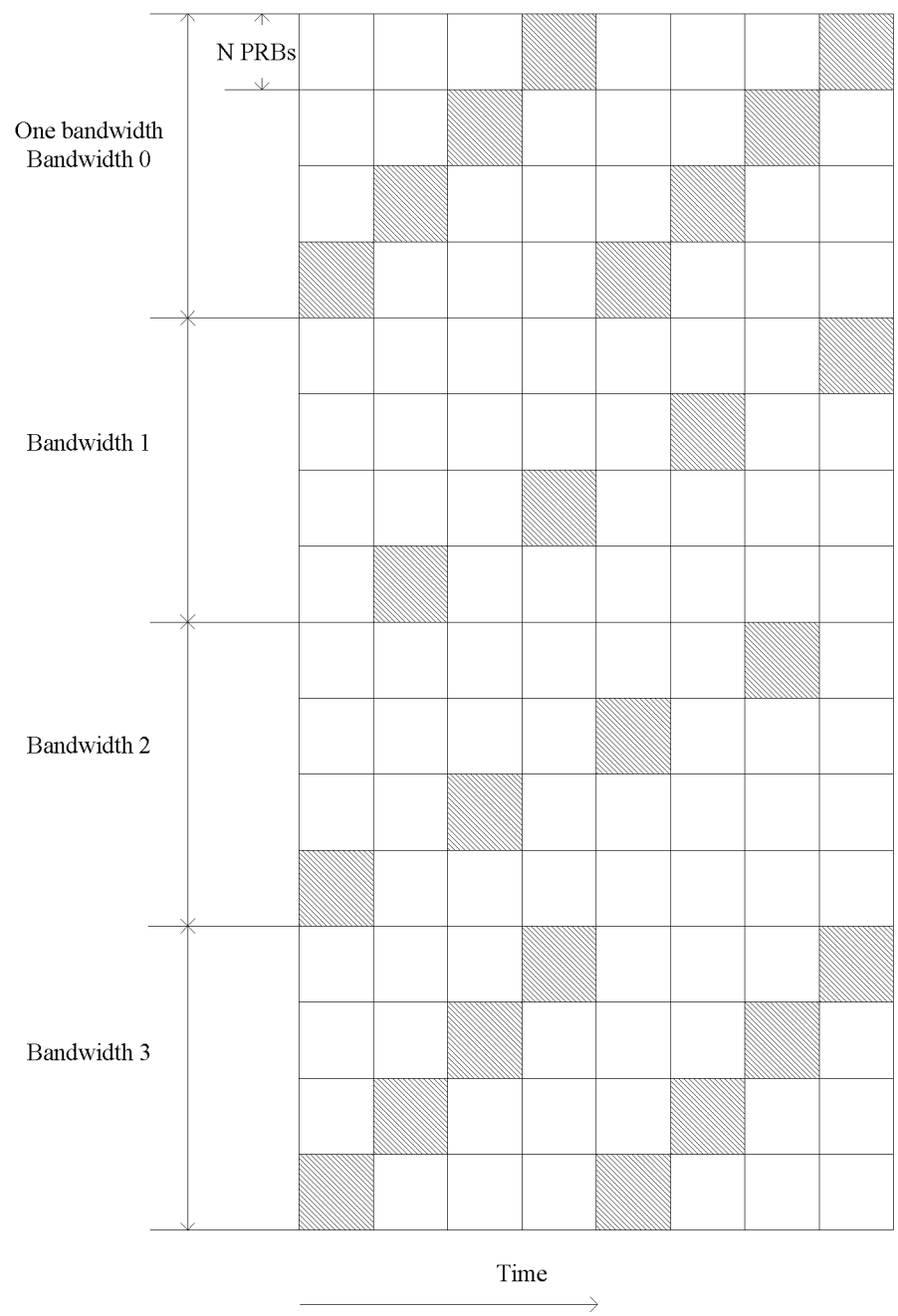
FIG. 15C is a schematic diagram three illustrating a frequency hopping process in which a plurality of discontinuous frequency bands exists on a time domain symbol according to preferred embodiment two of the present application.

Specifically, an uplink reference signal SRS is taken as an example in the following description. when a frequency hopping pattern as shown in FIG. 15A is required to be triggered, where FIG. 15A is schematic diagram one illustrating a frequency hopping process in which a plurality of discontinuous frequency bands exist on a time domain symbol according to preferred embodiment two of the present application, the SRS occupies two frequency bands on one time domain symbol, and the two frequency bands are also discontinuous, that is, at this time, the SRS occupies two frequency domain bandwidths on one time domain symbol. The two bandwidths are bandwidth 0 and bandwidth 1, respectively. As shown in FIG. 15A, the frequency band 0 includes four small bands, the frequency band 1 includes small bands, and the reference signal occupies merely one subband in one frequency band at a time. If the multi-level bandwidth structure continues to be used, i.e., bandwidths 0, 1 and 2 in FIG. 15A correspond to a bandwidth of level b=1 and a small bandwidth in bandwidth i in FIG. 15A corresponds to a large bandwidth of level b=2. SRS resource 1 may now be allocated to bandwidth 0, SRS resource 2 may be allocated to bandwidth 2, where an SRS resource includes one or more SRS ports. Frequency hopping parameters are configured for SRS resource 1 and SRS resource 2. However, SRS resource 1 and SRS resource 2 are sent on the same time domain symbol, and the corresponding SRS ports may be the same. For example, SRS resource 1 and SRS resource 2 are the same in the other configuration parameters and differ in the original frequency hopping positions, i.e., similar to differing in $n_{RRC}$ in LTE. Similarly, as shown in FIG. 15B, where FIG. 15B is schematic diagram 2 illustrating a frequency hopping process in which a plurality of discontinuous frequency bands exists on a time domain symbol according to preferred embodiment two of the present application, different SRS resources are configured for bandwidth 0 and bandwidth 2, and the two resources may be sent on the same time domain symbol and differ in the original frequency hopping positions, i.e., similar to differing in $n_{RRC}$ in LTE. Alternatively, as shown in FIG. 15C, where FIG. 15C is schematic diagram 3 illustrating a frequency hopping process in which a plurality of discontinuous frequency bands exists on a time domain symbol according to preferred embodiment two of the present application, three SRS resources are configured, SRS resource 1 is configured for frequency hopping in bandwidth 0, SRS resource 2 is configured for frequency hopping in {bandwidth 1, bandwidth 2}, and SRS resource 3 is configured for frequency hopping in bandwidth 3. Independent frequency hopping parameters may be configured for the SRS resources, optionally, the SRS resources may share some parameter configuration, such as antenna port configuration.

In the above examples, independent SRS resources are respectively configured for each of multiple continuous frequency bands on a time domain symbol, and the multiple continuous frequency bands are discontinuous from each other. In another implementation mode of the embodiment, one SRS resource is configured for the multiple continuous frequency bands on the time domain symbol, except that the one SRS resource corresponds to multiple independent parameter configuration information. For example, the SRS resource in FIG. 15A or FIG. 15B corresponds to two series of parameter configurations, and FIG. 15C corresponds to three series of parameter configurations.

Further, in multiple SRS resources or multiple SRS parameter configurations configured for multiple continuous frequency bands on a time domain symbol, different SRS resources or different SRS parameter configurations may include at least one of the following parameters: frequency hopping level sets, frequency hopping original level information, or frequency hopping end level information.

Preferred Embodiment Three

In the embodiment, the frequency hopping pattern is notified by dynamic control signaling. At least one of the following information is notified in the dynamic control signaling: frequency hopping bandwidth level set information, frequency hopping bandwidth original level information, frequency hopping bandwidth end level information, information about a frequency domain bandwidth level occupied by a reference signal on a time domain symbol, information about the number of frequency hopping periods, information about the number of time domain symbols occupied by the reference signal, reference signal period information, reference signal period offset information, index information about a time domain symbol occupied by the reference signal in one time unit, information about the number of time domain symbols occupied by the reference signal in one time unit, time domain frequency hopping unit information of the reference signal, information about the number of ports corresponding to the reference signal, information about the number of port groups of the reference signal, reference signal port group hopping pattern information, or reference signal frequency hopping parameter set index information, a relationship between reference signal resource group hopping and frequency domain hopping, a relationship between port group hopping and the frequency domain hopping, an original frequency domain position occupied by the reference signal, an amount of frequency domain hopping of the reference signal, a frequency domain interval between frequency domain positions corresponding to adjacent frequency domain hopping, a function type that frequency domain positions occupied by the reference signal change with time, frequency domain bandwidth index set information corresponding to the reference signal at a frequency domain bandwidth level, frequency hopping frequency band set information of the reference signal, whether the reference signal is in a continuous frequency domain frequency hopping mode or a discontinuous frequency domain frequency hopping mode, frequency domain bandwidth level grouping information, information about whether a frequency domain bandwidth level group is subjected to frequency hopping, frequency domain bandwidth grouping information, information about whether a frequency domain bandwidth group is subjected to the frequency hopping, or information about a frequency hopping sequence of frequency domain bandwidth groups. The frequency hopping parameter set information is carried in high-layer control signaling (for example, radio resource control (RRC) signaling and/or media access control element (MAC CE) signaling are included in the high-layer signaling), and the time domain frequency hopping unit information of the reference signal refers to that the reference signal hops every other time domain symbol included in the time domain frequency hopping unit, and the frequency domain position of the reference signal in the time domain frequency hopping unit is unchanged.

Figure 16:
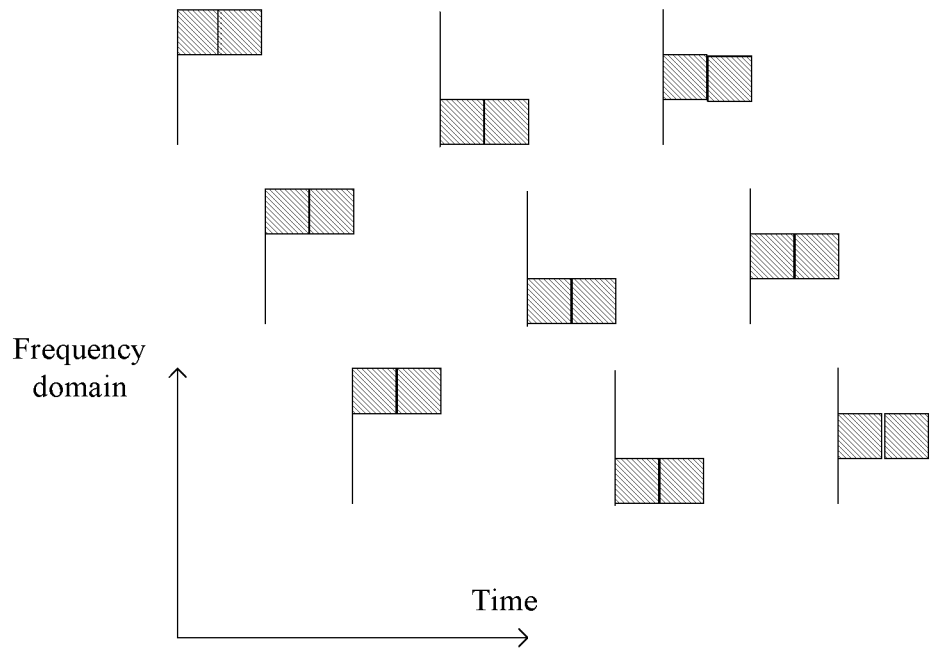
FIG. 16 is a schematic diagram illustrating two time domain symbols as a time domain frequency hopping unit according to preferred embodiment three of the present application.

Specifically, similar to the tree structure of the frequency domain positions of the reference signal in LTE, the hopping bandwidth level set information is $b_{hopA}$ as described in the embodiment, the frequency hopping bandwidth original level information is similar to $b_{hop}$ in LTE or is the minimum value of $b_{hopA}$ as described in embodiment one, and the frequency hopping bandwidth end level information is similar to $B_{SRS}$ in LTE or is the maximum value of $b_{hopA}$ as described in embodiment one. Information about the frequency domain bandwidth level occupied by the reference signal on one time domain symbol is similar to $B_{SRS}$ in LTE or B in embodiment one. Information about the number of frequency hopping periods indicates the number of times the reference signal is sent on the same frequency domain positions, as shown in FIG. 2, the number of frequency hopping periods is 1, and as shown in FIGS. 11B, 12B and 14, the number of frequency hopping periods is 2. Information about the number of time domain symbols occupied by the reference signal indicates the number of time domain symbols occupied by the current dynamically triggered reference signal resource, including the number of time domain symbols occupied in one slot and the number of occupied slots. The information about the number of time domain symbols occupied by the reference signal may be of the reference signal resource level (i.e., one reference signal resource corresponds to information about one number, i.e., the number of time domain symbols occupied by the reference signal resource in total, and now it is possible that the number of time domain symbols occupied by one reference signal port in the resource signal resource is less than the number of time domain symbols occupied by the reference signal resource), and may also be of a port level (i.e., different reference signal ports in a reference signal resource may occupy different numbers of time domain symbols, or all reference signal ports in a reference signal resource occupy the number of time domain symbols, where the number is the information about the number of time domain symbols, and when merely part of the reference signal ports in the reference signal resource are transmitted on one time domain symbol, the total number of time domain symbols occupied by the reference signal resource is larger than the number of time domain symbols occupied by one port). Information about a reference signal period (indicating information about a period of time domains of the reference signal, or a period of slots occupied by the reference signal, where multiple slots may be occupied in each slot, and different time domain symbols in one slot do not satisfy the periodic characteristics), information about a reference signal period offset, index information about a time domain symbol occupied by the reference signal in a time unit (e.g., a slot or a sub-frame is a time unit, time domain symbols occupied in one slot are continuous or distributed at equal intervals of the time domain, and at this time, an original time domain symbol index and/or an end time domain symbol index are merely notified, or the original time domain symbol index and time domain duration are notified, and/or information about an interval between time domain symbols are notified), information about the number of time domain symbols occupied by the reference signal in the time unit, time domain frequency hopping unit information about the reference signal (now the time domain frequency hopping unit in LTE is one time domain symbol, that is, frequency hopping is started in the frequency domain when domain symbols change, a plurality of time domain symbols may be activated in a slot due to the fact that receiving beam training is considered in the NR, and possible port group hopping followed by frequency domain hopping are considered, so that frequency domain hopping needs to be performed every N reference signal time domain symbols, where N is a natural number as shown in FIG. 16, FIG. 16 is a schematic diagram illustrating two time domain symbols as a time domain frequency hopping unit according to preferred embodiment three of the present application, and frequency domain hopping occurs once every two reference signal time domain symbols), information about the number of ports corresponding to the reference signal, information about the number of port groups of the reference signal (reference signal ports in one reference signal resource are grouped, and the ports in the reference signal resource are grouped according to information about the number of ports and information about the number of port groups in the signal resource group and an agreed rule), reference signal port group hopping pattern information (relevant information about how port groups hop when multiple reference signal port groups exist), index information about a reference signal frequency hopping parameter set configured through high-layer signaling (such as RRC signaling and/or MAC CE signaling, where a plurality of reference signal frequency hopping parameter sets may be notified in the high-layer signaling, and selection information about the plurality of reference signal frequency hopping parameter sets notified in the high-layer signaling is further notified in the dynamic signaling, for example, eight frequency hopping parameter sets are notified in the high-layer signaling, and it is further notified in the dynamic signaling which one of the eight frequency hopping parameter sets of the reference signal is in use currently, and of course, different ones of the plurality of reference signal sets notified by the high-layer signaling may correspond to different reference signal resources, where one or more of the reference signal frequency hopping pattern parameters described herein may be included in one reference signal frequency hopping parameter set), a relationship between reference signal resource group hopping and frequency domain hopping (e.g., when a plurality of SRS resources exists, SRS resource hopping followed by frequency domain resource hopping, or frequency domain hopping followed by SRS resource hopping, or SRS resource hopping at the same time of the frequency domain hopping), a relationship between port group hopping and frequency domain hopping (e.g., one SRS resource includes a plurality of antenna ports, the antenna ports are divided into antenna port groups, the relationship between the antenna port group hopping and the frequency domain hopping needs to be determined, and the relationship includes SRS antenna port group hopping followed by frequency domain resource hopping, frequency domain hopping followed by SRS port group hopping, or SRS antenna port group hopping at the same time of frequency domain hopping), an original frequency domain position occupied by the reference signal (such as an original frequency domain position of the reference signal during frequency hopping), the amount of frequency domain hopping of the reference signal (i.e., the number of frequency domain changes of the reference signal), a frequency domain interval (a hopping interval, where the unit of the frequency domain interval is a frequency band, and one frequency band is at least one of the following: a PRB, a sub-band, a bandwidth part or a bandwidth corresponding to a component carrier frequency) between frequency domain positions corresponding to adjacent frequency domain hopping, and a function type (e.g., multiple frequency hopping pattern functions exist, a frequency hopping pattern function is determined by signaling or an agreed rule, where the frequency hopping pattern is a function of the frequency domain position occupied by the reference signal changing with time) that frequency domain positions occupied by the reference signal change with time, frequency domain bandwidth index set information corresponding to the reference signal at a frequency domain bandwidth level (in the case of multi-level frequency domain bandwidth, a frequency domain bandwidth index set corresponding to the reference signal at a frequency domain bandwidth level is a frequency domain bandwidth index occupied by the reference signal), frequency hopping frequency band set information of the reference signal (e.g., frequency hopping frequency bands allocated by a base station to the terminal are {frequency band 1, frequency band 5, frequency band 6}, and the terminal performs frequency hopping in the allocated frequency hopping frequency band set), whether the reference signal is in a continuous frequency domain frequency hopping mode or a discontinuous frequency domain frequency hopping mode (as shown in the squares of FIG. 2, the frequency domain positions occupied by the reference signal in one frequency hopping period are continuous, and as shown in the hatched portion of FIG. 10c, discontinuous frequency bands exist among the frequency domain positions occupied by the reference signal in one frequency hopping period); frequency domain bandwidth level grouping information (frequency domain bandwidth levels are divided into a plurality of groups, and different frequency domain bandwidth level groups correspond to different relationships, where the relationships include at least one of the following: a mapping relationship between frequency domain bandwidth indexes corresponding to the reference signal and a time domain parameter, or a relationship between a frequency domain bandwidth index set corresponding to the reference signal with one frequency domain bandwidth level and all frequency domain bandwidth index sets corresponding to the one frequency domain bandwidth level, for example, for a bandwidth level in level group 1, the bandwidth index corresponding to the reference signal changes with time, and/or the bandwidth index corresponding to the reference signal is subset 1 of all frequency domain bandwidth index sets corresponding to the bandwidth level, and for a bandwidth level in level group 2, the bandwidth index corresponding to the reference signal does not change with time, and/or the bandwidth index corresponding to the reference signal is subset 2 of all frequency domain bandwidth index sets corresponding to the bandwidth level), information for indicating whether a frequency domain bandwidth level group is subjected to frequency hopping, frequency domain bandwidth grouping information (e.g., a plurality of bandwidths with the bandwidth level of N included in one bandwidth with the bandwidth level of (N−1) is divided into a plurality of groups), information about whether a frequency domain bandwidth group is subjected to the frequency hopping, or information about a frequency hopping sequence of frequency domain bandwidth groups (e.g., the frequency hopping sequence is frequency domain bandwidth group 1, frequency domain bandwidth group 2 and frequency domain bandwidth group 3, or frequency domain bandwidth group 1, frequency domain bandwidth group 3 and frequency domain bandwidth group 2, where the frequency hopping sequence is a sequence of sending time of different bandwidth groups).

In the above embodiment, frequency hopping-related parameter information is notified in the physical layer dynamic control signaling, and the embodiment does not exclude that at least one of the following information is notified in the physical layer dynamic control signaling: tree structure information (similar to $C_{SRS}$ in LTE, and according to this parameter, a tree structure can be established, such as information about the number of levels of a tree, the number of leaves included in each level, bandwidth length information corresponding to each leaf, etc.).

In the above embodiment, the above information is notified in the physical layer dynamic control signaling, and the embodiment does not exclude that some of the above parameters are notified in the physical layer dynamic signaling or that some of the above parameters are notified in the high-layer control signaling. In combination, frequency hopping parameters are determined.

Figure 17:
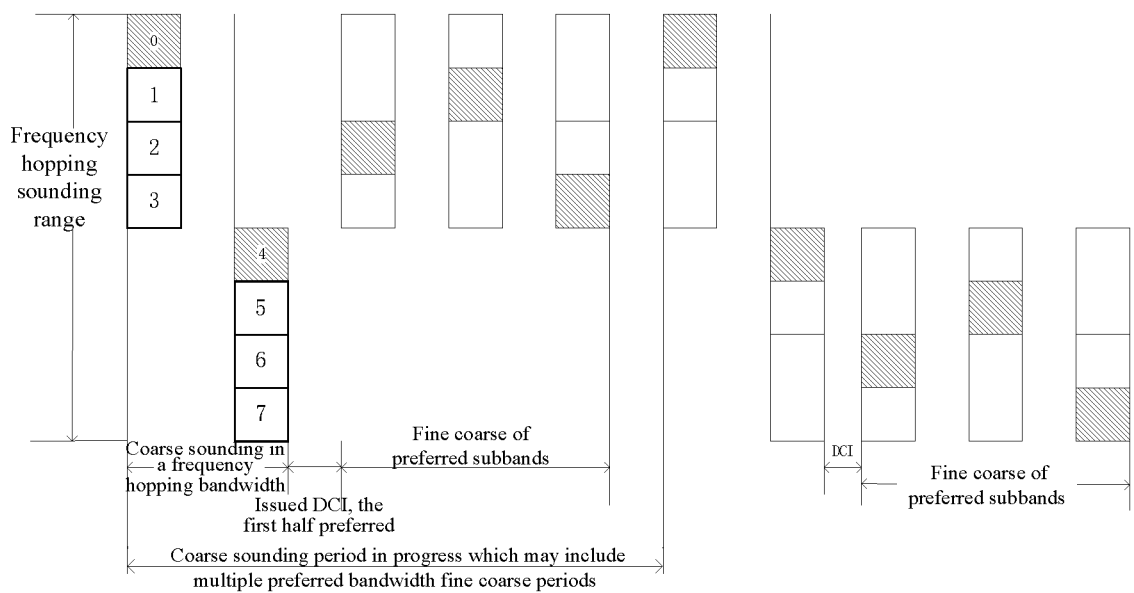
FIG. 17 is a schematic diagram illustrating a relationship between a high-layer triggered SRS and a dynamically triggered SRS according to preferred embodiment three of the present application.

The SRS configuration parameters triggered by the high layer and the SRS configuration parameters triggered by the dynamic signaling are independent in LTE and have some shared parameters in the embodiment, or the SRS configuration parameters triggered by the dynamic signaling need to depend on the SRS configuration parameters configured by the high layer, for example, the time domain symbol position set occupied by the SRS triggered by the dynamic signaling is a subset of the time domain symbol position set occupied by the SRS triggered by the high layer. The SRS triggered by the high layer is discarded when the SRS triggered by the high layer and the SRS triggered by the dynamic signaling are sent on the same symbol, or the SRS triggered by the high layer is discarded only when the frequency domain resources occupied by the SRS triggered by the high layer and the SRS triggered by the dynamic signaling overlap. As shown in FIG. 17, FIG. 17 is a schematic diagram illustrating a relationship between a SRS triggered by a high layer and a dynamically triggered SRS according to preferred embodiment three of the present application. In a coarse sounding phase, an SRS is triggered by a high layer or a previously sent second control signaling, such as periodic sending, and discontinuous frequency bands (as shown in FIG. 17, the reference signal occupies one bandwidth every four bandwidths) exist in the union of frequency domain resources occupied by the SRS. Between the coarse sounding periods, the base station selects one of two bandwidth groups (bandwidth group 1 includes {bandwidth 0 to bandwidth 3} and bandwidth group 2 includes {bandwidth 4 to bandwidth 7}), and dynamic signaling triggers fine sounding in a bandwidth group, for example, frequency hopping is performed in all the bandwidths in one of the bandwidth groups during the fine sounding phase. For example, in FIG. 17, frequency hopping is dynamically triggered in the first bandwidth group after the first coarse sounding, and the base station selects the second bandwidth group for fine sounding after the second coarse sounding. In the fine sounding phase, the reference signal in the coarse sounding phase is not sent on the bandwidth already occupied in the coarse sounding phase, for example, as shown in FIG. 17, after the first coarse sounding period, the base station selects bandwidth group 1, and the terminal has sent the reference signal in bandwidth 0 in the bandwidth group 1 in the coarse side phase. The terminal then merely needs to send the reference signal in {bandwidth 1 to bandwidth 3} in bandwidth group 0 in the fine sounding phase. Alternatively, at least during the fine sounding phase, the original bandwidth position in bandwidth group 1 does not originates from bandwidth 0 where the reference signal has been sent. That is, the frequency domain position occupied by the SRS triggered by the dynamic signaling is determined according to the SRS configuration parameters triggered by the high-layer signaling and time domain parameters. On the other hand, in order to reduce the time domain resource occupied by the SRS, the time domain resource occupied by the SRS triggered by the dynamic signaling is a subset of the time domain resource of the coarse sounding phase. When an SRS triggered by the dynamic signaling collides with high-layer signaling (or a periodically sent SRS reference signal), the periodically sent SRS is scheduled.

Alternatively, coarse sounding is configured by high-layer signaling and triggered by dynamic signaling (such as triggering a semi-periodic SRS), a fine sounding parameter is also configured by high-layer signaling and triggered by dynamic signaling, and at this time, the high-layer configuration signaling for coarse sounding and the high-layer configuration signaling for fine sounding are associated, for example, have some shared parameters.

Alternatively, the coarse sounding is configured by RRC signaling and triggered by dynamic signaling (such as triggering a semi-periodic SRS), the fine sounding parameter is configured by MAC CE signaling and triggered by dynamic signaling, and at this time, the high-layer configuration signaling for coarse sounding and the high-layer configuration signaling for fine sounding have some shared parameters, or the parameter configuration range of the MAC CE depends on the parameter configuration of the RRC signaling.

In the preferred embodiment, the physical layer dynamic control signaling is included in a physical downlink control channel (PDCCH), for example, the physical layer dynamic control information is included in downlink control information (DCI).

Preferred Embodiment Four

In the preferred embodiment, the relationship between reference signal port group hopping and frequency domain hopping is described in detail.

Figure 18A:
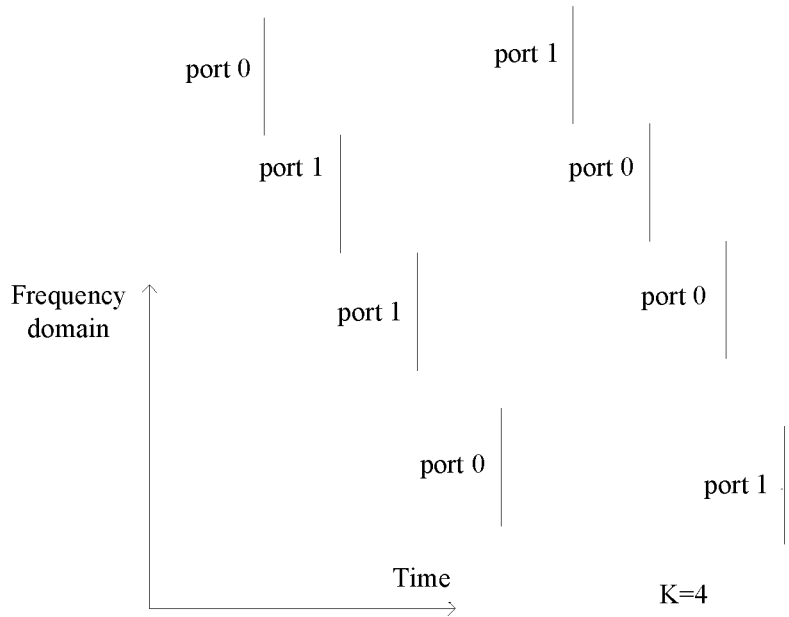
FIG. 18A is a schematic diagram illustrating port group hopping while frequency domain hopping is performed according to preferred embodiment four of the present application.
Figure 18B:
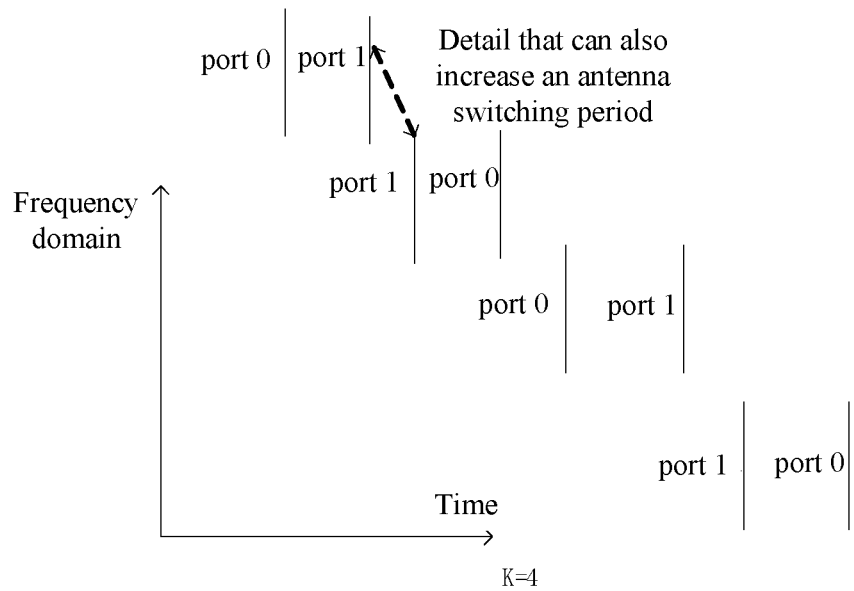
FIG. 18B is a schematic diagram illustrating antenna port hopping followed by frequency domain hopping according to preferred embodiment four of the present application.
Figure 18C:
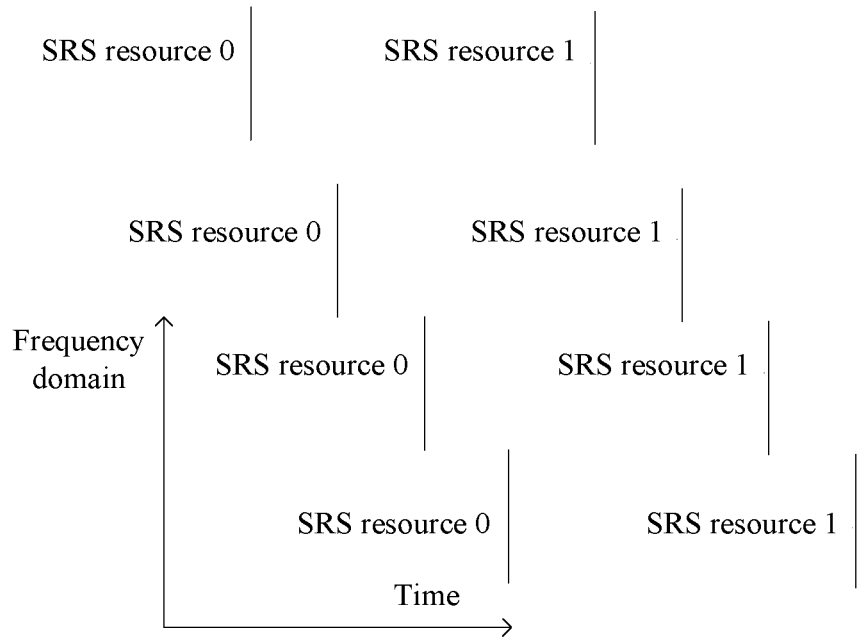
FIG. 18C is a schematic diagram illustrating frequency domain hopping followed by port group hopping according to preferred embodiment four of the present application.

The following three modes are provided. The first relationship is about port group frequency hopping while frequency domain hopping is performed, as shown in FIG. 18A, and FIG. 18A is a schematic diagram illustrating port group hopping while frequency domain hopping is performed according to preferred embodiment four of the present application. The second relationship is about reference signal port group hopping followed by frequency domain hopping, as shown in FIG. 18B, and FIG. 18B is a schematic diagram illustrating antenna port hopping followed by frequency domain hopping according to preferred embodiment four of the present application. The third relationship is about frequency domain hopping followed by port group hopping, as shown in FIG. 18C, and FIG. 18C is a schematic diagram illustrating frequency domain hopping followed by port group hopping according to preferred embodiment four of the present application. In FIGS. 18A to 18C, port 0 and port 1 are used as an example, and similarly port 0 and port 1 may correspond to a first port group and a second port group, each port group including at least one reference signal port.

A frequency hopping relationship may be fixed, or a hopping relationship is notified through signaling or determined based on the number of time domain symbols occupied by a reference signal resource in a slot. Alternatively, a relationship is determined based on the number of continuous time domain symbols occupied by the reference signal, where the continuous time domain symbols may be in multiple slots.

Specifically, when the number of time domain symbols occupied by the reference signal resource (or the number of continuous used symbols occupied by the reference signal) in a slot is greater than or equal to a predetermined threshold, the second relationship is used, otherwise, the first relationship is used, such as the predetermined threshold being the number of port groups. The relationship may also be referred to as a hopping pattern.

Preferred Embodiment Five

In the embodiment, frequency hopping of different reference signal resources needs to satisfy a certain rule, that is, frequency hopping of different reference signal resources satisfies a certain constraint condition. Relevant parameters are configured in configuration information about a reference signal resource group (which may also be referred to as a reference signal resource set and includes a plurality of reference signal resources). All reference signal resources in the reference signal resource group perform resource hopping and frequency domain hopping according to the configured parameters.

For example, there exist the following relationships between reference signal resource hopping and frequency domain hopping.

Figure 19A:
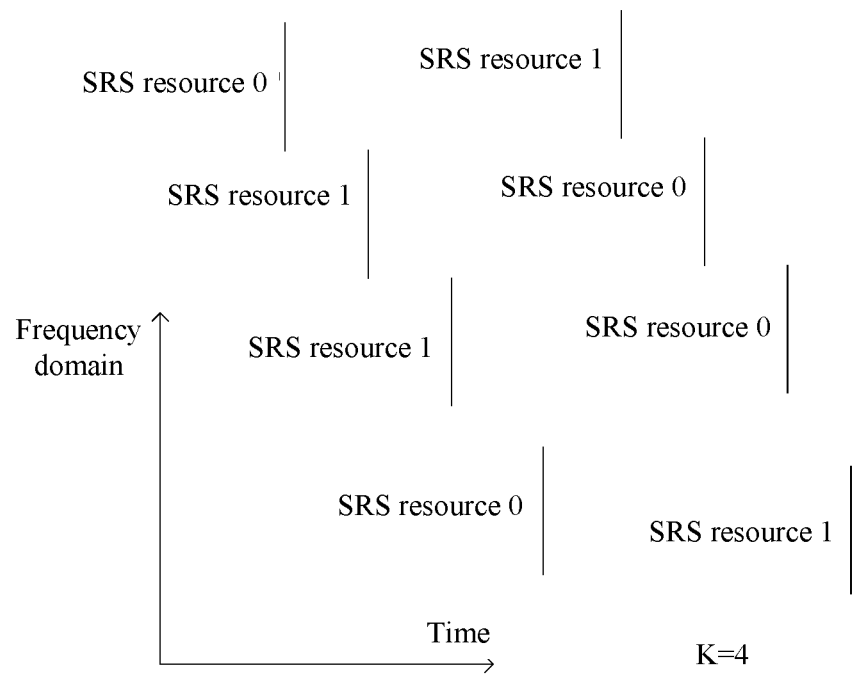
FIG. 19A is a schematic diagram illustrating SRS resource hopping while frequency domain hopping is performed according to preferred embodiment five of the present application.

The First one is about sending resource group hopping while frequency domain hopping is performed, as shown in FIG. 19A. FIG. 19A is a schematic diagram illustrating SRS resource hopping while frequency domain hopping is performed according to preferred embodiment five of the present application.

Figure 19B:
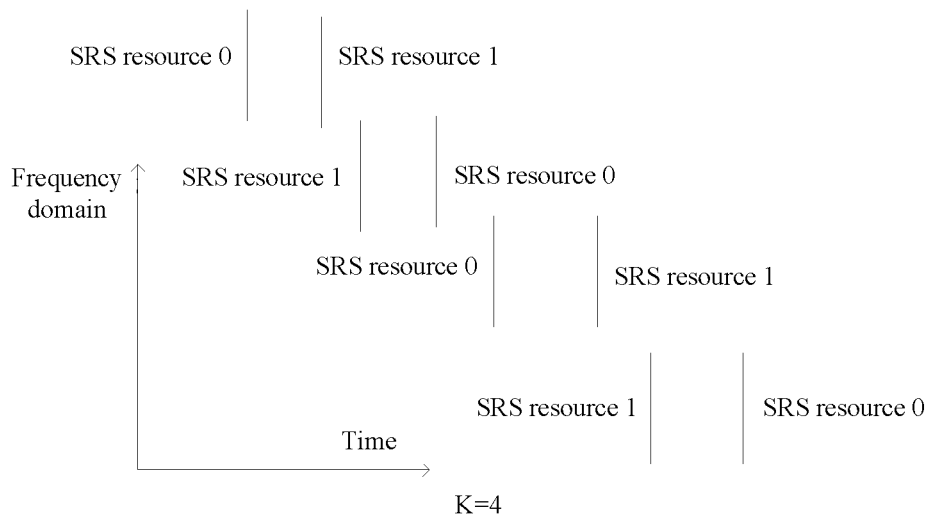
FIG. 19B is a schematic diagram illustrating SRS resource group hopping followed by frequency domain hopping according to preferred embodiment five of the present application.

The second one is about sending resource group hopping followed by frequency domain hopping, as shown in FIG. 19B, and FIG. 19B is a schematic diagram illustrating SRS resource group hopping followed by frequency domain hopping according to preferred embodiment five of the present application.

Figure 19C:
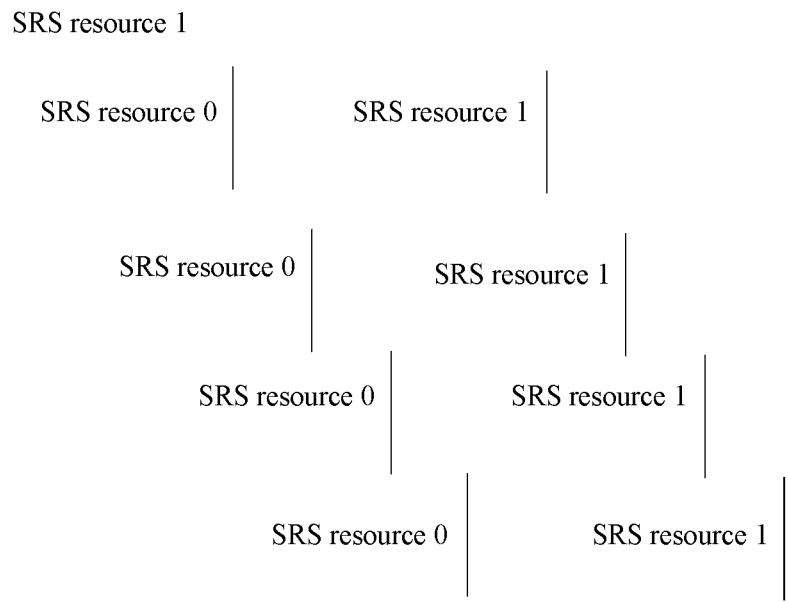
FIG. 19C is a schematic diagram illustrating frequency domain hopping followed by port group hopping according to preferred embodiment five of the present application.

The third one is about frequency domain hopping followed by reference signal resource hopping, as shown in FIG. 19C, and FIG. 19C is a schematic diagram illustrating frequency domain hopping followed by port group hopping according to preferred embodiment five of the present application.

In FIGS. 19A to 19B, the description is made by taking sending resource 1 and sending resource 0 as an example, and similarly, sending resource 1 may correspond to sending resource group 1, sending resource 0 may correspond to sending resource group 0, where at least one sending resource is included in one sending resource group, resources in one sending resource group are sent simultaneously, and resources in different sending resource groups are sent in a time division manner.

A fixed frequency hopping relationship may be used. Alternatively, the relationship is notified through signaling or determined based on the number of time domain symbols occupied by a reference signal resource set in a slot. Alternatively, the relationship is determined based on the number of continuous time domain symbols occupied by the reference signal, where the continuous time domain symbols may be in multiple slots, and the reference signal resource set includes a plurality of reference signal resources which perform hopping, for example, the SRS resource set (or SRS resource group) includes {SRS resource 0, SRS resource 1}.

Specifically, when the number of time domain symbols occupied by a reference signal resource set (or a reference signal resource group) in a slot is greater than or equal to a predetermined threshold, the second relationship is used, otherwise, the first relationship is used, such as the predetermined threshold being the number of port groups. The relationship may also be referred to as a hopping pattern.

Preferred Embodiment Six

In the preferred embodiment, tree structure information is added to specific control signaling, and the tree structure can be established according to the parameter, for example, the structure includes the number of levels of the tree, the number of leaves included in each level, the bandwidth length information corresponding to each leaf, and the like, similar to $C_{SRS}$ in LTE.

In LTE, $C_{SRS}$ and the period information and period offset information of the SRS are notified in a cell specific manner, and when the physical uplink control channel (PUCCH)/physical uplink shared channel (PUSCH) and the cell specific SRS resources are in the same sub-frame, the PUCCH/PUSCH is not sent on the time domain symbol occupied by the SRS, which causes a waste of resources since on the one hand no SRS resource may be allocated to any terminal on the cell-specific SRS resources. In NR, the original time domain position and end time domain position of the PUCCH/PUSCH can be dynamically notified, so that the PUCCH/PUSCH does not need to avoid SRS resources, or the PUCCH for which time domain/frequency domain resources are dynamically scheduled does not need to avoid SRS resources, and merely the periodic PUCCH needs to avoid SRS resources.

Furthermore, SRS resource pool information may be configured for the PUSCH/PUCCH or the SRS resource pool is merely configured for the periodic PUCCH, and the PUCCH/PUSCH or the periodic PUCCH avoids resources in the configured SRS resource pool. Preferably the resources in the configured SRS resource pool are configured in the specific control signaling.

It is preferable to avoid merely PRBs occupied by the SRS, and PRBs not occupied on the time domain symbol where the corresponding SRS is located do not need to be avoided.

In one way, UE-specific SRS sending resources fall within the above SRS resource pool for the PUCCH/PUSCH/periodic PUCCH rate matching, and in another way, the UE-specific SRS sending resources may fall outside the above SRS resource pool for the PUCCH/PUSCH/periodic PUCCH rate matching. The SRS resource includes at least one of the following resources: SRS resources, SRS time domain resources, SRS frequency domain resources, SRS code domain resources or SRS spatial domain resources.

Preferred Embodiment Seven

In the preferred embodiment, the base station allocates a discontinuous frequency domain resource group, and the terminal considers the discontinuous frequency domain resource blocks as virtual frequency domain resource blocks, combines the discontinuous frequency domain resource blocks into a tree structure similar to that in LTE, and performs frequency hopping on all frequency domain resource blocks within the range of the virtual frequency domain resource blocks or frequency hopping of part of the virtual frequency domain resource blocks.

Frequency domain hopping is performed in continuous virtual frequency domain resource blocks, and an agreed mapping rule exists from the virtual frequency domain resource blocks to the physical frequency domain resource blocks.

Figure 20A:
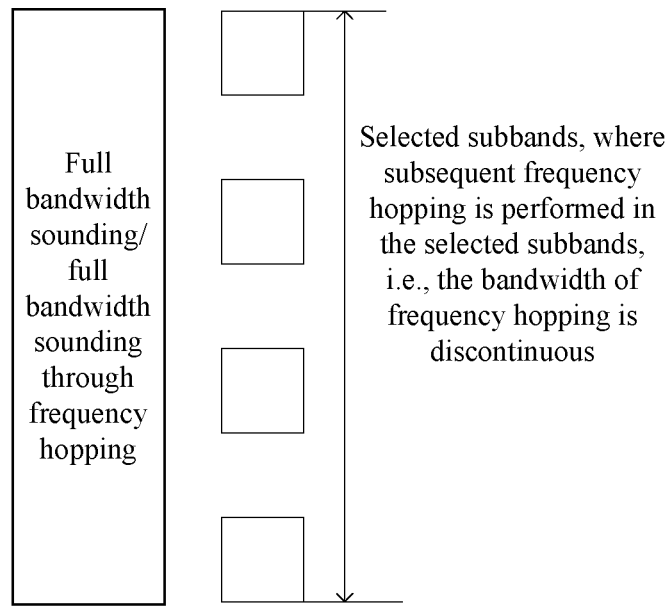
FIG. 20A is a schematic diagram illustrating a preferred frequency band set selected by a base station and having discontinuous frequency bands according to preferred embodiment seven of the present application.
Figure 20B:
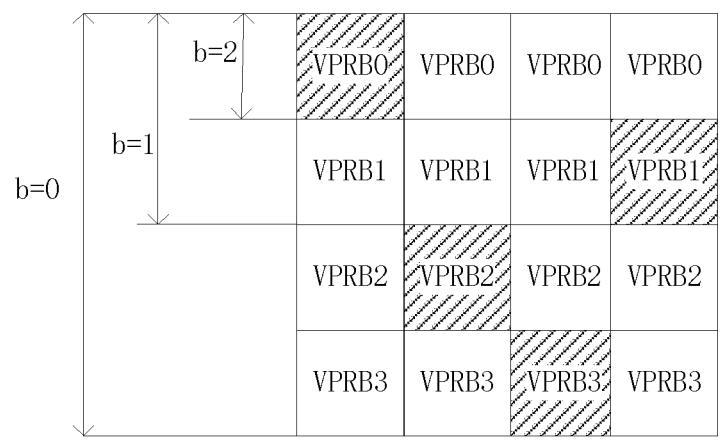
FIG. 20B is a schematic diagram in which a terminal performs frequency hopping on virtual frequency domain resources according to a preferred embodiment of the present application.

FIG. 20A is a schematic diagram illustrating a preferred frequency band set selected by a base station and having discontinuous frequency bands according to preferred embodiment seven of the present application. As shown in FIG. 20A, the base station selects a preferred bandwidth set for one UE through sending the SRS in a full-bandwidth manner or sending the SRS in a full-bandwidth hopping manner, and discontinuous frequency bands exist in the preferred bandwidth set. Bandwidths in the selected preferred bandwidth set are numbered in a virtualized manner, and as shown in FIG. 20B, the virtualized bandwidths are combined into a three-level tree structure the three levels including b=0, 1 and 2. FIG. 20B is a schematic diagram in which a terminal performs frequency hopping on virtual frequency domain resources according to a preferred embodiment of the present application. Then frequency hopping as shown in FIG. 20B is used, and in FIG. 20A, although the virtualized bandwidth completes full frequency hopping, discontinuous frequency bands exist in an actual physical resource bandwidth corresponding to the frequency domain range of the hopping.

In the preferred embodiment, the one frequency domain resource block may be a physical resource block (PRB), a subband, or a partial band, or a bandwidth part (similar to the bandwidth part discussed in NR, e.g., a bandwidth part is 1 MHz), or a frequency domain bandwidth corresponding to a carrier frequency component (e.g., a frequency domain bandwidth corresponding to a component carrier (CC)).

Preferred Embodiment Eight

In the preferred embodiment, an antenna port for sending the SRS is determined according to the SRS resource group ID and/or the antenna port group ID, and/or time domain parameters. The antenna port group may also be referred to as an antenna port class, or another name.

Further, the antenna port of one SRS resource for sending the SRS is determined according to the SRS resource group ID and the number of antenna ports in the SRS resource.

Specifically, different SRS resources in one SRS resource group send the SRS by using the same antenna port, and different SRS resource groups may correspond to different antenna ports. For example, an SRS resource group includes N SRS resources, each SRS resource including one or two SRS ports. These SRS resources are for beam training, and for fairness need to be limited from the same send antenna since after the same send beam is sent from different send antennas, the performance at the receiving end is different. However, since the terminal has a plurality of panels, beam training is required for different panels, and two SRS resource sets are required, where the SRS resource in each SRS resource set includes one or two SRS ports, and the send antenna corresponding to one or two SRS ports included in the SRS resource in a different SRS resource set should come from a different panel.

Specifically, as shown in Table 1, two SRS resource groups exist, which are {SRS resource group 1, SRS resource group 2}. The SRS resource group 1 includes four SRS resources, SRS resource group 2 includes eight SRS resources, each SRS resource includes one SRS port, and the correspondence between an SRS resource group and an SRS antenna port is shown in Table 1.

TABLE 1

| SRS resource group ID | SRS port |
|---|---|
| 1 | 10 |
| 2 | 11 |

SRS port10 and SRS port11 are different antenna ports, instead of merely antenna port 10 corresponding to all SRS resources including one SRS port in LTE. Specifically, the antenna port management in LTE is shown in Table 2 and needs to be enhanced in NR as shown in Table 3 or Table 4. That is, at this time, a plurality of 1-antenna ports exists, a plurality of 2-antenna ports may also exist. In Table 3, four types of 1-antenna ports exist, three types of 2-antenna ports exist and two types of 4-antenna ports exist, which are merely examples and do not exclude other cases. In Table 4, the antenna port for sending the SRS is determined according to the number of antenna ports and the antenna port group index.

TABLE 2

| Physical channel | Antenna port index | Antenna port number changing with the number of antennas | | |
|---|---|---|---|---|
| | | 1 | 2 | 4 |
| PUSCH | 0 | 10 | 20 | 40 |
| | 1 | | 21 | 41 |
| | 2 | | | 42 |
| | 3 | | | 43 |
| SRS | 0 | 10 | 20 | 40 |
| | 1 | | 21 | 41 |
| | 2 | | | 42 |
| | 3 | | | 43 |
| PUCCH | 0 | 100 | 200 | |
| | 1 | | 201 | |

TABLE 3

| Physical channel | Antenna port index | Antenna port number changing with the number of antennas | | |
|---|---|---|---|---|
| | | 1 | 2 | 4 |
| PUSCH | 0 | 10/11/12/13 | 200/201/202 | 400/401 |
| | 1 | | 210/211/212 | 410/411 |
| | 2 | | | 420/421 |
| | 3 | | | 430/431 |
| SRS | 0 | 10/11/12/13 | 200/201/202 | 400/401 |
| | 1 | | 210/211/212 | 410/411 |
| | 2 | | | 420/421 |
| | 3 | | | 430/431 |
| PUCCH | 0 | 1000 | 2000 | |
| | 1 | | 2001 | |

TABLE 4

| Physical channel | Antenna port index | (Antenna port number, antenna port group number) changing with the number of antennas | | |
|---|---|---|---|---|
| | | 1 | 2 | 4 |
| PUSCH | 0 | (10, i) | (20, i) | (40, i) |
| | 1 | | (21, i) | (41, i) |
| | 2 | | | (42, i) |
| | 3 | | | (43, i) |
| SRS | 0 | (10, i) | (20, i) | (40, i) |
| | 1 | | (21, i) | (41, i) |
| | 2 | | | (42, i) |
| | 3 | | | (43, i) |
| PUCCH | 0 | 100 | 200 | |
| | 1 | | 201 | |

On the other hand, in LTE, no association exists between port10 and port20 to port21, or between port10 and port40 to port43, and the association waits to be implemented by a terminal, but in NR, SRS resources of an 1-antenna port are used in a beam training phase, SRS resources of a 4-antenna port are used in an uplink precoding matrix indicator (PMI) acquisition phase, and for beam training, it can be further defined that port10 is associated with {port40 to port 41}, e.g., port10 is selected from and not in combination of {port40 to port 41}. In summary, an association exists between antenna ports with different numbers of antenna ports, i.e., for SRS resource 1 including N ports and SRS resource 2 including M antenna ports, N is less than or equal to M, or when N and M are a fixed combination, an association exists between N antenna ports and M antenna ports, e.g., an association exists about (N=1, M=4).

A relationship between antenna ports of different SRS resources may be further determined according to time parameters, such as different SRS resources at the same time corresponding to different send antennas, or no association existing between the antenna ports of different SRS resources at the same time, or different SRS resources at different time corresponding to the same send antenna (further this definition is used when these SRS resources are included in one SRS resource group), or an association existing between the antenna ports of different SRS resources at different time (e.g., when the SRS resources are included in one SRS resource group and are sent at different time, the SRS resources correspond to the same antenna port).

Preferred Embodiment Nine

Figure 21:
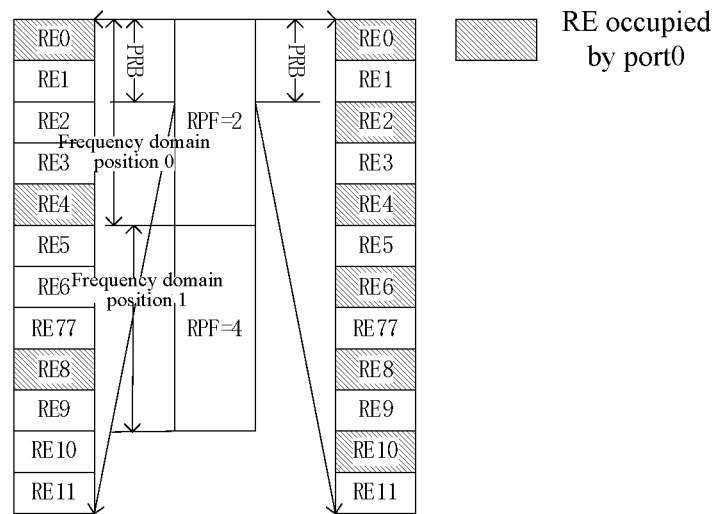
FIG. 21 is a schematic diagram illustrating frequency domain hopping in a virtual bandwidth according to preferred embodiment nine of the present application.

In the preferred embodiment, different bandwidth resources (or frequency domain positions) correspond to different repetition factors (RPFs), as shown in FIG. 21, FIG. 21 is a schematic diagram illustrating frequency domain hopping in a virtual bandwidth according to preferred embodiment nine of the present application. The relationship between the bandwidth resource and the RPF is determined through signaling information or a rule agreed by the base station and the terminal.

In FIG. 21, at frequency domain position 0 (which may also be referred to as frequency domain bandwidth 0), the RPF corresponding to the SRS is 2, and at frequency domain position 1 (which may also be referred to as frequency domain bandwidth 1), the RPF corresponding to the SRS is 4.

In the present application, the unit of the frequency domain position (or frequency domain bandwidth) is at least one of the following: a physical resource block (PRB), a subband (which includes a predetermined number of PRBs), a partial band, a bandwidth part (similar to the bandwidth part discussed in the NR), or a frequency domain bandwidth corresponding to a carrier frequency component (such as a frequency domain bandwidth corresponding to a CC). The unit of the frequency domain repetition factor among the RPFs is a subcarrier, i.e., the reference signal occupies one RE every RPF subcarriers.

Preferred Embodiment Ten

The embodiment describes the time domain frequency hopping unit changes with time in the frequency hopping process.

Figure 22A:
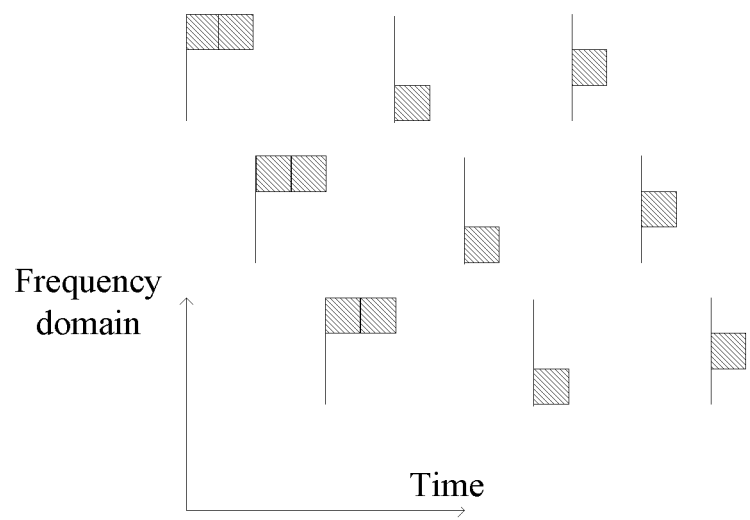
FIG. 22A is a schematic diagram one illustrating a relationship between a time domain frequency hopping unit and time according to preferred embodiment ten of the present application.

FIG. 22A is schematic diagram one illustrating a relationship between a time domain frequency hopping unit and time according to preferred embodiment ten of the present application. As shown in FIG. 22A, in one frequency hopping period, the time domain frequency hopping unit of the first three frequency domain hopping is 2, and the time domain frequency hopping unit corresponding to the subsequently added frequency domain hopping is 1, and for beam training, the base station can obtain a preferred receive beam according to the first three frequency hopping; the remaining hopping in this frequency hopping period is then received by using the preferred receive beam.

Figure 22B:
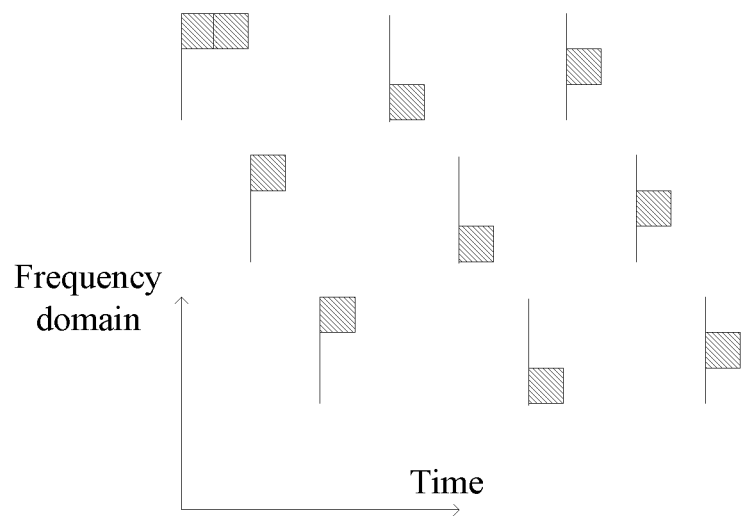
FIG. 22B is a schematic diagram two illustrating a relationship between a time domain frequency hopping unit and time according to preferred embodiment ten of the present application.

Alternatively, FIG. 22B is schematic diagram 2 illustrating a relationship between a time domain frequency hopping unit and time according to preferred embodiment ten of the present application. As shown in FIG. 22B, in one frequency hopping period, the time domain frequency hopping unit of the first frequency domain hopping is 2, and the time domain frequency hopping unit corresponding to the subsequently added frequency domain hopping is 1, and for beam training, the base station can obtain a preferred receive beam according to the frequency domain of the first time; the remaining frequency hopping in this frequency hopping period is then received by using the preferred receive beam.

In FIGS. 22A to 22B, the time domain frequency hopping unit being 2 or 1 is merely an example, and the embodiment does not exclude other time domain frequency hopping units. The time domain frequency hopping unit indicates that the frequency domain of the reference signal in the time domain frequency hopping unit is unchanged, and the frequency domain of the reference signal is changed between the time domain frequency hopping units. The time domain frequency hopping unit information may be the number of time domain symbols occupied by a reference signal (the reference signal may be in one slot or in a plurality of slots), or the time domain frequency hopping unit information may be period information of the reference signal and/or information about the number of time domain symbols included in one period.

The relationship between the time domain frequency hopping unit and time is determined according to a predetermined rule and/or through signaling information.

In one embodiment, the frequency hopping pattern function formula (6) in LTE needs to be changed to be in the following form:

$$F_b(n_{SRS}) = \begin{cases} (N_b/2) \left\lfloor \dfrac{n_{SRS} \bmod \prod_{b'=b_{hop}}^{b} N_{b'}}{T_1 \prod_{b'=b_{hop}}^{b-1} N_{b'}} \right\rfloor + \\ \qquad \left\lfloor \dfrac{n_{SRS} \bmod \prod_{b'=b_{hop}}^{b} N_{b'}}{2T_1 \prod_{b=b_{hop}}^{b-1} N_{b'}} \right\rfloor & \text{if } N_b \text{ even} \\ \lfloor N_b/2 \rfloor \left\lfloor n_{SRS} \Big/ \left(T_1 \prod_{b'=b_{hop}}^{b-1} N_{b'}\right) \right\rfloor & \text{if } N_b \text{ odd} \end{cases}$$

Alternatively, the frequency hopping pattern function in formula (7-3) is changed to the following formula:

$$F_b(t) = \begin{cases} (N_b/2) \left\lfloor \dfrac{t \bmod \prod_{b' \in b_{hopA}, b' \le b} N_{b'}}{T_1 \prod_{b' \in b_{hopA}, b' \le max(b-1,0)} N_{b'}} \right\rfloor + \\ \qquad \left\lfloor \dfrac{t \bmod \prod_{b' \in b_{hopA}, b' \le b} N_{b'}}{2T_1 \prod_{b' \in b_{hopA}, b' \le max(b-1,0)} N_{b'}} \right\rfloor & \text{if } N_b \text{ even} \\ \lfloor N_b/2 \rfloor \left\lfloor t \Big/ \left(T_1 \prod_{b' \in b_{hopA}, b' \le max(b-1,0)} N_{b'}\right) \right\rfloor & \text{if } N_b \text{ odd} \end{cases}$$

Alternatively, the frequency hopping pattern function in formula (9-1) is changed to the following formula:

$$F_b(t) = \begin{cases} (N_b/k_b)\left\lfloor \dfrac{t \bmod \prod_{b' \in b_{hopA}, b' \leq b} N_{b'}}{T_1 \prod_{b' \in b_{hopA}, b' \leq \max(b-1,0)} N_{b'}} \right\rfloor + \\ \sum_{l=1}^{N_b/k_b - 1} \beta_b(l) \left\lfloor \dfrac{t \bmod \prod_{b' \in b_{hopA}, b' \leq b} N_{b'}}{T_1 l k_b \prod_{b' \in b_{hopA}, b' \leq \max(b-1,0)} N_{b'}} \right\rfloor & \text{if } N_b \text{ even} \\ (\lceil N_b/k_b \rceil) \left\lfloor \dfrac{t \bmod \prod_{b' \in b_{hopA}, b' \leq b} N_{b'}}{T_1 \prod_{b' \in b_{hopA}, b' \leq \max(b-1,0)} N_{b'}} \right\rfloor + \\ \sum_{l=1}^{\lceil N_b/k_b \rceil - 1} \beta_b(l) \left\lfloor \dfrac{t \bmod \prod_{b' \in b_{hopA}, b' \leq b} N_{b'}}{T_1 \sum_{i'=0}^{l-1}(k_b - \alpha_{i'}) \prod_{b' \in b_{hopA}, b' \leq \max(b-1,0)} N_{b'}} \right\rfloor & \text{if } N_b \text{ odd} \end{cases}$$

Alternatively, formula (9-3) is changed to be in the following form:

$$F_b(t) = (x_b) \left\lfloor \dfrac{t \bmod \prod_{b' \in b_{hopA}, b' \leq b} N_{b'}}{T_1 \prod_{b' \in b_{hopA}, b' \leq \max(b-1,0)} N_{b'}} \right\rfloor + \sum_{l=1}^{x_b - 1} \beta_b(l) \left\lfloor \dfrac{t \bmod \prod_{b' \in b_{hopA}, b' \leq b} N_{b'}}{T_1 \sum_{i'=0}^{l-1}(k_b - \alpha_{i'}) \prod_{b' \in b_{hopA}, b' \leq \max(b-1,0)} N_{b'}} \right\rfloor.$$

$T_1$ in the above four formulas is time domain hopping unit information.

Alternatively, the above four formulas are changed to the following formulas:

$$F_b(n_{SRS}) = \begin{cases} (N_b/2) \left\lfloor \dfrac{n_{SRS} \bmod \prod_{b'=b_{hop}}^{b} N_{b'}}{T_{1,b} \prod_{b'=b_{hop}}^{b-1} N_{b'}} \right\rfloor + \\ \left\lfloor \dfrac{n_{SRS} \bmod \prod_{b'=b_{hop}}^{b} N_{b'}}{2T_{1,b} \prod_{b'=b_{hop}}^{b-1} N_{b'}} \right\rfloor & \text{if } N_b \text{ even} \\ \lfloor N_b/2 \rfloor \left\lfloor n_{SRS} / \left( T_{1,b} \prod_{b'=b_{hop}}^{b-1} N_{b'} \right) \right\rfloor & \text{if } N_b \text{ odd} \end{cases}$$

$$F_b(t) = \begin{cases} (N_b/2) \left\lfloor \dfrac{t \bmod \prod_{b' \in b_{hopA}, b' \leq b} N_{b'}}{T_{1,b} \prod_{b' \in b_{hopA}, b' \leq \max(b-1,0)} N_{b'}} \right\rfloor + \\ \left\lfloor \dfrac{t \bmod \prod_{b' \in b_{hopA}, b' \leq b} N_{b'}}{2T_{1,b} \prod_{b' \in b_{hopA}, b' \leq \max(b-1,0)} N_{b'}} \right\rfloor & \text{if } N_b \text{ even} \\ \lfloor N_b/2 \rfloor \left\lfloor t / \left( T_{1,b} \prod_{b' \in b_{hopA}, b' \leq \max(b-1,0)} N_{b'} \right) \right\rfloor & \text{if } N_b \text{ odd} \end{cases}$$

-continued $$F_b(t) = \begin{cases} (N_b/k_b) \left\lfloor \dfrac{t \bmod \prod_{b' \in b_{hopA}, b' \leq b} N_{b'}}{T_{1,b} \prod_{b' \in b_{hopA}, b' \leq max(b-1,0)} N_{b'}} \right\rfloor + \\ \sum_{l=1}^{N_b/k_b-1} \beta_b(l) \left\lfloor \dfrac{t \bmod \prod_{b' \in b_{hopA}, b' \leq b} N_{b'}}{T_{1,b} l k_b \prod_{b' \in b_{hopA}, b' \leq max(b-1,0)} N_{b'}} \right\rfloor & \text{if } N_b \text{ even} \\ (\lceil N_b/k_b \rceil) \left\lfloor \dfrac{t \bmod \prod_{b' \in b_{hopA}, b' \leq b} N_{b'}}{T_{1,b} \prod_{b' \in b_{hopA}, b' \leq max(b-1,0)} N_{b'}} \right\rfloor + \\ \sum_{l=1}^{\lceil N_b/k_b \rceil-1} \beta_b(l) \left\lfloor \dfrac{t \bmod \prod_{b' \in b_{hopA}, b' \leq b} N_{b'}}{T_{1,b} \sum_{l'=0}^{l-1}\left[(k_b-\alpha_{l'})\prod_{b' \in b_{hopA}, b' \leq max(b-1,0)} N_{b'}\right]} \right\rfloor & \text{if } N_b \text{ odd} \end{cases}$$

$$F_b(t) = (x_b) \left\lfloor \dfrac{t \bmod \prod_{b' \in b_{hopA}, b' \leq b} N_{b'}}{T_{1,b} \prod_{b' \in b_{hopA}, b' \leq max(b-1,0)} N_{b'}} \right\rfloor +$$

$$\sum_{l=1}^{x_b-1} \beta_b(l) \left\lfloor \dfrac{t \bmod \prod_{b' \in b_{hopA}, b' \leq b} N_{b'}}{T_{1,b} \sum_{l'=0}^{l-1}\left[(k_b-\alpha_{l'})\prod_{b' \in b_{hopA}, b' \leq max(b-1,0)} N_{b'}\right]} \right\rfloor.$$

$T_{1,b}$ is the time domain frequency hopping unit information corresponding to the bandwidth level b, and is obtained according to signaling information or an agreed rule.

Preferred Embodiment Eleven

In Rel-15 version of NR, the reserved resources are notified through signaling and no signal is sent or received on these resources which are reserved for signals in future versions for backward compatibility.

In the frequency hopping process, when the allocated reference signal resource and the allocated reserved resource overlap, the frequency hopping reference signal is not sent on the reserved resource, or the frequency domain position which the reference signal needs to occupy on the reserved resource is postponed to the next frequency hopping resource for sending. Alternatively, when overlap exists, the current frequency hopping reference signal is not sent and the current frequency hopping is discarded, or the frequency domain position required to be occupied by the current frequency hopping reference signal is postponed to the next frequency hopping resource.

The reference signal in the above-mentioned embodiment may be an uplink reference signal or a downlink reference signal.

In the present application, the frequency domain bandwidth level may also be referred to as a bandwidth length index or a tree level or a tree layer, and the bandwidth index may also be referred to as a frequency domain position index or a leaf index or another name, without affecting the inventive step of the present application.

In the present application, a frequency domain block includes at least one physical resource block (PRB), and the reference signal occupying the frequency domain block indicates that the reference signal occupies a resource element (RE) in the frequency domain block, such as occupying some REs in the frequency domain block (e.g., occupying D REs in a PRB, such as D=1, 3, etc.). Alternatively, a frequency domain block may be a subband (including the predetermined number of PRBs), or a frequency domain block partial band, or a bandwidth part (similar to the bandwidth part discussed in the NR) or a bandwidth corresponding to a component carrier frequency. That is, in the present application, the unit of the frequency domain position (or a frequency band/a frequency domain bandwidth) is at least one of the following: a physical resource block (PRB), a subband (which includes the predetermined number of PRBs), a partial band or a bandwidth part (similar to the bandwidth part discussed in the NR).

In the present application, the base unit of the continuous frequency bands is a set of N PRBs which are physically continuous or logically continuous by NP, where N is an integer greater than or equal to 1, and if PRBs included in two frequency bands are physically or logically discontinuous, the two frequency bands are discontinuous.

In the present application, min(A) indicates taking the minimum value of set A, max(A) indicates taking the maximum value of set A, $\lfloor x \rfloor$ indicates rounding down x, and $\lceil x \rceil$ indicates rounding up x.

Apparently, those skilled in the art should know that various modules or steps described above of the present application may be implemented by a universal computing apparatus, the various modules or steps may be concentrated on a single computing apparatus or distributed in a network composed of multiple computing apparatuses. In an embodiment, the various modules or steps may be implemented by program codes executable by the computing apparatuses, so that they may be stored in a storage apparatus for execution by the computing apparatuses, and in some circumstances, the illustrated or described steps may be executed in sequences different from those described herein, or they may be made into various integrated circuit modules separately, or multiple modules or steps therein may be made into a single integrated circuit module for implementation. Therefore, the present application is not limited to any specific combination of hardware and software.

The above are merely preferred embodiments of the present application and are not intended to limit the present application, and for those skilled in the art, the present application may have various modifications and variations. Any modifications, equivalent substitutions, improvements and the like made within the principle of the present application are within the scope of the present application.

What is claimed is:

1. A reference signal sending method, comprising:
determining that frequency domain positions occupied by a reference signal satisfy a predetermined condition, wherein the predetermined condition comprises: discontinuous frequency bands existing among the frequency domain positions occupied by the reference signal, and a union of the discontinuous frequency bands occupied by the reference signal is smaller than a frequency hopping bandwidth, wherein each frequency band comprises a physical resource block (PRB); and
sending the reference signal at the determined frequency domain positions;
wherein the frequency hopping bandwidth is a bandwidth determined according to two frequency domain positions with a largest distance among the frequency domain positions occupied by the reference signal and is a predetermined bandwidth acquired by receiving a first signaling message, wherein the predetermined bandwidth refers to a bandwidth corresponding to frequency hopping range configuration $b_{hop}$ notified by the first signaling message, wherein $b_{hop}$ is a frequency domain bandwidth level index; and
wherein in response to determining that a frequency domain bandwidth level does not belong to a frequency hopping bandwidth level set of the reference signal, the frequency domain bandwidth index occupied by the reference signal is a fixed value and a frequency domain bandwidth index set corresponding to the reference signal is a proper subset of a frequency domain bandwidth index set corresponding to the frequency domain bandwidth level;
wherein one frequency domain bandwidth with a frequency domain bandwidth level of (N−1) comprises one or more frequency domain bandwidths with a frequency domain bandwidth level of N, one or more frequency domain bandwidths exist under one frequency domain bandwidth level, and the frequency domain bandwidth index is indexes of a plurality of frequency domain bandwidths with the frequency domain bandwidth level of N comprised by the one frequency domain bandwidth with the frequency domain bandwidth level of (N−1); and
wherein the frequency domain bandwidth index set corresponding to the frequency domain bandwidth level comprises a set of indexes of all frequency domain bandwidths with the frequency domain bandwidth level of N comprised by the one frequency domain bandwidth with the frequency domain bandwidth level of (N−1); wherein N is an integer greater than or equal to 1.

2. The method of claim 1, wherein the discontinuous frequency bands existing among the frequency domain positions occupied by the reference signal comprises at least one of:
in one frequency hopping period, the discontinuous frequency bands existing among the frequency domain positions occupied by the reference signal; or
the discontinuous frequency bands existing among frequency domain positions occupied by the reference signal in a manner of frequency hopping;
wherein the frequency hopping period satisfies at least one of following characteristics:
in different frequency hopping periods, a repeated frequency band existing among frequency domain positions occupied by the reference signals;
in different frequency hopping periods, frequency domain positions occupied by the reference signal being the same; or
a relationship item in a first mapping relationship and a relationship item in a second mapping relationship having a corresponding relationship, wherein the first mapping relationship is a mapping relationship between frequency domain positions occupied by the reference signal in a first frequency hopping period and a time domain parameter, and the second mapping relationship is a mapping relationship between frequency domain positions occupied by the reference signal in a second frequency hopping period and the time domain parameter.

3. The method of claim 1, wherein the predetermined condition further comprises:
frequency domain positions occupied by the reference signal in a manner of frequency hopping are distributed at equal intervals over the frequency hopping bandwidth.

4. The method of claim 1, wherein the frequency domain positions k(t) occupied by the reference signal are determined in the following manner:

$$k(t) = k_{org} + \sum_{b=0}^{B} N_{sc,b}^{RS} n_b(t);$$

$$n_b(t) = \begin{cases} n_{b,orig} \bmod N_b & b \notin b_{hopA} \\ \{F_b(t) + n_{b,orig}\} \bmod N_b & \text{otherwise} \end{cases};$$

$$F_b(t) = \begin{cases} (N_b/2) \left\lfloor \dfrac{t \bmod \prod_{b' \in b_{hopA}, b' \leq b} N_{b'}}{\prod_{b' \in b_{hopA}, b' \leq \max(b-1,0)} N_{b'}} \right\rfloor + \\ \quad \left\lfloor \dfrac{t \bmod \prod_{b' \in b_{hopA}, b' \leq b} N_{b'}}{2 \prod_{b' \in b_{hopA}, b' \leq \max(b-1,0)} N_{b'}} \right\rfloor & \text{if } N_b \text{ even} \\ \lfloor N_b/2 \rfloor \left\lfloor t \Big/ \prod_{b' \in b_{hopA}, b' \leq \max(b-1,0)} N_{b'} \right\rfloor & \text{if } N_b \text{ odd} \end{cases}$$

wherein t is a time parameter and is a real number greater than or equal to 0, b or b' is an index of a frequency domain bandwidth level corresponding to the reference signal among a plurality of frequency domain bandwidth levels and is equal to 0, 1, . . . , B, B is a maximum frequency domain bandwidth level among frequency domain bandwidth levels corresponding to the reference signal and is a non-negative integer, $N_b$ is a number of bandwidths with a frequency domain bandwidth level indexed by b comprised by one bandwidth with a frequency domain bandwidth level indexed by max (b−1, 0), $N_{b'}$ is a number of bandwidths with a frequency domain bandwidth level indexed by b' comprised by one bandwidth with a frequency domain bandwidth level indexed by max (b'−1, 0), max ( ) is a function taking a maximum value, $n_{b,orig}$ is an original frequency domain bandwidth index of the reference signal with the frequency domain bandwidth level indexed by b, $n_b(t)$ is a frequency domain bandwidth index corresponding to the reference signal with the frequency domain bandwidth level indexed by b at time t, $k_{org}$ is a non-negative integer, $N_{sc,b}^{RS}$ is a frequency domain length corresponding to one bandwidth with the frequency domain bandwidth level indexed by b, Π is a multiplication operation, mod is a remainder function, and $b_{hopA}$ is a frequency domain bandwidth level set.

5. The method of claim 1, wherein in response to determining that frequency domain bandwidths of the reference signal have a plurality of levels, the method further comprises:
receiving a second signaling message, wherein the second signaling message comprises at least one of following information: a frequency domain bandwidth index set of hopping of the reference signal at each frequency domain bandwidth level, or a frequency domain bandwidth index set of hopping of the reference signal in the frequency hopping bandwidth level set.

6. The method of claim 1, further comprising:
receiving physical layer dynamic control signaling, wherein the physical layer dynamic control signaling carries time domain offset information of the reference signal;
transmitting the reference signal according to the time domain offset information of the reference signal.

7. A reference signal receiving method, comprising:
determining that frequency domain positions occupied by a reference signal satisfy a predetermined condition, wherein the predetermined condition comprises: discontinuous frequency bands existing among the frequency domain positions occupied by the reference signal, and a union of the discontinuous frequency bands occupied by the reference signal is smaller than a frequency hopping bandwidth, wherein each frequency band comprises a physical resource block (PRB); and
receiving the reference signal at the determined frequency domain positions;
wherein the frequency hopping bandwidth is a bandwidth determined according to two frequency domain positions with a largest distance among the frequency domain positions occupied by the reference signal and is a predetermined bandwidth notified by sending a first signaling message, wherein the predetermined bandwidth refers to a bandwidth corresponding to frequency hopping range configuration $b_{hop}$ notified by the first signaling message, wherein $b_{hop}$ is a frequency domain bandwidth level index; and
wherein in response to determining that a frequency domain bandwidth level does not belong to a frequency hopping bandwidth level set of the reference signal, the frequency domain bandwidth index occupied by the reference signal is a fixed value and a frequency domain bandwidth index set corresponding to the reference signal is a proper subset of a frequency domain bandwidth index set corresponding to the frequency domain bandwidth level;
wherein one frequency domain bandwidth with a frequency domain bandwidth level of (N−1) comprises one or more frequency domain bandwidths with a frequency domain bandwidth level of N, one or more frequency domain bandwidths exist under one frequency domain bandwidth level, and the frequency domain bandwidth index is indexes of a plurality of frequency domain bandwidths with the frequency domain bandwidth level of N comprised by the one frequency domain bandwidth with the frequency domain bandwidth level of (N−1); and
wherein the frequency domain bandwidth index set corresponding to the frequency domain bandwidth level comprises a set of indexes of all frequency domain bandwidths with the frequency domain bandwidth level of N comprised by the one frequency domain bandwidth with the frequency domain bandwidth level of (N−1); wherein N is an integer greater than or equal to 1.

8. The method of claim 1, wherein the frequency hopping bandwidth level set satisfies:
a maximum level in the frequency hopping bandwidth level set is smaller than a first level, wherein the first level is a maximum frequency domain bandwidth level among frequency domain bandwidth levels corresponding to the reference signal.

9. A non-transitory storage medium, which stores a program, wherein when the program is executed, the reference signal sending method of claim 1 or the reference signal receiving method of claim 7 is performed.

10. The method of claim 7, wherein the discontinuous frequency bands existing among the frequency domain positions occupied by the reference signal comprises at least one of:
in one frequency hopping period, the discontinuous frequency bands existing among the frequency domain positions occupied by the reference signal; or
the discontinuous frequency bands existing among frequency domain positions occupied by the reference signal in a manner of frequency hopping;
wherein the frequency hopping period satisfies at least one of following characteristics:
in different frequency hopping periods, a repeated frequency band existing among frequency domain positions occupied by the reference signals;
in different frequency hopping periods, frequency domain positions occupied by the reference signal being the same; or
a relationship item in a first mapping relationship and a relationship item in a second mapping relationship having a corresponding relationship, wherein the first mapping relationship is a mapping relationship between frequency domain positions occupied by the reference signal in a first frequency hopping period and a time domain parameter, and the second mapping relationship is a mapping relationship between frequency domain positions occupied by the reference signal in a second frequency hopping period and the time domain parameter.

11. The method of claim 7, wherein the predetermined condition further comprises: frequency domain positions occupied by the reference signal in a manner of frequency hopping are distributed at equal intervals over the frequency hopping bandwidth.

12. The method of claim 7, further comprising:
transmitting physical layer dynamic control signaling, wherein the physical layer dynamic control signaling carries time domain offset information of the reference signal;
receiving the reference signal according to the time domain offset information of the reference signal.

13. The method of claim 7, wherein in response to determining that frequency domain bandwidths of the reference signal have a plurality of levels, the method further comprises:

sending a second signaling message, wherein the second signaling message comprises at least one of following information: a frequency domain bandwidth index set of hopping of the reference signal at each frequency domain bandwidth level, or a frequency domain bandwidth index set of hopping of the reference signal in the frequency hopping bandwidth level set.

14. A reference signal receiving device, comprising: a processor and a memory storing a program instruction, wherein the processor is configured to execute the program instruction to perform the reference signal receiving method of claim 7.

15. The method of claim 7, wherein the frequency hopping bandwidth level set satisfies:

a maximum level in the frequency hopping bandwidth level set is smaller than a first level, wherein the first level is a maximum frequency domain bandwidth level among frequency domain bandwidth levels corresponding to the reference signal.

16. A reference signal sending device, comprising: a processor and a memory storing a program instruction executable by the processor, wherein the processor is configured to:

determine that frequency domain positions occupied by a reference signal satisfy a predetermined condition, wherein the predetermined condition comprises: discontinuous frequency bands existing among the frequency domain positions occupied by the reference signal, and a union of the discontinuous frequency bands occupied by the reference signal is smaller than a frequency hopping bandwidth, wherein each frequency band comprises a physical resource block (PRB); and send the reference signal at the determined frequency domain positions;

wherein the frequency hopping bandwidth is a bandwidth determined according to two frequency domain positions with a largest distance among the frequency domain positions occupied by the reference signal and is a predetermined bandwidth acquired by receiving a first signaling message, wherein the predetermined bandwidth refers to a bandwidth corresponding to frequency hopping range configuration $b_{hop}$ notified by the first signaling message, wherein $b_{hop}$ is a frequency domain bandwidth level index; and wherein in response to determining that a frequency domain bandwidth level does not belong to a frequency hopping bandwidth level set of the reference signal, the frequency domain bandwidth index occupied by the reference signal is a fixed value and a frequency domain bandwidth index set corresponding to the reference signal is a proper subset of a frequency domain bandwidth index set corresponding to the frequency domain bandwidth level;

wherein one frequency domain bandwidth with a frequency domain bandwidth level of (N−1) comprises one or more frequency domain bandwidths with a frequency domain bandwidth level of N, one or more frequency domain bandwidths exist under one frequency domain bandwidth level, and the frequency domain bandwidth index is indexes of a plurality of frequency domain bandwidths with the frequency domain bandwidth level of N comprised by the one frequency domain bandwidth with the frequency domain bandwidth level of (N−1); and wherein the frequency domain bandwidth index set corresponding to the frequency domain bandwidth level comprises a set of indexes of all frequency domain bandwidths with the frequency domain bandwidth level of N comprised by the one frequency domain bandwidth with the frequency domain bandwidth level of (N−1); wherein N is an integer greater than or equal to 1.

17. The device of claim 16, wherein the discontinuous frequency bands existing among the frequency domain positions occupied by the reference signal comprises at least one of:

in one frequency hopping period, the discontinuous frequency bands existing among the frequency domain positions occupied by the reference signal; or the discontinuous frequency bands existing among frequency domain positions occupied by the reference signal in a manner of frequency hopping;

wherein the frequency hopping period satisfies at least one of following characteristics:

in different frequency hopping periods, a repeated frequency band existing among frequency domain positions occupied by the reference signals;

in different frequency hopping periods, frequency domain positions occupied by the reference signal being the same; or a relationship item in a first mapping relationship and a relationship item in a second mapping relationship having a corresponding relationship, wherein the first mapping relationship is a mapping relationship between frequency domain positions occupied by the reference signal in a first frequency hopping period and a time domain parameter, and the second mapping relationship is a mapping relationship between frequency domain positions occupied by the reference signal in a second frequency hopping period and the time domain parameter.

18. The device of claim 16, wherein the predetermined condition further comprises: frequency domain positions occupied by the reference signal in a manner of frequency hopping are distributed at equal intervals over the frequency hopping bandwidth.

19. The device of claim 16, wherein in response to determining that frequency domain bandwidths of the reference signal have a plurality of levels, the processor is further configured to receive a second signaling message;

wherein the second signaling message comprises at least one of following information: a frequency domain bandwidth index set of hopping of the reference signal at each frequency domain bandwidth level, or a frequency domain bandwidth index set of hopping of the reference signal in the frequency hopping bandwidth level set.

20. The device of claim 16, wherein the frequency hopping bandwidth level set satisfies:

a maximum level in the frequency hopping bandwidth level set is smaller than a first level, wherein the first level is a maximum frequency domain bandwidth level among frequency domain bandwidth levels corresponding to the reference signal.

* * * * *